(12) United States Patent
Seshadri et al.

(10) Patent No.: US 9,049,440 B2
(45) Date of Patent: Jun. 2, 2015

(54) INDEPENDENT VIEWER TAILORING OF SAME MEDIA SOURCE CONTENT VIA A COMMON 2D-3D DISPLAY

(75) Inventors: Nambirajan Seshadri, Irvine, CA (US); James D. Bennett, Hroznetin (CZ); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 37 days.

(21) Appl. No.: 12/982,362

(22) Filed: Dec. 30, 2010

(65) Prior Publication Data
US 2011/0157471 A1 Jun. 30, 2011

Related U.S. Application Data

(60) Provisional application No. 61/291,818, filed on Dec. 31, 2009, provisional application No. 61/303,119, filed on Feb. 10, 2010.

(51) Int. Cl.
*H04N 5/445* (2011.01)
*H04N 13/04* (2006.01)
(Continued)

(52) U.S. Cl.
CPC ............ *H04N 13/0456* (2013.01); *G06F 3/14* (2013.01); *G09G 3/003* (2013.01); *G09G 3/20* (2013.01); *G09G 5/003* (2013.01); *G09G 5/14* (2013.01); *G09G 2300/023* (2013.01); *G09G 2320/028* (2013.01); *G09G 2370/04* (2013.01); *H04N 13/0029* (2013.01); *H04N 13/0048* (2013.01); *H04N 13/0055* (2013.01); *H04N 13/0059* (2013.01); *H04N 13/0404* (2013.01); *H04N 13/0409* (2013.01); *H04N 13/0411* (2013.01); *H04N 13/0447* (2013.01); *H04N 13/0454* (2013.01); *H04N 13/0468* (2013.01);
(Continued)

(58) Field of Classification Search
None
See application file for complete search history.

(56) References Cited

U.S. PATENT DOCUMENTS 4,829,365 A 5/1989 Eichenlaub
5,493,427 A 2/1996 Nomura et al.
(Continued)

FOREIGN PATENT DOCUMENTS

EP 0833183 A1 4/1998
EP 1662808 A1 5/2006
(Continued)

OTHER PUBLICATIONS

Search Report received for European Patent application No. 10016055.5, mailed on Apr. 12, 2011, 3 pages.
(Continued)

*Primary Examiner* — John Schnurr
*Assistant Examiner* — Cynthia Fogg
(74) *Attorney, Agent, or Firm* — Fiala & Weaver P.L.L.C.

(57) ABSTRACT

Techniques are described herein for supporting independent viewer tailoring of same media source content via a common 2D-3D display. A first independently controllable version of video content is caused to be delivered to a first region of a screen. A second independently controllable version of the video content is caused to be delivered to a second region of the screen. The first region and the second region overlap at least in part. For example, the first and second independently controllable versions may be simultaneously displayed such that the first independently controllable version is displayed for a first viewer but not for a second viewer and such that the second independently controllable version may be displayed for the second viewer but not for the first viewer.

22 Claims, 28 Drawing Sheets

(51) Int. Cl.

| | | |
|---|---|---|
| *G06F 3/14* | (2006.01) | |
| *G09G 3/00* | (2006.01) | |
| *G09G 3/20* | (2006.01) | |
| *H04N 13/00* | (2006.01) | |
| *H04N 21/235* | (2011.01) | |
| *H04N 21/41* | (2011.01) | |
| *H04N 21/435* | (2011.01) | |
| *G03B 35/24* | (2006.01) | |
| *H04S 7/00* | (2006.01) | |
| *G09G 5/00* | (2006.01) | |
| *G09G 5/14* | (2006.01) | |

(52) U.S. Cl.
CPC ......... *H04N13/0497* (2013.01); *H04N 21/235* (2013.01); *H04N 21/4122* (2013.01); *H04N 21/435* (2013.01); *H04N 2013/0463* (2013.01); *H04N 2013/0465* (2013.01); *G03B 35/24* (2013.01); *H04N 13/0413* (2013.01); *H04S 7/303* (2013.01); *H04N 13/0429* (2013.01); *H04N 13/0484* (2013.01)

(56) References Cited

U.S. PATENT DOCUMENTS

| | | | |
|---|---|---|---|
| 5,615,046 | A | 3/1997 | Gilchrist |
| 5,855,425 | A | 1/1999 | Hamagishi |
| 5,945,965 | A | 8/1999 | Inoguchi et al. |
| 5,959,597 | A | 9/1999 | Yamada et al. |
| 5,969,850 | A | 10/1999 | Harrold et al. |
| 5,990,975 | A * | 11/1999 | Nan et al. ................ 348/588 |
| 6,023,277 | A | 2/2000 | Osaka et al. |
| 6,049,424 | A | 4/2000 | Hamagishi |
| 6,094,216 | A | 7/2000 | Taniguchi et al. |
| 6,144,375 | A | 11/2000 | Jain et al. |
| 6,188,442 | B1 * | 2/2001 | Narayanaswami ........... 348/564 |
| 6,285,368 | B1 | 9/2001 | Sudo |
| 6,697,687 | B1 | 2/2004 | Kasahara et al. |
| 6,710,920 | B1 | 3/2004 | Mashitani et al. |
| 6,909,555 | B2 | 6/2005 | Wohlstadter |
| 7,030,903 | B2 | 4/2006 | Sudo |
| 7,038,698 | B1 | 5/2006 | Palm et al. |
| 7,091,471 | B2 | 8/2006 | Wenstrand et al. |
| 7,123,213 | B2 * | 10/2006 | Yamazaki et al. ................ 345/7 |
| 7,190,518 | B1 | 3/2007 | Kleinberger et al. |
| 7,359,105 | B2 | 4/2008 | Jacobs et al. |
| 7,440,193 | B2 | 10/2008 | Gunasekaran et al. |
| 7,511,774 | B2 | 3/2009 | Lee et al. |
| 7,626,644 | B2 | 12/2009 | Shestak et al. |
| 7,646,451 | B2 | 1/2010 | Vogel et al. |
| 7,692,859 | B2 | 4/2010 | Redert et al. |
| 7,885,079 | B2 | 2/2011 | Chen et al. |
| 7,911,442 | B2 | 3/2011 | Wang et al. |
| 7,924,456 | B1 * | 4/2011 | Kahn et al. ................ 358/1.16 |
| 7,954,967 | B2 | 6/2011 | Kashiwagi et al. |
| 7,997,783 | B2 | 8/2011 | Song et al. |
| 8,040,952 | B2 | 10/2011 | Park et al. |
| 8,044,983 | B2 | 10/2011 | Nonaka et al. |
| 8,049,710 | B2 | 11/2011 | Shestak et al. |
| 8,072,411 | B2 | 12/2011 | Chen et al. |
| 8,139,024 | B2 | 3/2012 | Daiku |
| 8,154,686 | B2 | 4/2012 | Mather et al. |
| 8,154,799 | B2 | 4/2012 | Kim et al. |
| 8,174,564 | B2 | 5/2012 | Kim et al. |
| 8,183,788 | B2 | 5/2012 | Ma |
| 8,209,396 | B1 | 6/2012 | Raman et al. |
| 8,233,034 | B2 | 7/2012 | Sharp et al. |
| 8,284,119 | B2 | 10/2012 | Kim et al. |
| 8,310,527 | B2 * | 11/2012 | Ko et al. ................ 348/55 |
| 8,334,933 | B2 | 12/2012 | Tsukada et al. |
| 8,363,928 | B1 | 1/2013 | Sharp |
| 8,368,745 | B2 | 2/2013 | Nam et al. |
| 8,384,774 | B2 | 2/2013 | Gallagher |
| 8,400,392 | B2 | 3/2013 | Kimura et al. |
| 8,411,746 | B2 | 4/2013 | Chen et al. |
| 8,438,601 | B2 * | 5/2013 | Putterman et al. ............... 725/80 |
| 8,441,430 | B2 | 5/2013 | Lee |
| 8,466,869 | B2 | 6/2013 | Kobayashi et al. |
| 8,482,512 | B2 | 7/2013 | Adachi et al. |
| 8,487,863 | B2 | 7/2013 | Park et al. |
| 8,525,942 | B2 | 9/2013 | Robinson et al. |
| 8,587,642 | B2 | 11/2013 | Shestak et al. |
| 8,587,736 | B2 | 11/2013 | Kang |
| 8,605,136 | B2 | 12/2013 | Yu et al. |
| 8,687,042 | B2 | 4/2014 | Karaoguz et al. |
| 8,736,659 | B2 | 5/2014 | Liu |
| 8,766,905 | B2 | 7/2014 | Adachi |
| 8,823,782 | B2 | 9/2014 | Karaoguz et al. |
| 8,854,531 | B2 | 10/2014 | Karaoguz et al. |
| 8,885,026 | B2 | 11/2014 | Endo |
| 8,922,545 | B2 | 12/2014 | Bennett et al. |
| 2002/0010798 | A1 | 1/2002 | Ben-Shaul et al. |
| 2002/0037037 | A1 | 3/2002 | Van Der Schaar |
| 2002/0167862 | A1 | 11/2002 | Tomasi et al. |
| 2002/0171666 | A1 | 11/2002 | Endo et al. |
| 2003/0012425 | A1 | 1/2003 | Suzuki et al. |
| 2003/0103165 | A1 | 6/2003 | Bullinger et al. |
| 2003/0137506 | A1 | 7/2003 | Efran et al. |
| 2003/0154261 | A1 | 8/2003 | Doyle et al. |
| 2003/0223499 | A1 | 12/2003 | Routhier et al. |
| 2004/0027452 | A1 | 2/2004 | Yun et al. |
| 2004/0036763 | A1 | 2/2004 | Swift et al. |
| 2004/0041747 | A1 | 3/2004 | Uehara et al. |
| 2004/0109093 | A1 * | 6/2004 | Small-Stryker ............... 348/739 |
| 2004/0141237 | A1 | 7/2004 | Wohlstadter |
| 2004/0164292 | A1 | 8/2004 | Tung et al. |
| 2004/0239231 | A1 | 12/2004 | Miyagawa et al. |
| 2004/0252187 | A1 | 12/2004 | Alden |
| 2005/0073472 | A1 | 4/2005 | Kim et al. |
| 2005/0128353 | A1 * | 6/2005 | Young et al. ................. 348/588 |
| 2005/0237487 | A1 | 10/2005 | Chang |
| 2005/0248561 | A1 | 11/2005 | Ito et al. |
| 2005/0259147 | A1 | 11/2005 | Nam et al. |
| 2006/0050785 | A1 | 3/2006 | Watanabe et al. |
| 2006/0087556 | A1 | 4/2006 | Era |
| 2006/0109242 | A1 | 5/2006 | Simpkins |
| 2006/0139448 | A1 | 6/2006 | Ha et al. |
| 2006/0139490 | A1 | 6/2006 | Fekkes et al. |
| 2006/0244918 | A1 | 11/2006 | Cossairt et al. |
| 2006/0256136 | A1 | 11/2006 | O'Donnell et al. |
| 2006/0256302 | A1 | 11/2006 | Hsu |
| 2006/0271791 | A1 | 11/2006 | Novack et al. |
| 2007/0002041 | A1 | 1/2007 | Kim et al. |
| 2007/0008406 | A1 | 1/2007 | Shestak et al. |
| 2007/0008620 | A1 | 1/2007 | Shestak et al. |
| 2007/0052807 | A1 | 3/2007 | Zhou et al. |
| 2007/0072674 | A1 | 3/2007 | Ohta et al. |
| 2007/0085814 | A1 | 4/2007 | Ijzerman et al. |
| 2007/0096125 | A1 | 5/2007 | Vogel et al. |
| 2007/0097103 | A1 | 5/2007 | Yoshioka et al. |
| 2007/0097208 | A1 | 5/2007 | Takemoto et al. |
| 2007/0139371 | A1 | 6/2007 | Harsham et al. |
| 2007/0146267 | A1 | 6/2007 | Jang et al. |
| 2007/0147827 | A1 | 6/2007 | Sheynman et al. |
| 2007/0153916 | A1 | 7/2007 | Demircin et al. |
| 2007/0162392 | A1 | 7/2007 | McEnroe et al. |
| 2007/0258140 | A1 | 11/2007 | Shestak et al. |
| 2007/0270218 | A1 | 11/2007 | Yoshida et al. |
| 2007/0296874 | A1 * | 12/2007 | Yoshimoto et al. ........... 348/739 |
| 2008/0025390 | A1 | 1/2008 | Shi et al. |
| 2008/0037120 | A1 | 2/2008 | Koo et al. |
| 2008/0043096 | A1 | 2/2008 | Vetro et al. |
| 2008/0043644 | A1 | 2/2008 | Barkley et al. |
| 2008/0068329 | A1 | 3/2008 | Shestak et al. |
| 2008/0133122 | A1 | 6/2008 | Mashitani et al. |
| 2008/0150853 | A1 | 6/2008 | Peng et al. |
| 2008/0165176 | A1 * | 7/2008 | Archer et al. ................. 345/213 |
| 2008/0168129 | A1 | 7/2008 | Robbin et al. |
| 2008/0184301 | A1 | 7/2008 | Boylan et al. |
| 2008/0191964 | A1 | 8/2008 | Spengler |
| 2008/0192112 | A1 | 8/2008 | Hiramatsu et al. |
| 2008/0204550 | A1 | 8/2008 | De Zwart et al. |
| 2008/0246757 | A1 | 10/2008 | Ito |

(56) References Cited

U.S. PATENT DOCUMENTS

| | | |
|---|---|---|
| 2008/0259233 A1 | 10/2008 | Krijn et al. |
| 2008/0273242 A1 | 11/2008 | Woodgate et al. |
| 2008/0284844 A1 | 11/2008 | Woodgate et al. |
| 2008/0303832 A1 | 12/2008 | Kim et al. |
| 2009/0002178 A1 | 1/2009 | Guday et al. |
| 2009/0010264 A1 | 1/2009 | Zhang |
| 2009/0051759 A1 | 2/2009 | Adkins et al. |
| 2009/0052164 A1 | 2/2009 | Kashiwagi et al. |
| 2009/0058845 A1 | 3/2009 | Fukuda et al. |
| 2009/0102915 A1 | 4/2009 | Arsenich |
| 2009/0115783 A1 | 5/2009 | Eichenlaub |
| 2009/0115800 A1 | 5/2009 | Berretty et al. |
| 2009/0133051 A1 | 5/2009 | Hildreth |
| 2009/0138805 A1 | 5/2009 | Hildreth |
| 2009/0141182 A1* | 6/2009 | Miyashita et al. ............ 348/726 |
| 2009/0167639 A1 | 7/2009 | Casner et al. |
| 2009/0174700 A1 | 7/2009 | Daiku |
| 2009/0232202 A1 | 9/2009 | Chen et al. |
| 2009/0238378 A1 | 9/2009 | Kikinis et al. |
| 2009/0244262 A1 | 10/2009 | Masuda et al. |
| 2009/0268816 A1 | 10/2009 | Pandit et al. |
| 2009/0319625 A1 | 12/2009 | Kouhi |
| 2010/0007582 A1* | 1/2010 | Zalewski ........................ 345/8 |
| 2010/0066850 A1 | 3/2010 | Wilson et al. |
| 2010/0070987 A1 | 3/2010 | Amento et al. |
| 2010/0071015 A1 | 3/2010 | Tomioka et al. |
| 2010/0079374 A1 | 4/2010 | Cortenraad et al. |
| 2010/0097525 A1* | 4/2010 | Mino ............................ 348/564 |
| 2010/0107184 A1 | 4/2010 | Shintani |
| 2010/0128112 A1 | 5/2010 | Marti et al. |
| 2010/0135640 A1 | 6/2010 | Zucker et al. |
| 2010/0182407 A1 | 7/2010 | Ko et al. |
| 2010/0208042 A1 | 8/2010 | Ikeda et al. |
| 2010/0215343 A1 | 8/2010 | Ikeda et al. |
| 2010/0218231 A1* | 8/2010 | Frink et al. .................... 725/118 |
| 2010/0225576 A1 | 9/2010 | Morad et al. |
| 2010/0231511 A1 | 9/2010 | Henty et al. |
| 2010/0238274 A1 | 9/2010 | Kim et al. |
| 2010/0238367 A1 | 9/2010 | Montgomery et al. |
| 2010/0245548 A1 | 9/2010 | Sasaki et al. |
| 2010/0272174 A1 | 10/2010 | Toma et al. |
| 2010/0302461 A1 | 12/2010 | Lim et al. |
| 2010/0306800 A1 | 12/2010 | Jung et al. |
| 2010/0309290 A1 | 12/2010 | Myers |
| 2011/0016004 A1 | 1/2011 | Loyall et al. |
| 2011/0043475 A1 | 2/2011 | Rigazio et al. |
| 2011/0050687 A1 | 3/2011 | Alyshev |
| 2011/0063289 A1 | 3/2011 | Gantz |
| 2011/0090233 A1 | 4/2011 | Shahraray et al. |
| 2011/0090413 A1 | 4/2011 | Liou |
| 2011/0093882 A1 | 4/2011 | Candelore et al. |
| 2011/0109964 A1 | 5/2011 | Kim et al. |
| 2011/0113343 A1 | 5/2011 | Trauth |
| 2011/0122944 A1 | 5/2011 | Gupta et al. |
| 2011/0149026 A1 | 6/2011 | Luthra |
| 2011/0157167 A1 | 6/2011 | Bennett et al. |
| 2011/0157168 A1 | 6/2011 | Bennett et al. |
| 2011/0157169 A1 | 6/2011 | Bennett et al. |
| 2011/0157170 A1 | 6/2011 | Bennett et al. |
| 2011/0157172 A1 | 6/2011 | Bennett et al. |
| 2011/0157257 A1 | 6/2011 | Bennett et al. |
| 2011/0157264 A1 | 6/2011 | Seshadri et al. |
| 2011/0157309 A1 | 6/2011 | Bennett et al. |
| 2011/0157315 A1 | 6/2011 | Bennett et al. |
| 2011/0157322 A1 | 6/2011 | Bennett et al. |
| 2011/0157326 A1 | 6/2011 | Karaoguz et al. |
| 2011/0157327 A1 | 6/2011 | Seshadri et al. |
| 2011/0157330 A1 | 6/2011 | Bennett et al. |
| 2011/0157336 A1 | 6/2011 | Bennett et al. |
| 2011/0157339 A1 | 6/2011 | Bennett et al. |
| 2011/0157696 A1 | 6/2011 | Bennett et al. |
| 2011/0157697 A1 | 6/2011 | Bennett et al. |
| 2011/0159929 A1 | 6/2011 | Karaoguz et al. |
| 2011/0161843 A1 | 6/2011 | Bennett et al. |
| 2011/0164034 A1 | 7/2011 | Bennett et al. |
| 2011/0164111 A1 | 7/2011 | Karaoguz et al. |
| 2011/0164115 A1 | 7/2011 | Bennett et al. |
| 2011/0164188 A1 | 7/2011 | Karaoguz et al. |
| 2011/0169913 A1 | 7/2011 | Karaoguz et al. |
| 2011/0169919 A1 | 7/2011 | Karaoguz et al. |
| 2011/0169930 A1 | 7/2011 | Bennett et al. |
| 2011/0199469 A1 | 8/2011 | Gallagher |
| 2011/0234754 A1 | 9/2011 | Newton et al. |
| 2011/0254698 A1 | 10/2011 | Eberl et al. |
| 2011/0268177 A1 | 11/2011 | Tian et al. |
| 2011/0282631 A1 | 11/2011 | Poling et al. |
| 2012/0016917 A1 | 1/2012 | Priddle et al. |
| 2012/0081515 A1 | 4/2012 | Jang |
| 2012/0212414 A1 | 8/2012 | Osterhout et al. |
| 2012/0235900 A1 | 9/2012 | Border et al. |
| 2012/0308208 A1 | 12/2012 | Karaoguz et al. |
| 2013/0127980 A1 | 5/2013 | Haddick et al. |

FOREIGN PATENT DOCUMENTS

| | | | |
|---|---|---|---|
| EP | | 1816510 A1 | 8/2007 |
| EP | | 1993294 A2 | 11/2008 |
| GB | | 2454771 A | 5/2009 |
| JP | WO 2008/126557 A1 * | | 10/2008 |
| TW | | 200938878 A | 9/2009 |
| WO | | 2005/045488 A1 | 5/2005 |
| WO | | 2007/024118 A1 | 3/2007 |
| WO | | 2009/031872 A2 | 3/2009 |
| WO | | 2009/098622 A2 | 8/2009 |

OTHER PUBLICATIONS

Search Report received for European Patent application No. 10015984.7, mailed on May 3, 2011, 3 pages.

IEEE 100 The Authoritative Dictionary of IEEE Standards Terms Seventh Edition, entry for "engine", IEEE, 2000, pp. 349-411.

IEEE 100 The Authoritative Dictionary of IEEE Standards Terms Seventh Edition, entry for "Web page", IEEE, 2000, pp. 1270-1287.

Wikipedia entry on "Scripting language", retrieved on Aug. 16, 2012, 4 pages.

"How browsers work", retrieved from <http://taligarsiel.com/Projects/howbrowserswork1.htm> on Oct. 21, 2010, 54 pages.

Shan, et al., "Principles and Evaluation of Autostereoscopic Photogrammetric Measurement", Photogrammetric Engineering and Remote Sensing, Journal of the American Society for Photogrammetry and Remote Sensing, vol. 72, No. 4, (2006), 8 pages.

Peterka, "Dynallax: Dynamic Parallax Barrier Autostereoscopic Display", Ph.D. Dissertation, University of Illinois at Chicago, (2007), 134 pages.

Yanagisawa, et al., "A Focus Distance Controlled 3DTV", Proc. SPIE 3012, Stereoscopic Displays and Virtual Reality Systems IV, (May 15, 1997), 6 pages.

EPO Communication received for European Patent Application No. 10016055.5, mailed on Apr. 5, 2013, 6 pages.

Yanaka, Kazuhisa "Stereoscopic Display Technique for Web3D Images", SIGGRAPH 2009, New Orleans, Louisiana, Aug. 3-7, 2009, 1 page.

Fono, et al., "EyeWindows: Evaluation of Eye-Controlled Zooming Windows for Focus Selection", CHI 2005, PAPERS: Eyes on Interaction, Portland, Oregon, Apr. 2-7, 2005, pp. 151-160.

Kumar, et al., "Eye Point: Practical Pointing and Selection Using Gaze and Keyboard", CHI 2007, Apr. 28-May 3, 2007, pp. 1-10.

Ko et al., "Facial Feature Tracking and Head Orientation-Based Gaze Tracking", ETRI, 2000, 4 pages.

Ruddarraju et al., "Perceptual User Interfaces using Vision-Based Eye Tracking", ICMI, Nov. 5-7, 2003, 7 pages.

Office Action Received for Chinese Patent Application No. 201010619649.3, mailed on Mar. 31, 2014, 7 pages.

Office Action Received for Chinese Patent Application No. 201010619646.X, mailed on Mar. 5, 2014, 4 pages.

(56) References Cited

OTHER PUBLICATIONS

Office Action Received for Taiwanese Patent Application No. 099147124, mailed on Mar. 31, 2014, 8 pages.

Office Action received for Chinese Patent Application No. 201010619649.3, mailed on Oct. 11, 2014, 5 pages.

"Displaying Stereoscopic 3D (S3D) with Intel HD Graphics Processors for Software Developers", Intel, Aug. 2011, pp. 1-10.

Liao, et al., "The Design and Application of High-Resolution 3D Stereoscopic graphics Display on PC", Purdue University School of Science, 2000, 7 pages.

* cited by examiner

INDEPENDENT VIEWER TAILORING OF SAME MEDIA SOURCE CONTENT VIA A COMMON 2D-3D DISPLAY

CROSS-REFERENCE TO RELATED APPLICATIONS

This application claims the benefit of U.S. Provisional Application No. 61/291,818, filed on Dec. 31, 2009, which is incorporated by reference herein in its entirety.

This application also claims the benefit of U.S. Provisional Application No. 61/303,119, filed on Feb. 10, 2010, which is incorporated by reference herein in its entirety.

This application is also related to the following U.S. patent applications, each of which also claims the benefit of U.S. Provisional Patent Application Nos. 61/291,818 and 61/303,119 and each of which is incorporated by reference herein:

U.S. patent application Ser. No. 12/774,225, filed on May 5, 2010 and entitled "Controlling a Pixel Array to Support an Adaptable Light Manipulator";

U.S. patent application Ser. No. 12/774,307, filed on May 5, 2010 and entitled "Display with Elastic Light Manipulator";

U.S. patent application Ser. No. 12/845,409, filed on Jul. 28, 2010, and entitled "Display with Adaptable Parallax Barrier";

U.S. patent application Ser. No. 12/845,440, filed on Jul. 28, 2010, and entitled "Adaptable Parallax Barrier Supporting Mixed 2D and Stereoscopic 3D Display Regions";

U.S. patent application Ser. No. 12/845,461, filed on Jul. 28, 2010, and entitled "Display Supporting Multiple Simultaneous 3D Views";

U.S. patent application Ser. No. 12/982,020, filed on even date herewith and entitled "Backlighting Array Supporting Adaptable Parallax Barrier";

U.S. patent application Ser. No. 12/982,031, filed on even date herewith and entitled "Coordinated Driving of Adaptable Light Manipulator, Backlighting and Pixel Array in Support of Adaptable 2D and 3D Displays";

U.S. patent application Ser. No. 12/982,078, filed on even date herewith and entitled "Multiple Remote Controllers That Each Simultaneously Controls a Different Visual Presentation of a 2D/3D Display"; and U.S. patent application Ser. No. 12/982,062, filed on even date herewith and entitled "Set-Top Box Circuitry Supporting 2D and 3D Content Reductions to Accommodate Viewing Environment Constraints."

BACKGROUND OF THE INVENTION

1. Field of the Invention

The present invention generally relates to techniques for supporting independent viewer tailoring of same media source content via a common 2D-3D display.

2. Background Art

Images may be generated for display in various forms. For instance, television (TV) is a widely used telecommunication medium for transmitting and displaying images in monochromatic ("black and white") or color form. Conventionally, images are provided in analog form and are displayed by display devices in two-dimensions. More recently, images are being provided in digital form for display in two-dimensions on display devices having improved resolution (e.g., "high definition" or "HD"). Even more recently, images capable of being displayed in three-dimensions are being generated.

Conventional displays may use a variety of techniques to achieve three-dimensional image viewing functionality. For example, various types of glasses have been developed that may be worn by users to view three-dimensional images displayed by a conventional display. Examples of such glasses include glasses that utilize color filters or polarized filters. In each case, the lenses of the glasses pass two-dimensional images of differing perspective to the user's left and right eyes. The images are combined in the visual center of the brain of the user to be perceived as a three-dimensional image. In another example, synchronized left eye, right eye LCD (liquid crystal display) shutter glasses may be used with conventional two-dimensional displays to create a three-dimensional viewing illusion. In still another example, LCD display glasses are being used to display three-dimensional images to a user. The lenses of the LCD display glasses include corresponding displays that provide images of differing perspective to the user's eyes, to be perceived by the user as three-dimensional.

Problems exist with such techniques for viewing three-dimensional images. For instance, persons that use such displays and systems to view three-dimensional images may suffer from headaches, eyestrain, and/or nausea after long exposure. Furthermore, some content, such as two-dimensional text, may be more difficult to read and interpret when displayed three-dimensionally. To address these problems, some manufacturers have created display devices that may be toggled between three-dimensional viewing and two-dimensional viewing. A display device of this type may be switched to a three-dimensional mode for viewing of three-dimensional images, and may be switched to a two-dimensional mode for viewing of two-dimensional images (and/or to provide a respite from the viewing of three-dimensional images).

A parallax barrier is another example of a device that enables images to be displayed in three-dimensions. A parallax barrier includes a layer of material with a series of precision slits. The parallax barrier is placed proximal to a display so that a user's eyes each see a different set of pixels to create a sense of depth through parallax. A disadvantage of parallax barriers is that the viewer must be positioned in a well-defined location in order to experience the three-dimensional effect. If the viewer moves his/her eyes away from this "sweet spot," image flipping and/or exacerbation of the eyestrain, headaches and nausea that may be associated with prolonged three-dimensional image viewing may result. Conventional three-dimensional displays that utilize parallax barriers are also constrained in that the displays must be entirely in a two-dimensional image mode or a three-dimensional image mode at any time.

BRIEF SUMMARY OF THE INVENTION

Methods, systems, and apparatuses are described for supporting independent viewer tailoring of same media source content via a common 2D-3D display as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 16:
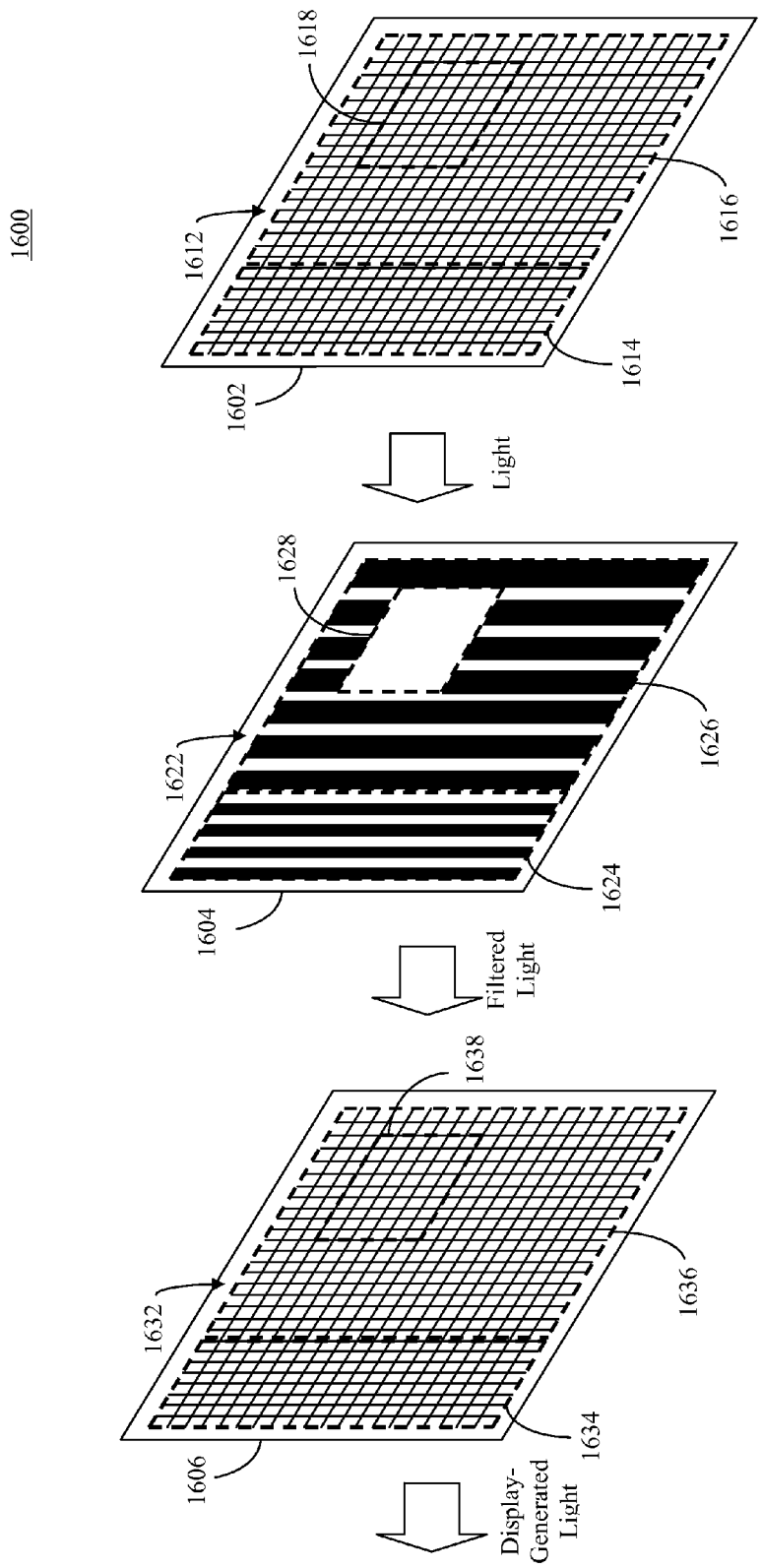

FIG. 16 provides an exploded view of an exemplary display system that utilizes a controllable backlight array to provide regional luminosity control in accordance with an embodiment.

Figure 17:
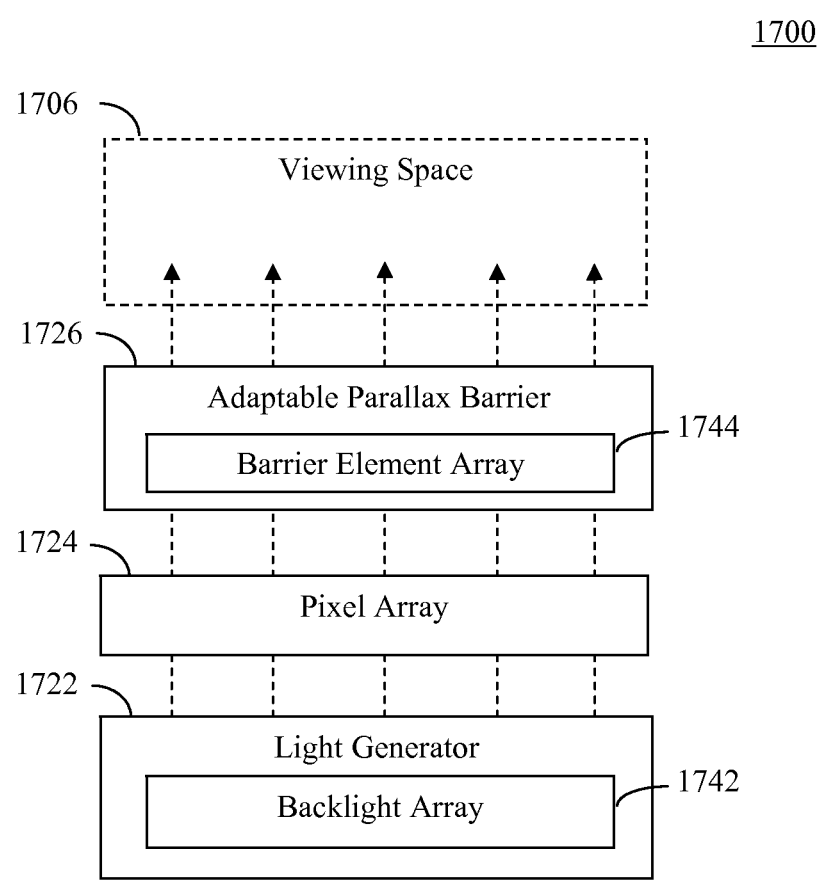

FIG. 17 is a block diagram of an exemplary display system that includes a pixel array disposed between a light generator and an adaptable parallax barrier in accordance with an embodiment.

Figure 18:
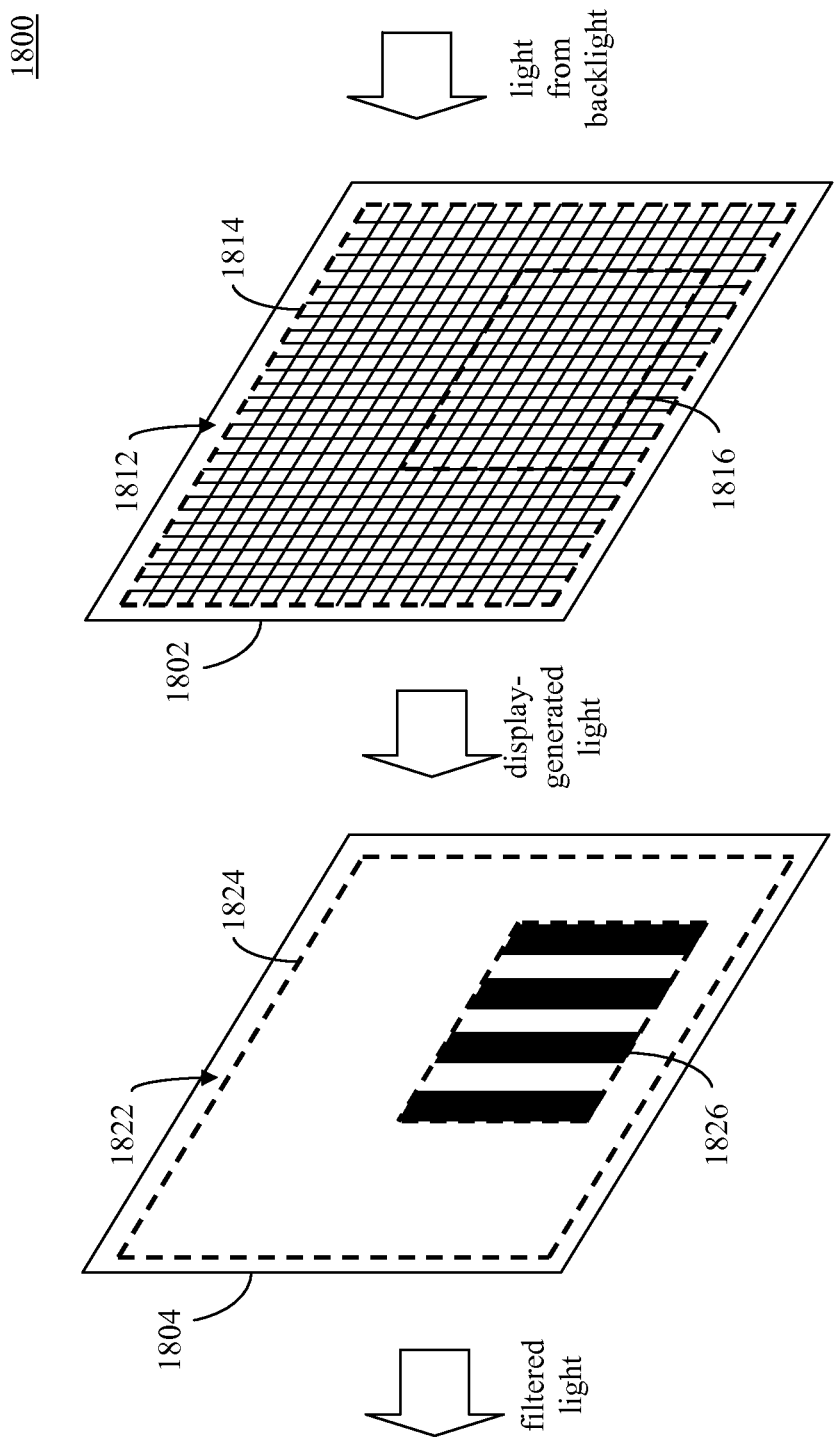

FIG. 18 provides an exploded view of an exemplary display system that implements a regional brightness control scheme based on pixel intensity in accordance with an embodiment.

Figure 19:
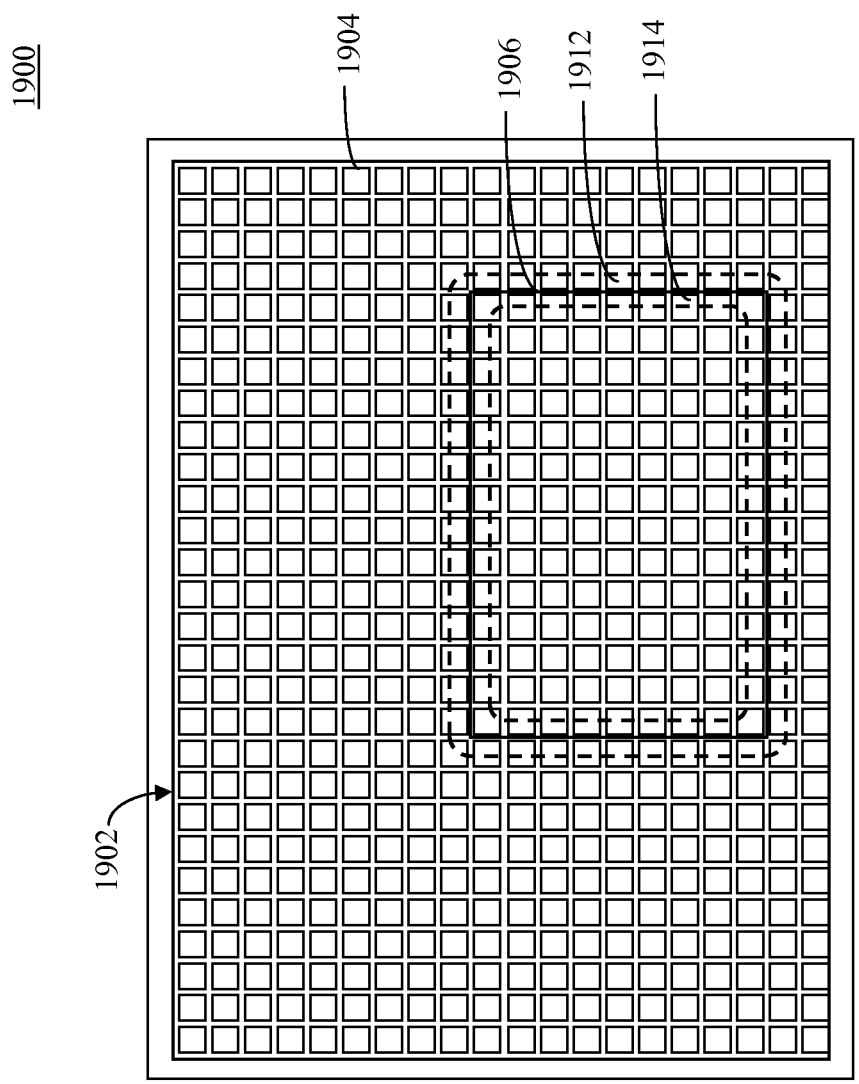

FIG. 19 illustrates a front perspective view of an exemplary display panel of a display system in accordance with an embodiment.

Figure 20:
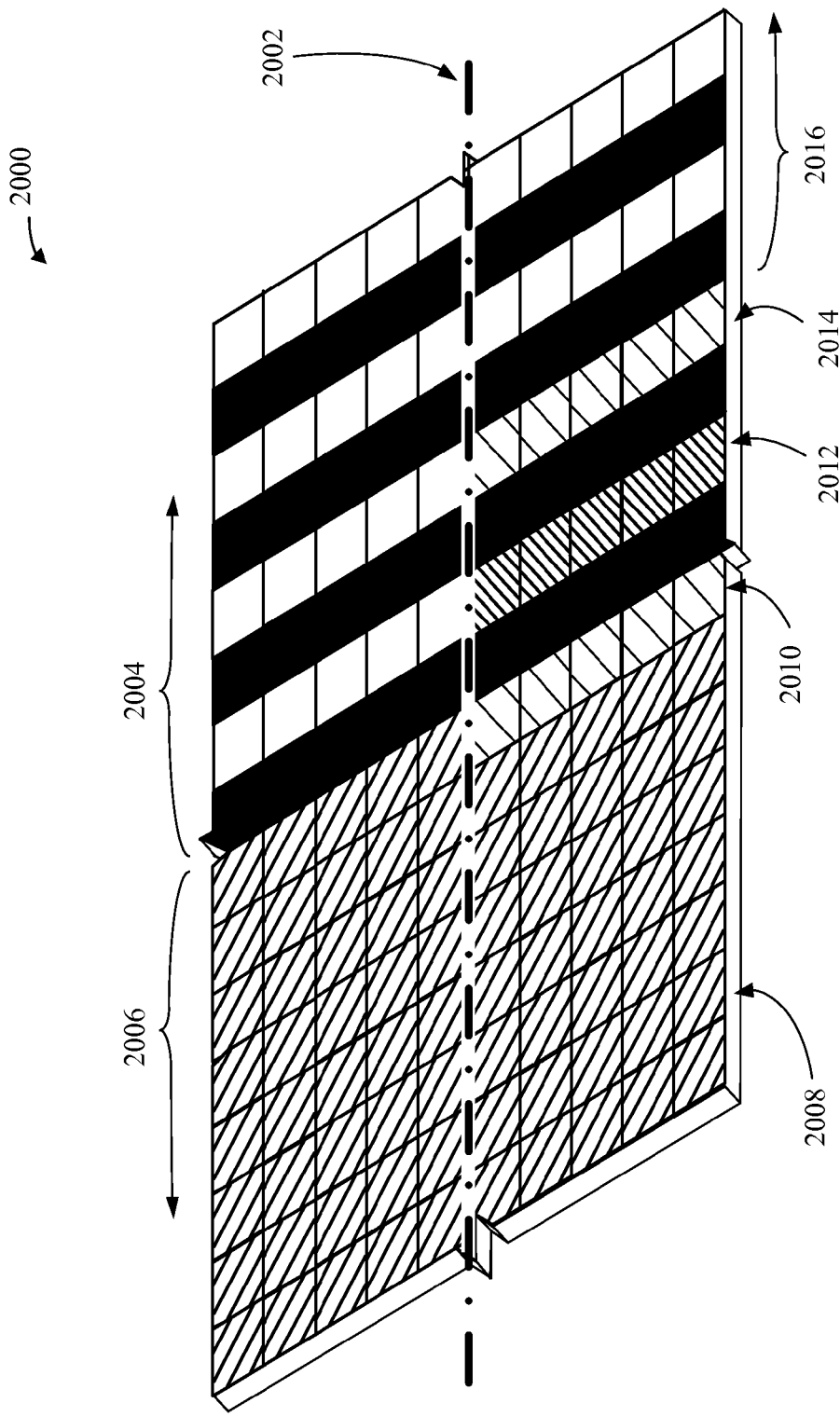

FIG. 20 illustrates two exemplary configurations of an adaptable light manipulator that includes a parallax barrier and a brightness regulation overlay in accordance with an embodiment.

Figure 21:
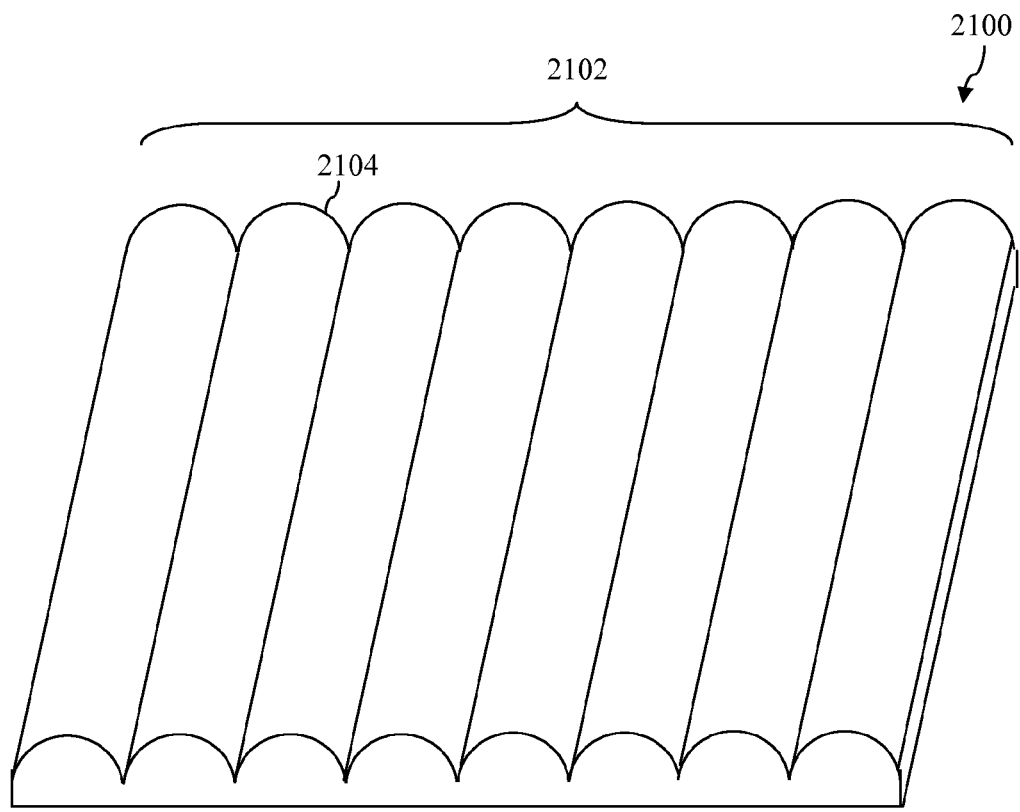

FIG. 21 shows a perspective view of an exemplary adaptable lenticular lens that may be used in a displays system in accordance with an embodiment.

Figure 22:
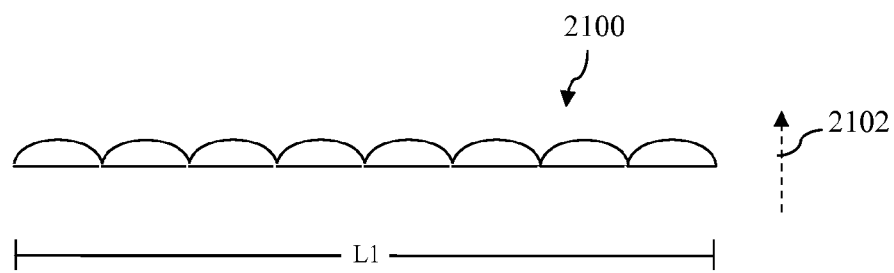

FIG. 22 shows a side view of the adaptable lenticular lens of FIG. 21.

Figure 23:
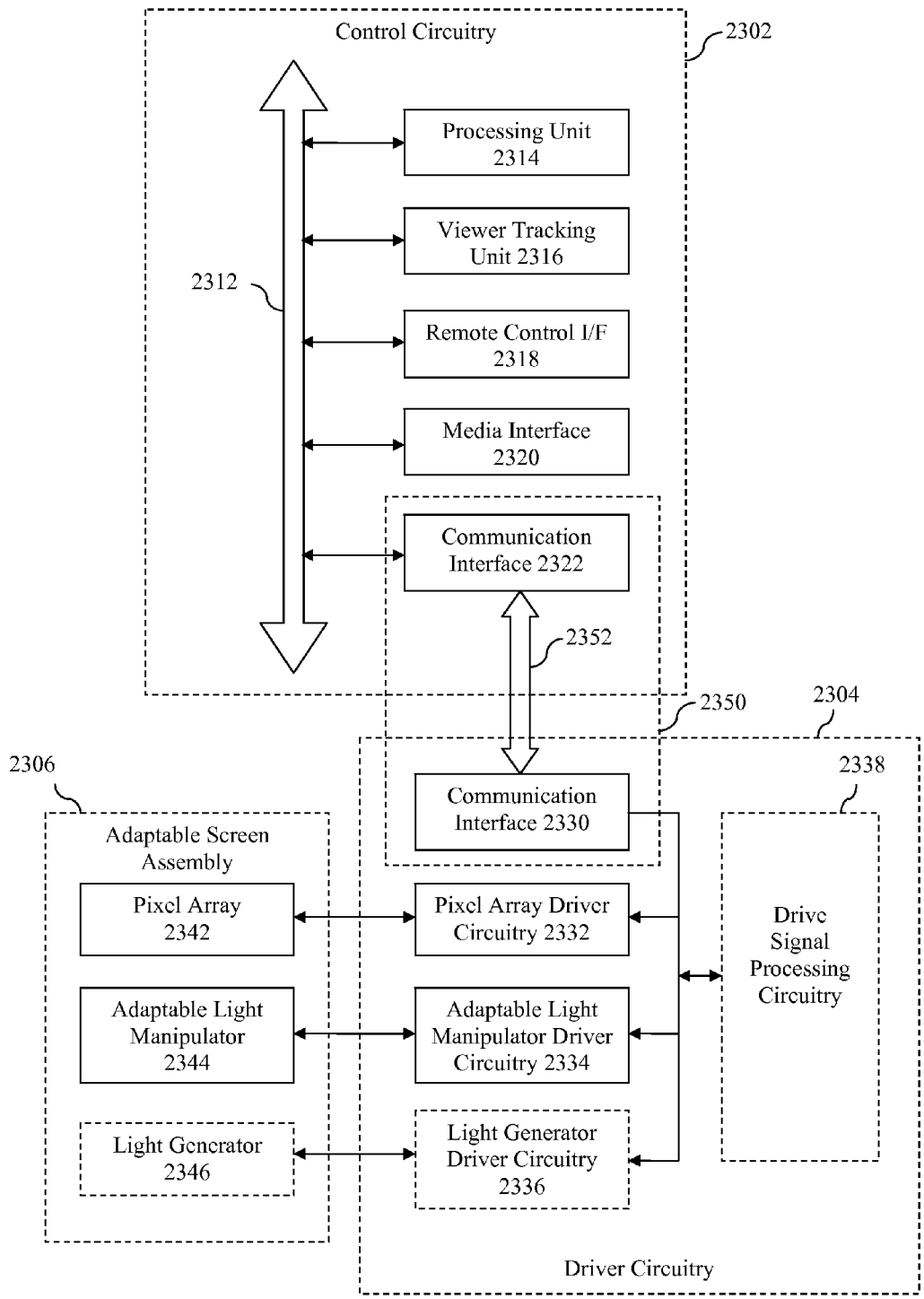

FIG. 23 is a block diagram of an exemplary implementation of a display system that includes an adaptable screen assembly that supports the simultaneous display of multiple visual presentations in accordance with an embodiment.

FIGS. 24, 27, 28, and 30 depict exemplary systems that support independent viewer tailoring of same media source content via a common 2D-3D display in accordance with embodiments.

Figure 25:
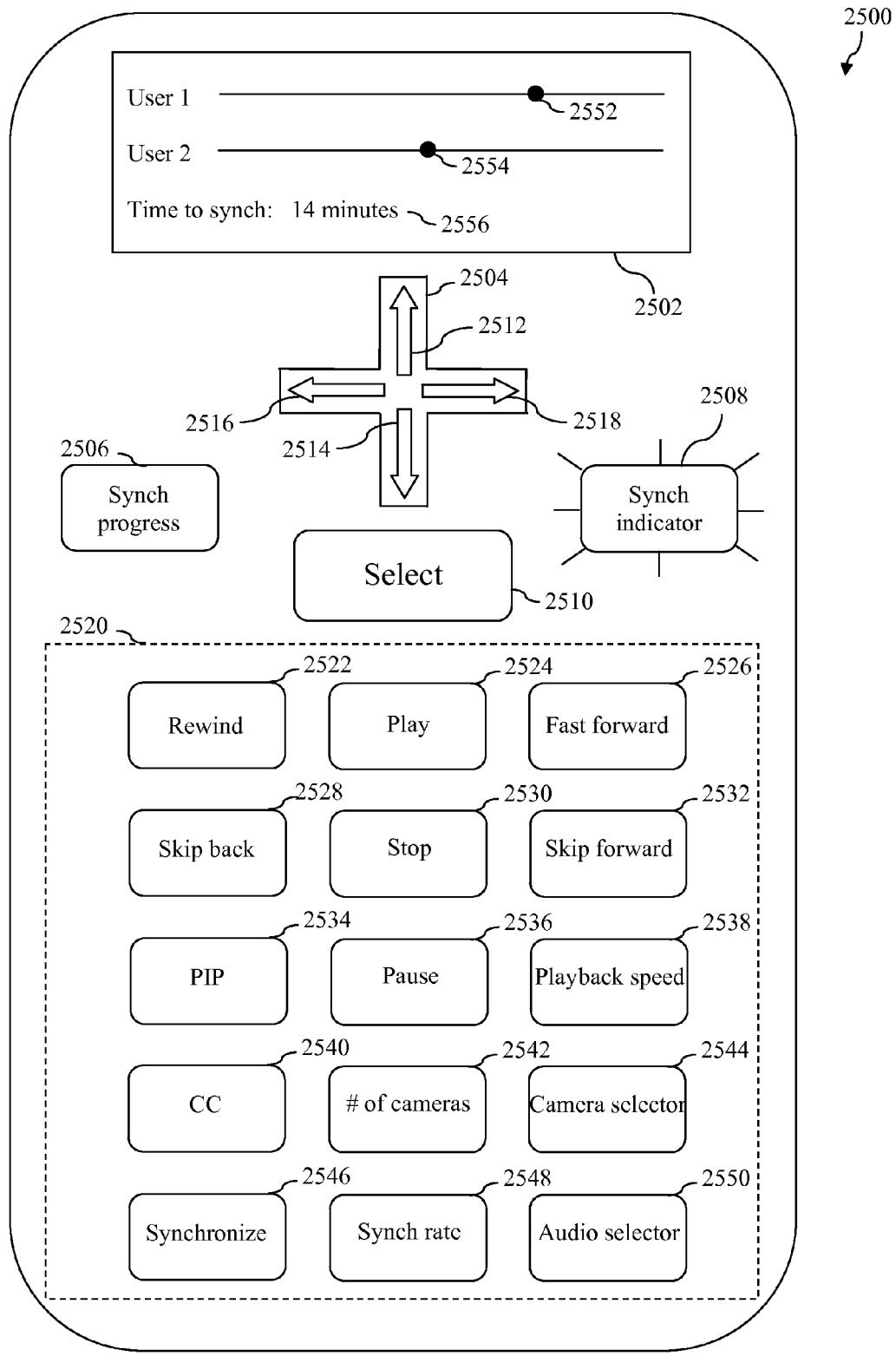

FIG. 25 is an exemplary control system that enables a viewer to independently tailor media content in accordance with an embodiment.

Figure 26:
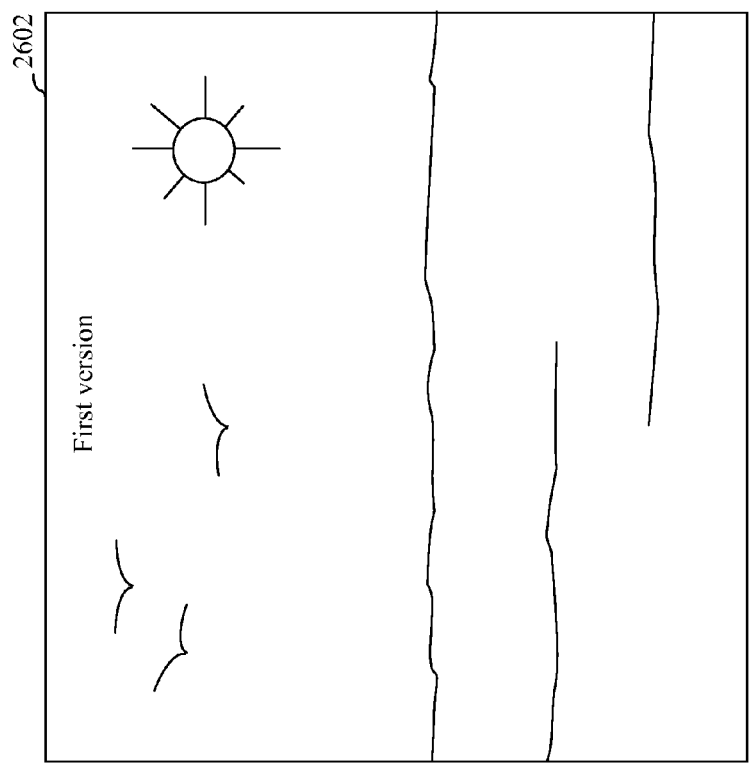
Figure 26:
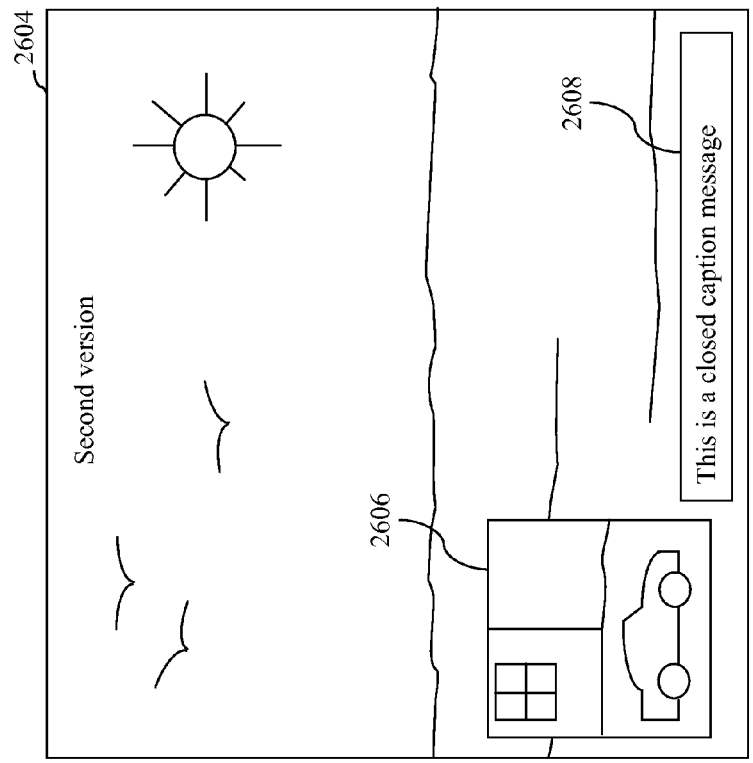

FIG. 26 illustrates first and second versions of video content in accordance with an embodiment.

Figure 29:
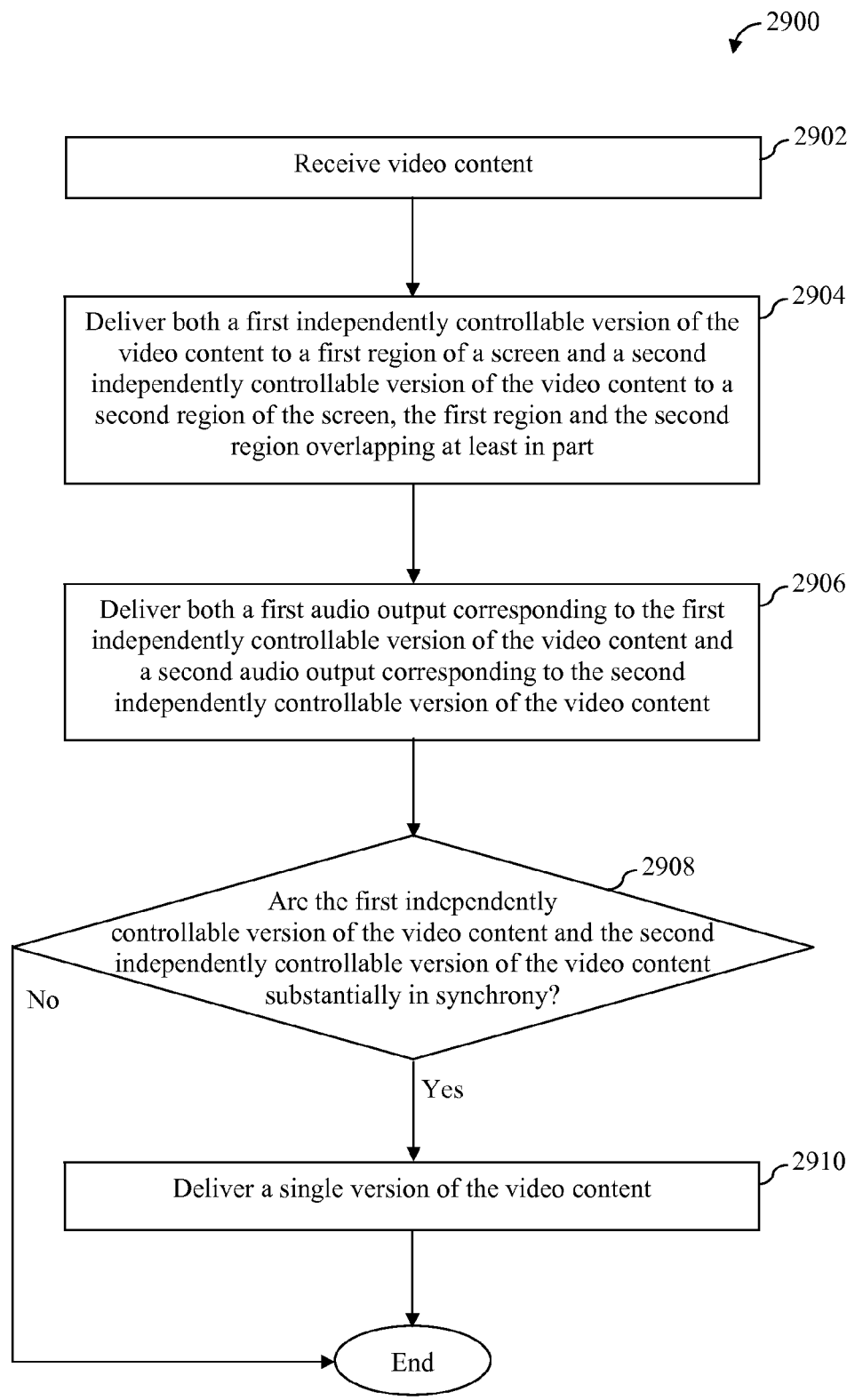
Figure 31:
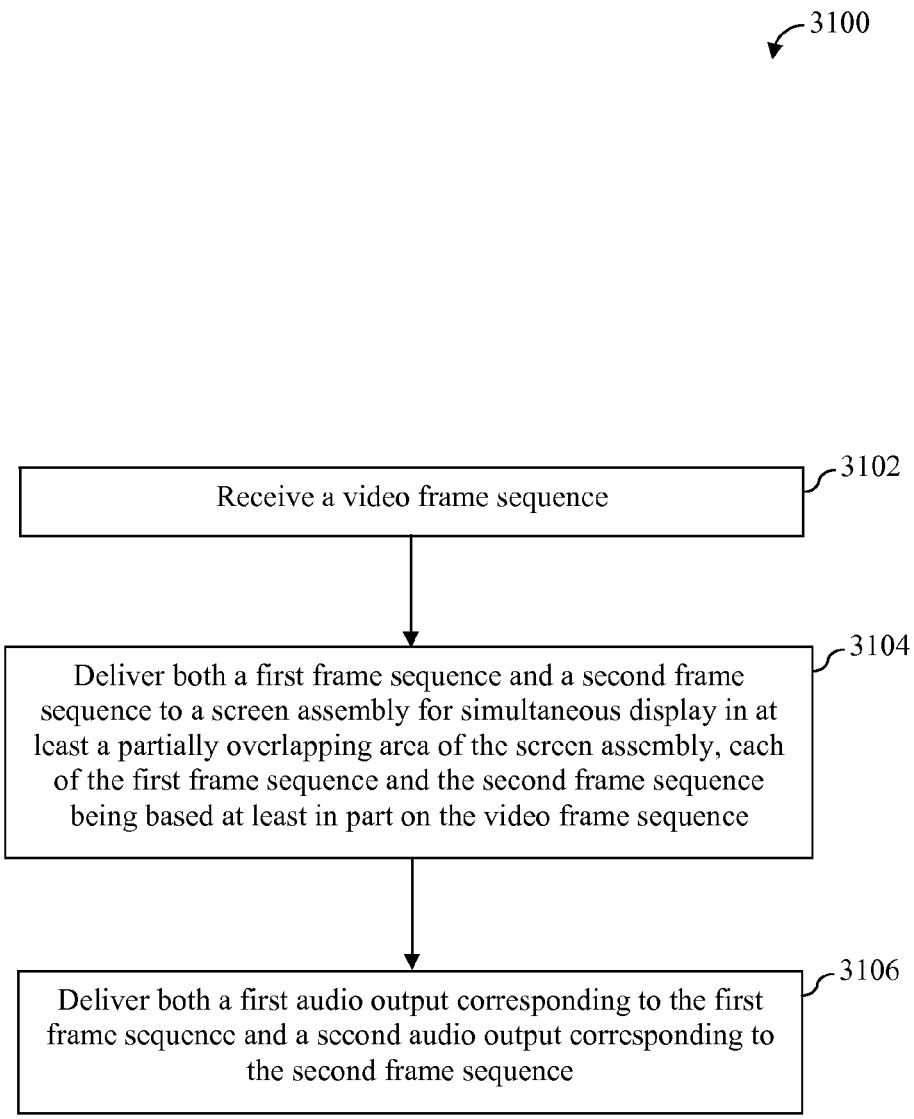
Figure 32:
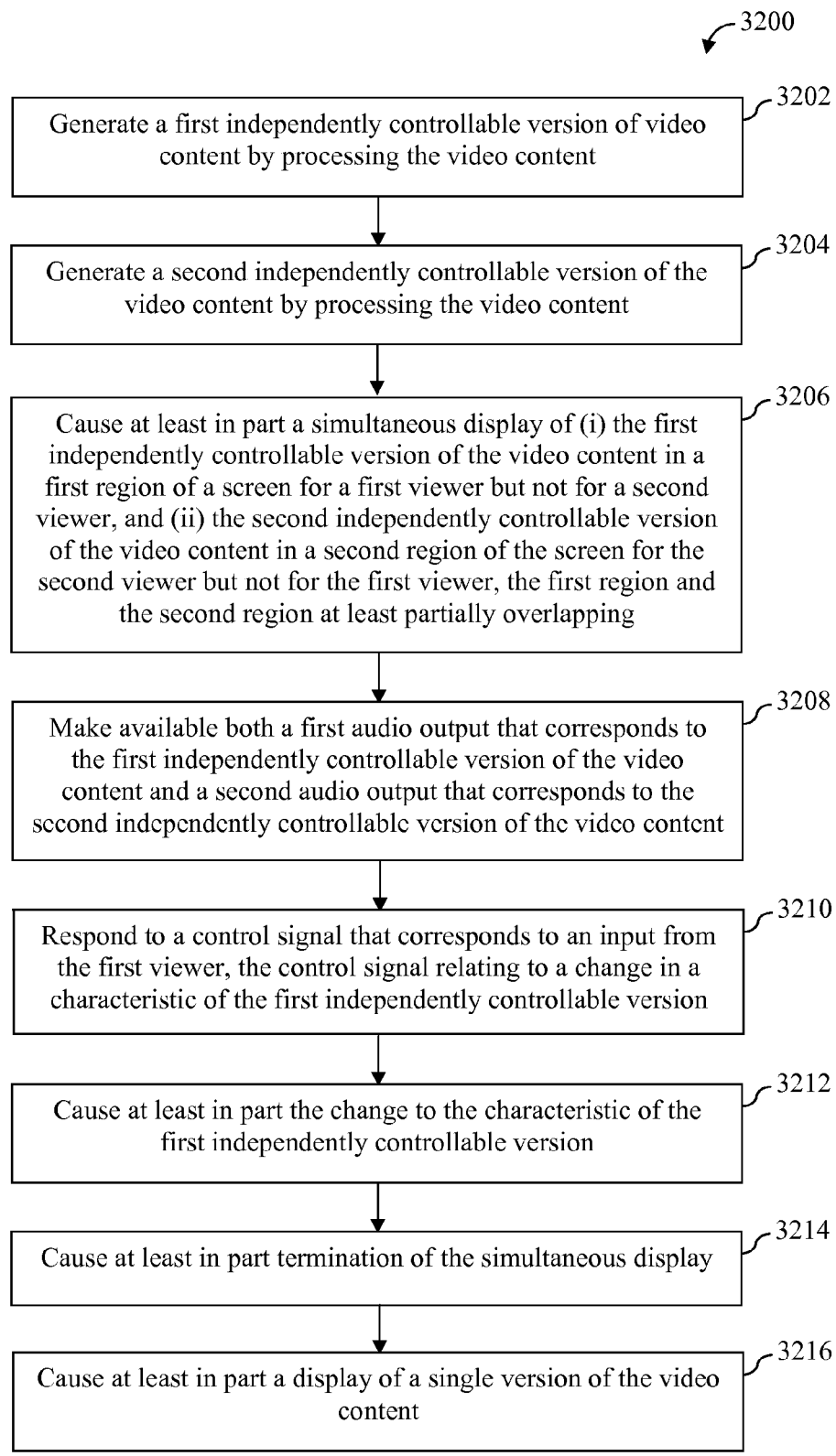

FIGS. 29, 31, and 32 depict flowcharts of exemplary methods for supporting independent viewer tailoring of same media source content via a common 2D-3D display in accordance with embodiments.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

In this document, various references are made to "versions" of video content. It will be recognized that "versions" of video content may include any of the following: (i) two predefined constructs retrieved from one or more media sources; (ii) a first predefined construct from a media source that is delivered for a first viewer, and a time offset redisplay of such same construct that is delivered for a second viewer; (iii) a first predefined media construct from a media source and two time offset redisplays—one for each viewer; (iii) a first predefined construct from a media source that is delivered for a first viewer, and a "reconfigured" (e.g., transcoded, resolution reduced, 3Dx-n reduced, etc.) construct that is delivered for a second viewer; (iv) a first predefined construct from a media source that is reconfigured differently twice for a first and a second viewer; or (v) supplemental video content integrated within or sent with each version.

Techniques for supporting independent viewer tailoring of same media source content via a common 2D-3D display are described herein. In some embodiments, a first independently controllable version of video content is delivered to a first region of a screen, and a second independently controllable version of the video content is delivered to a second region of the screen. The first region and the second region overlap at least in part. The delivery supports simultaneous display by the screen of both the first independently controllable version of the video content for a first viewer but not a second viewer and the second independently controllable version of the video content for the second viewer but not the first viewer.

In other embodiments, both a first frame sequence and a second frame sequence are delivered to a screen assembly for simultaneous display in at least a partially overlapping area of the screen assembly. The first frame sequence is delivered to produce a first visual presentation for the first viewer but not for the second viewer. The second frame sequence is delivered to produce a second visual presentation for the second viewer but not for the first viewer. Each of the first frame sequence and the second frame sequence is based at least in part on the video frame sequence.

In yet other embodiments, at least in part a simultaneous display of (i) a first independently controllable version of video content in a first region of a screen for a first viewer but not for a second viewer, and (ii) a second independently controllable version of the video content in a second region of the screen for the second viewer but not for the first viewer are caused. The first region and the second region at least partially overlap. At least in part a change to a characteristic of the first independently controllable version is caused.

Figure 1A:
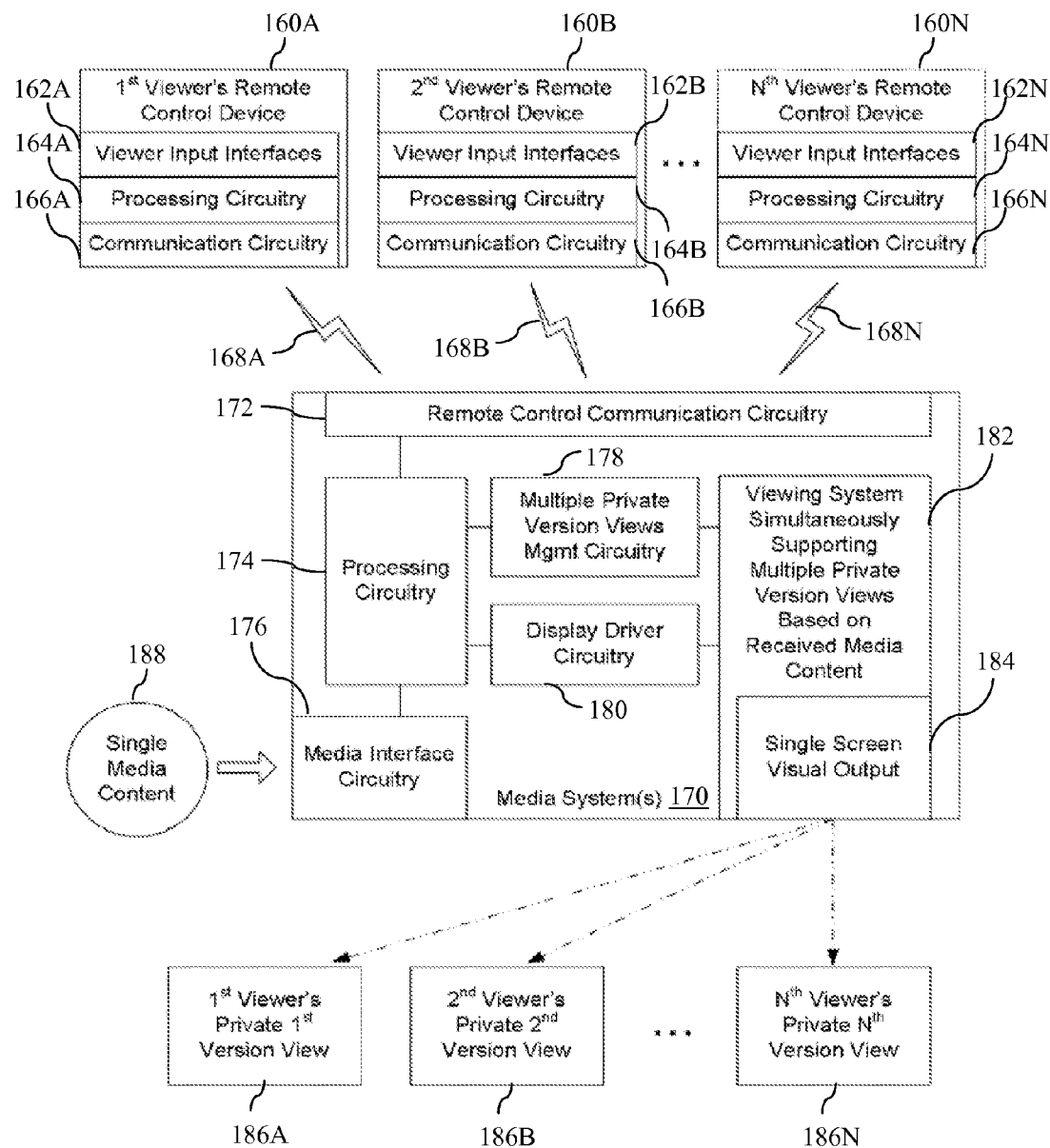
FIG. 1A is a block diagram of an exemplary system that supports delivery of multiple private view versions of single media content to respective viewers in accordance with an embodiment.

II. Exemplary Display Systems that Support Simultaneous Visual Presentations Observable by Different Viewers FIG. 1A is a block diagram of an exemplary system 100 that supports delivery of multiple private version views of single media content to respective viewers in accordance with an embodiment. A private version view is a view that is intended to be viewed by specified viewer(s) but not by other viewer(s). As shown in FIG. 1A, system 100 includes remote control devices 160A-160N and media system(s) 170. Remote control devices 160A-160N are used by the respective viewers to control respective private version views 186A-186N of single media content 188. Remote control devices 160A-160N include respective viewer input interfaces 162A-162N, respective processing circuitry 164A-164N, and respective communication circuitry 166A-166N.

Viewer input interfaces 162A-162N enable the respective viewers to provide input for controlling characteristics of the respective private version views 186A-186N. A characteristic may be a visual characteristic, a playback characteristic, or any other suitable type of characteristic. Examples of a visual characteristic include but are not limited to brightness, contrast, resolution, colorization, and a size of a screen region to which a private version view is delivered. Screen regions and visual characteristics thereof are described in greater detail below with reference to FIGS. 24 and 27, for example. A playback characteristic indicates a manner in which a private version view is played back. Further detail regarding an exemplary remote control that enables viewer(s) to control playback characteristics of video content is provided below with reference to FIG. 25.

Processing circuitry 164A-164N generate respective input signals 168A-168N that are based on the respective inputs from the viewers. Communication circuitry 166A-166N deliver the respective input signals 168A-168N to media system(s) 170 for processing. The input signals 168A-168N may be provided via any suitable wired or wireless mechanism or communication pathway, including but not limited to a Bluetooth® pathway, an Institute of Electrical and Electronics Engineers® (IEEE) 802.11 pathway, a Digital Enhanced Cordless Telecommunications (DECT) pathway, etc.

Some exemplary remote control device implementations for independently controlling multiple private version views that are simultaneously displayed by a screen assembly are described in commonly-owned, co-pending U.S. patent application Ser. No. 12/982,078, filed on even date herewith and entitled "Multiple Remote Controllers That Each Simultaneously Controls a Different Visual Presentation of a 2D/3D Display," the entirety of which is incorporated by reference herein. It will be recognized that remote control devices 160A-160N are shown in FIG. 1A for illustrative purposes and are not intended to be limiting. For instance, the functionality of remote control devices 160A-160N described above may instead be incorporated in respective smart phones, traditional computer input devices such as keyboards or mice, touch pads, gamepads or other type of gaming console input devices, etc.

Media system(s) 170 include remote control communication circuitry 172, processing circuitry 174, media interface circuitry 176, management circuitry 178, display driver circuitry 180, and a viewing system 182. Remote control communication circuitry 172 receives the input signals 168A-168N from respective remote control devices 160A-160N. For instance, remote control communication circuitry 172 may decode the input signals 168A-168N for further processing by processing circuitry 174.

Media interface circuitry 176 receives the single media content 188 from a media source. Processing circuitry 174 processes the single media content 188 based on the input signals 168A-168N that are received via remote control communication circuitry 172 to provide respective private version views 186A-186N of the single media content 188. For instance, processing circuitry 174 generates the first private version view 186A in accordance with the first input signal 168A; processing circuitry 174 generates the second private version view 186B in accordance with the second input signal 168B, and so on. Processing circuitry 174 further generates control signals for controlling display driver circuitry 180 based on the input signals 168A-168N.

Management circuitry 178 associates the private version views 186A-186N with the respective viewers to whom the private version views 186A-186N are to be presented. Display driver circuitry 180 provides driver control signals for controlling characteristics of portions of viewing system 182 with which the respective viewers are associated basd on the control signals that are received from processing circuitry 174. For instance, each viewer may be associated with respective shuttering eyewear and/or a respective portion of an adaptable light manipulating screen assembly. Viewing system 182 supports simultaneous presentation of the private version views 186A-188N toward the respective viewers via a single screen visual output 184 based on the driver control signals that are received from display driver circuitry 180.

Figure 1B:
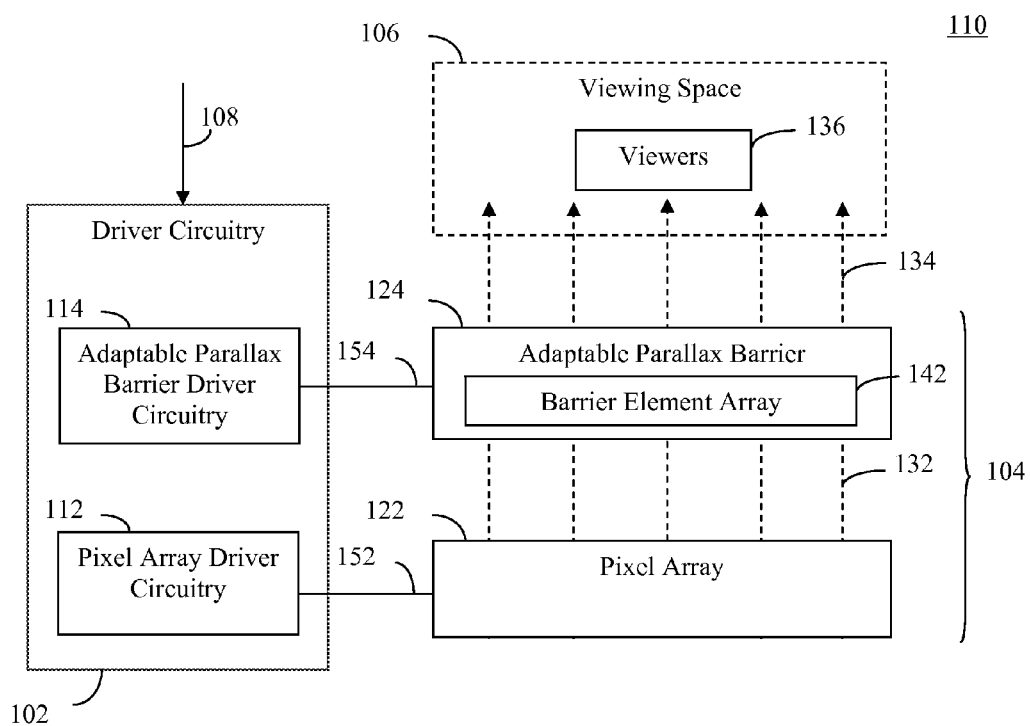
FIG. 1B is a block diagram of an exemplary implementation of a viewing system shown in FIG. 1A, including a screen assembly that utilizes an adaptable parallax barrier to support the simultaneous display of multiple simultaneous visual presentations, in accordance with an embodiment.

As mentioned above, viewing system 182 may include an adaptable light manipulating screen assembly. For instance, FIG. 1B is a block diagram of a viewing system 110, which is an exemplary implementation of viewing system 182 of FIG. 1A, including a screen assembly 104 that utilizes an adaptable parallax barrier to support the simultaneous display of multiple visual presentations (e.g., multiple private version views), in accordance with an embodiment. Viewing system 110 is shown to include driver circuitry 102, which is an exemplary implementation of display driver circuitry 180, for illustrative purposes and is not intended to be limiting. As shown in FIG. 1B, viewing system 110 includes the aforementioned driver circuitry 102 and screen assembly 104, wherein screen assembly 104 includes a pixel array 122 and an adaptable parallax barrier 124. As further shown in FIG. 1B, driver circuitry 102 includes pixel array driver circuitry 112 and adaptable parallax barrier driver circuitry 114.

Pixel array 122 comprises a two-dimensional array of pixels (e.g., arranged as a grid or other distribution) that operates to emit light 132. Pixel array 122 may comprise a self-illuminating or light-generating pixel array such that the pixels of pixel array 122 each emit light included in light 132. Alternatively, each pixel in pixel array 122 may operate to selectively pass light emitted by a backlighting source (not shown in FIG. 1B) to produce light 132. Each pixel of pixel array 122 may be individually controllable to vary color and intensity. In an embodiment, each pixel of pixel array 122 may include a plurality of sub-pixels that correspond to separate color channels, such as a trio of red, green, and blue sub-pixels included in each pixel.

Adaptable parallax barrier 124 is positioned proximate to a surface of pixel array 122. Barrier element array 142 is a layer of adaptable parallax barrier 124 that includes a plurality of barrier elements or blocking regions arranged in an array. Each barrier element of the array is configured to be selectively opaque or transparent. Combinations of barrier elements may be configured to be selectively opaque or transparent to enable various effects. For example, the states of the barrier elements of barrier element array 142 may be configured such that light 132 emanating from pixel array 122 is filtered to produce filtered light 134, wherein filtered light 134 includes one or more two-dimensional and/or three-dimensional images that may be viewed by viewers 136 in a viewing space 106.

Depending upon the implementation, each barrier element may have a round, square, or rectangular shape, and barrier element array 142 may have any number of rows of barrier elements that extend a vertical length of barrier element array 142. In another embodiment, each barrier element may have a "band" shape that extends a vertical length of barrier element array 142, such that barrier element array 142 includes a single horizontal row of barrier elements. Each barrier element may include one or more of such bands, and different regions of barrier element array 142 may include barrier elements that include different numbers of such bands.

It is noted that in some embodiments, barrier elements may be capable of being completely transparent or opaque, and in other embodiments, barrier elements may not be capable of being fully transparent or opaque. For instance, such barrier elements may be capable of being 95% transparent when considered to be "transparent" and may be capable of being 5% transparent when considered to be "opaque." "Transparent" and "opaque" as used herein are intended to encompass barrier elements being substantially transparent (e.g., greater than 75% transparent, including completely transparent) and substantially opaque (e.g., less than 25% transparent, including completely opaque), respectively.

Driver circuitry 102 receives control signals 108 from control circuitry (not shown in FIG. 1B). The control signals 108 cause driver circuitry 102 to place screen assembly 104 in a selected one of a plurality of different viewing configurations. In particular, based on control signals 108, adaptable parallax barrier driver circuitry 114 transmits drive signals 154 that cause barrier element array 142 to be placed in a state that supports the selected viewing configuration. The selected viewing configuration may be a particular two-dimensional viewing configuration, a particular three-dimensional viewing configuration, or a viewing configuration that supports the simultaneous display of different types of two-dimensional and/or three-dimensional content.

Viewing system 110 is merely one exemplary implementation that includes an adaptable light manipulating screen assembly. Other exemplary implementations that include an adaptable light manipulating screen assembly are described in detail below with reference to FIGS. 2-23.

Figure 1C:
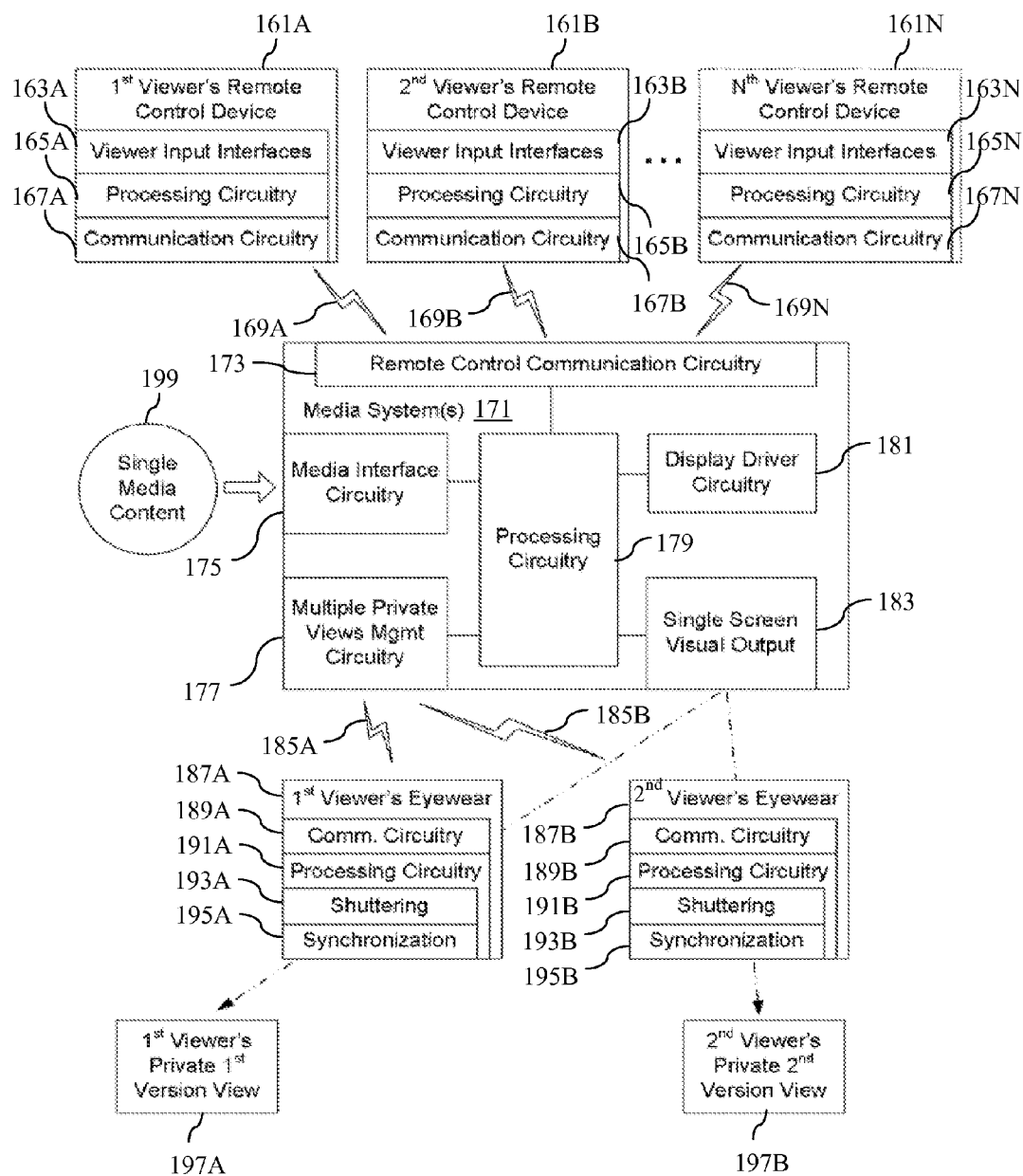
FIG. 1C is a block diagram of an exemplary system in which shuttering eyewear support delivery of multiple private version views of single media content in accordance with an embodiment.

FIG. 1C is a block diagram of an exemplary system 120 in which shuttering eyewear support delivery of multiple private version views of single media content in accordance with an embodiment. As shown in FIG. 1C, system 120 includes remote control devices 161A-161N and media system(s) 171. Remote control devices 161A-161N are used by the respective viewers to control respective private version views 197A-197N of single media content 199. Remote control devices 161A-161N include respective viewer input interfaces 163A-163N, respective processing circuitry 165A-165N, and respective communication circuitry 167A-167N, which operate in like manner to viewer input interfaces 162A-162N, processing circuitry 164A-164N, and communication circuitry 166A-166N described above with reference to FIG. 1A. For example, communication circuitry 167A-167N deliver input signals 169A-169N that are generated by processing circuitry 165A-165N based on respective viewer inputs that are received via viewer input interfaces 163A-163N.

The input signals 169A-169N may be provided via any suitable wired or wireless mechanism or communication pathway, including but not limited to a Bluetooth® pathway, an Institute of Electrical and Electronics Engineers® (IEEE) 802.11 pathway, a Digital Enhanced Cordless Telecommunications (DECT) pathway, etc.

Media system(s) 171 include remote control communication circuitry 173, media interface circuitry 175, management circuitry 177, processing circuitry 179, and display driver circuitry 181. Remote control communication circuitry 173 receives the input signals 169A-169N from respective remote control devices 161A-161N. For instance, remote control communication circuitry 173 may decode the input signals 169A-169N for further processing by processing circuitry 179.

Media interface circuitry 175 receives the single media content 199 from a media source. Processing circuitry 179 processes the single media content 199 based on the input signals 169A-169N that are received via remote control communication circuitry 173 to provide respective private version views (e.g., private version views 197A and 197B) of the single media content 199. For instance, processing circuitry 179 generates the first private version view 197A in accordance with the first input signal 169A and the second private version view 197B in accordance with the second input signal 169B. Processing circuitry 179 further generates control signals for controlling display driver circuitry 181 based on the input signals 169A-169N.

Management circuitry 177 associates the private version views 197A and 197B with the respective first and second viewers to whom the private version views 197A and 197B are to be presented. Management circuitry 177 provides information 185A and 185B regarding the respective private version views 197A and 197B to the respective first and second viewers' eyewear 187A and 187B. For instance, information 185A may include shuttering information for enabling first viewer's eyewear 187A to present the first private version view 197A and not the second private version view 197B. Information 185B may include shuttering information for enabling second viewer's eyewear 187B to present the second private version view 197B and not the first private version view 197A.

Display driver circuitry 181 provides driver control signals for controlling a screen to display the first and second private version views 197A and 197B toward the first viewer's eyewear 187A and the second viewer's eyewear 187B via a single screen visual output 183.

The first and second viewers' eyewear 187A and 187B include respective communication circuitry 189A and 189B, respective processing circuitry 191A and 191B, respective shuttering circuitry 193A and 193B, and respective synchronization circuitry 195A and 195B. Communication circuitry 189A and 189B receive respective information 185A and 185B from management circuitry 177. Processing circuitry 191A generates first control signals for controlling shuttering circuitry 193A to pass the first private version view 197A but not the second private version view 197B based on the information 185A. Processing circuitry 191B generates second control signals for controlling shuttering circuitry 193B to pass the second private version view 197B but not the first private version view 197A based on the information 185B.

Shuttering circuitry 193A performs shuttering by switching one or more lenses (not shown) of the first viewer's eyewear 187A between a substantially transparent state and a substantially opaque state based on the first control signals to pass the first private version view 197A but not the second private version view 197B. Shuttering circuitry 193B performs shuttering by switching one or more lenses (not shown) of the second viewer's eyewear 187B between a substantially transparent state and a substantially opaque state based on the second control signals to pass the second private version view 197B but not the first private version view 197A. Synchronization circuitry 195A synchronizes the shuttering that is performed by shuttering circuitry 193A with a frame rate of the first private version view 197A. Synchronization circuitry 195B synchronizes the shuttering that is performed by shuttering circuitry 195B with a frame rate of the second private version view 197B.

Some exemplary display systems that include light manipulating screen assemblies for supporting simultaneous delivery of multiple private version views of single media content to respective viewers will now be described in subsections II.A. and II.B. These exemplary display systems are provided for illustrative purposes and are not intended to be limiting.

A. Exemplary Screen Assemblies Including Adaptable Parallax Barriers

Figure 2:
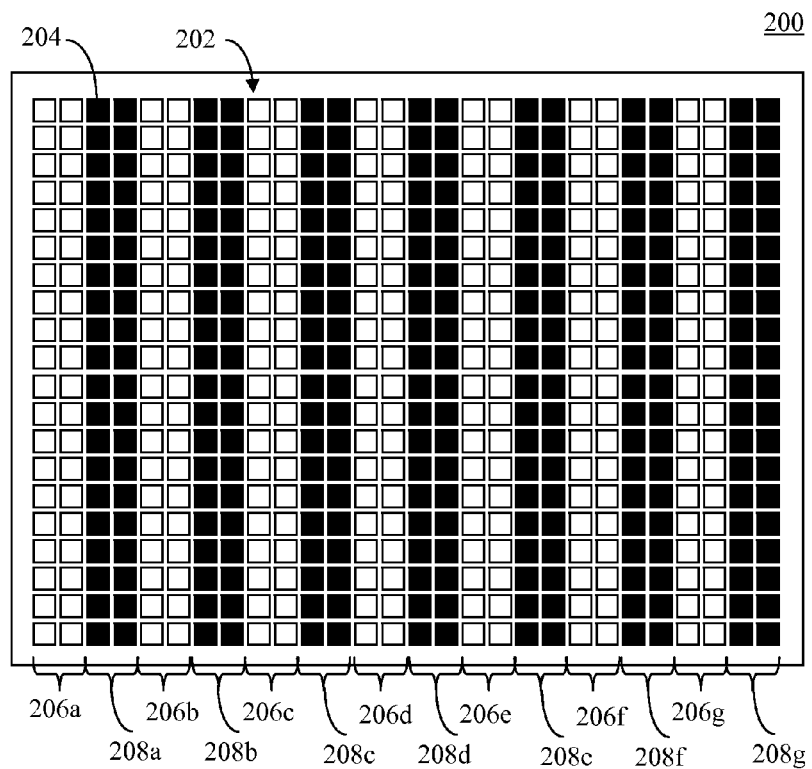
FIG. 2 illustrates an exemplary arrangement of an adaptable parallax barrier in accordance with an embodiment that supports a particular three-dimensional viewing configuration.

FIG. 2 shows an exemplary arrangement of an adaptable parallax barrier 200 that supports a particular three-dimensional viewing configuration. Adaptable parallax barrier 200 is an example of adaptable parallax barrier 124 of FIG. 1B. As shown in FIG. 2, adaptable parallax barrier 200 includes a barrier element array 202, which includes a plurality of barrier elements 204 arranged in a two-dimensional array. Furthermore, as shown in FIG. 2, barrier element array 202 includes a plurality of parallel strips of barrier elements 204 that are selected to be non-blocking to form a plurality of parallel non-blocking strips (or "slits") 206a-206g. As shown in FIG. 2, parallel non-blocking strips 206a-206g (non-blocking slits) are alternated with parallel blocking strips 208a-208g of barrier elements 204 that are selected to be blocking. In the example of FIG. 2, non-blocking strips 206a-206g and blocking strips 208a-208g each have a width (along the x-dimension) of two barrier elements 204, and have lengths that extend along the entire y-dimension (twenty barrier elements 204) of barrier element array 202, although in other embodiments, may have alternative dimensions. Non-blocking strips 206a-206g and blocking strips 208a-208g form a parallax barrier configuration for adaptable parallax barrier 200. The spacing (and number) of parallel non-blocking strips 206 in barrier element array 202 may be selectable by choosing any number and combination of particular strips of barrier elements 204 in barrier element array 202 to be non-blocking, to be alternated with blocking strips 208, as desired. For example, hundreds, thousands, or even larger numbers of non-blocking strips 206 and blocking strips 208 may be present in adaptable parallax barrier 200.

Figure 3:
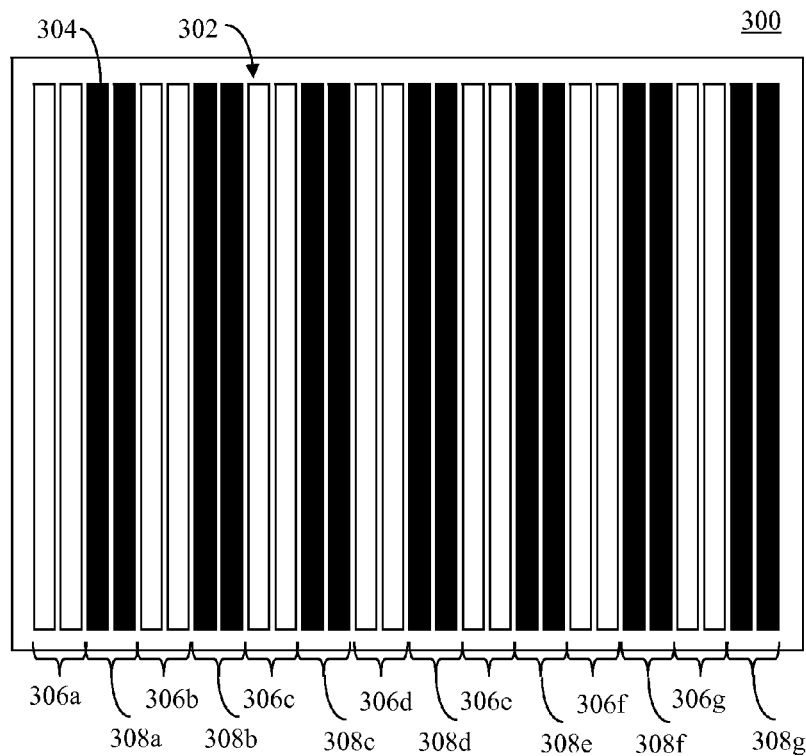
FIG. 3 illustrates an exemplary arrangement of an adaptable parallax barrier in accordance with an alternate embodiment that supports a particular three-dimensional viewing configuration.

FIG. 3 shows an alternative example of an adaptable parallax barrier 300 that has also been configured to support a particular three-dimensional viewing configuration. Similarly to adaptable parallax barrier 200 of FIG. 2, adaptable parallax barrier 300 includes a barrier element array 302, which includes a plurality of barrier elements 304 arranged in a two-dimensional array (28×1 array). Barrier elements 304 have widths (along the x-dimension) similar to the widths of barrier elements 204 in FIG. 2, but have lengths that extend along the entire vertical length (y-dimension) of barrier element array 302. As shown in FIG. 3, barrier element array 302 includes parallel non-blocking strips 306a-306g alternated with parallel blocking strips 308a-308g. In the example of FIG. 3, parallel non-blocking strips 306a-306g and parallel blocking strips 308a-308g each have a width (along the x-dimension) of two barrier elements 304, and have lengths that extend along the entire y-dimension (one barrier element 304) of barrier element array 302.

Each of adaptable parallax barriers 200 and 300, configured in the manner shown in FIGS. 2 and 3 respectively, filter light produced or passed by a pixel array to form one or more three-dimensional views in a viewing space, thus supporting a three-dimensional viewing configuration. To achieve a two-dimensional viewing configuration, all of the barrier elements of either adaptable parallax barrier 200 or 300 can simply be placed in a non-blocking state. Additional details concerning how the adaptable parallax barriers operate to support such three-dimensional viewing may be found, for example, in commonly-owned, co-pending U.S. patent application Ser. No. 12/845,409, filed on Jul. 28, 2010, and entitled "Display with Adaptable Parallax Barrier," the entirety of which is incorporated by reference herein.

In the adaptable parallax barrier configurations shown in FIGS. 2 and 3, the entirety of the barrier element array is filled with parallel non-blocking strips to support three-dimensional viewing. In further embodiments, one or more regions of an adaptable parallax barrier may be filled with parallel non-blocking strips to deliver three-dimensional images, and one or more other regions of the adaptable parallax barrier may be rendered transparent to deliver two-dimensional images. Thus, a viewing configuration that mixes two-dimensional and three-dimensional viewing regions may be supported.

Figure 4:
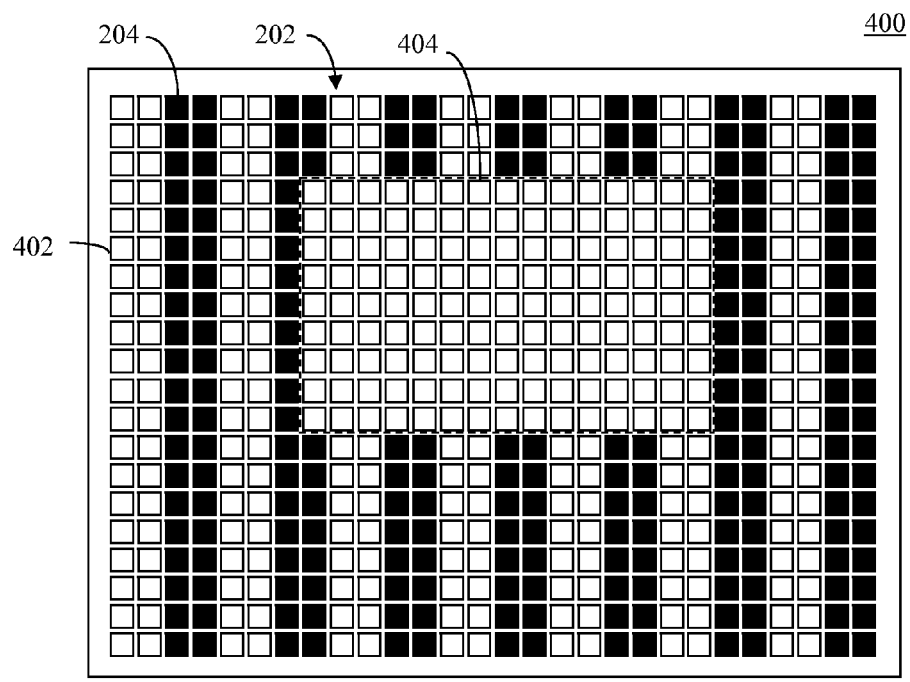
FIG. 4 illustrates an exemplary arrangement of an adaptable parallax barrier in accordance with an embodiment that supports a viewing configuration that mixes two-dimensional and three-dimensional viewing regions.

For instance, FIG. 4 shows an exemplary arrangement of an adaptable parallax barrier 400 that supports a viewing configuration that mixes two-dimensional and three-dimensional viewing regions according to example embodiments. Adaptable parallax barrier 400 is similar to adaptable parallax barrier 200 of FIG. 2, having barrier element array 202 including a plurality of barrier elements 204 arranged in a two-dimensional array. In FIG. 4, a first region 402 of barrier element array 202 includes a plurality of parallel non-blocking strips alternated with parallel blocking strips that together fill first region 402. A second region 404 of barrier element array 202 is surrounded by first region 402. Second region 404 is a rectangular shaped region of barrier element array 202 that includes a two-dimensional array of barrier elements 204 that are non-blocking. Thus, in FIG. 4, barrier element array 202 is configured to enable a three-dimensional image to be generated by pixels of a pixel array that are adjacent to barrier elements of first region 402, and to enable a two-dimensional image to be generated by pixels of the pixel array that are adjacent to barrier elements inside of second region 404. Note that alternatively, first region 402 may include all non-blocking barrier elements 202 to pass a two-dimensional image, and second region 404 may include parallel non-blocking strips alternated with parallel blocking strips to pass a three-dimensional image. In further embodiments, adaptable parallax barrier 400 may have additional numbers, sizes, and arrangements of regions configured to pass different combinations of two-dimensional images and three-dimensional images.

In still further embodiments, different regions of an adaptable parallax barrier that have parallel non-blocking strips may have the parallel non-blocking strips oriented at different angles to deliver three-dimensional images to viewers that are oriented differently. Thus, a viewing configuration that mixes three-dimensional viewing regions having different viewing orientations may be supported.

Figure 5:
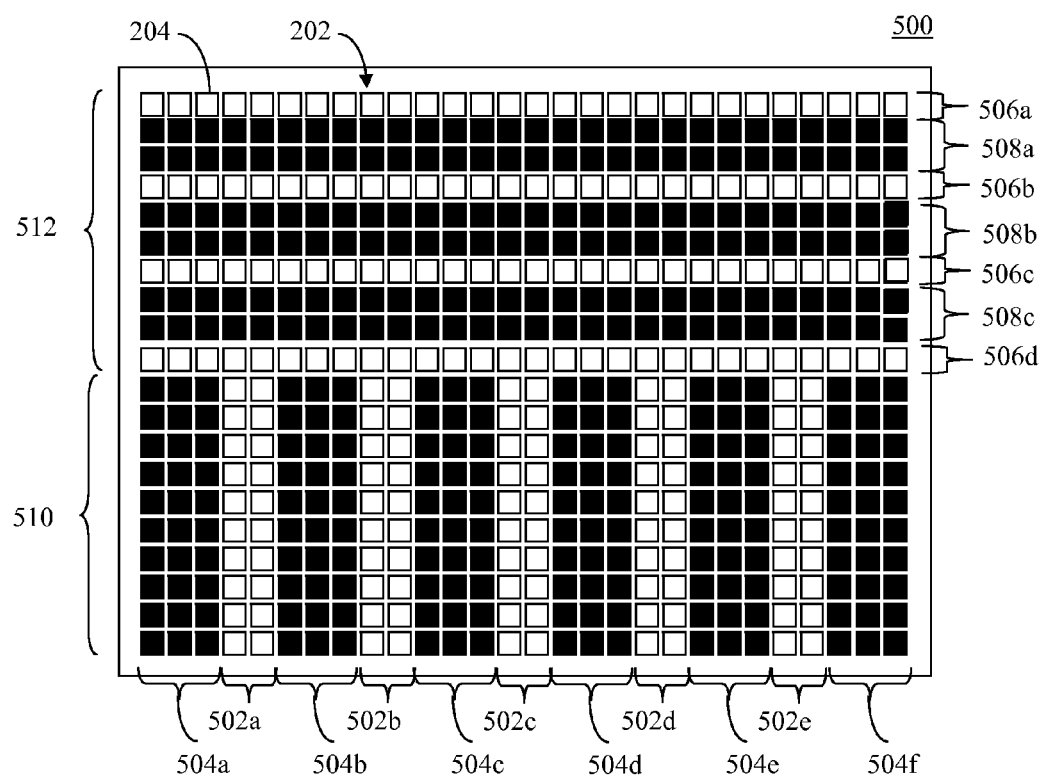
FIG. 5 illustrates an exemplary arrangement of an adaptable parallax barrier in accordance with an embodiment in which different orientations of transparent and opaque slits are used to simultaneously support different viewer orientations.

For example, FIG. 5 shows an exemplary arrangement of an adaptable parallax barrier 500 in which transparent slits have different orientations, according to an example embodiment. Adaptable parallax barrier 500 is similar to adaptable parallax barrier 200 of FIG. 2, having barrier element array 202 including a plurality of barrier elements 204 arranged in a two-dimensional array. A first region 510 (e.g., a bottom half) of barrier element array 202 includes a first plurality of parallel strips of barrier elements 204 that are selected to be non-blocking to form a first plurality of parallel non-blocking strips 502a-502e (each having a width of two barrier elements 204). As shown in FIG. 5, parallel non-blocking strips 502a-502e are alternated with parallel blocking strips 504a-504f of barrier elements 204 (each having a width of three barrier elements 204). Parallel non-blocking strips 502a-502e are oriented in a first direction (e.g., along a vertical axis).

Furthermore, as shown in FIG. 5, a second region 512 (e.g., a top half) of barrier element array 202 includes a second plurality of parallel strips of barrier elements 204 that are selected to be non-blocking to form a second plurality of parallel non-blocking strips 506a-506d (each having a width of one barrier element 204). As shown in FIG. 5, parallel non-blocking strips 506a-506d are alternated with parallel blocking strips 508a-508c of barrier elements 204 (each having a width of two barrier elements 204). Parallel non-blocking strips 506a-506d are oriented in a second direction (e.g., along a horizontal axis).

As such, in FIG. 5, first and second pluralities of parallel non-blocking strips 502a-502e and 506a-506d are present in barrier element array 202 that are oriented perpendicularly to each other. The region of barrier element array 202 that includes first plurality of parallel non-blocking strips 502a-502e may be configured to deliver a three-dimensional image in a viewing space to be viewable by a user whose body is oriented vertically (e.g., sitting upright or standing up). The region of barrier element array 202 that includes second plurality of parallel non-blocking strips 506a-506d may be configured to deliver a three-dimensional image in a viewing space to be viewable by a user whose body is oriented horizontally (e.g., laying down). In this manner, users who are oriented differently relative to each other can still each be provided with a corresponding three-dimensional image that accommodates their position.

Additional adaptable parallax barrier implementations and arrangements thereof that support mixed two-dimensional and/or three-dimensional viewing regions are described in commonly-owned, co-pending U.S. patent application Ser. No. 12/845,440, filed on Jul. 28, 2010 and entitled "Adaptable Parallax Barrier Supporting Mixed 2D and Stereoscopic 3D Display Regions," the entirety of which is incorporated by reference herein.

Figure 6:
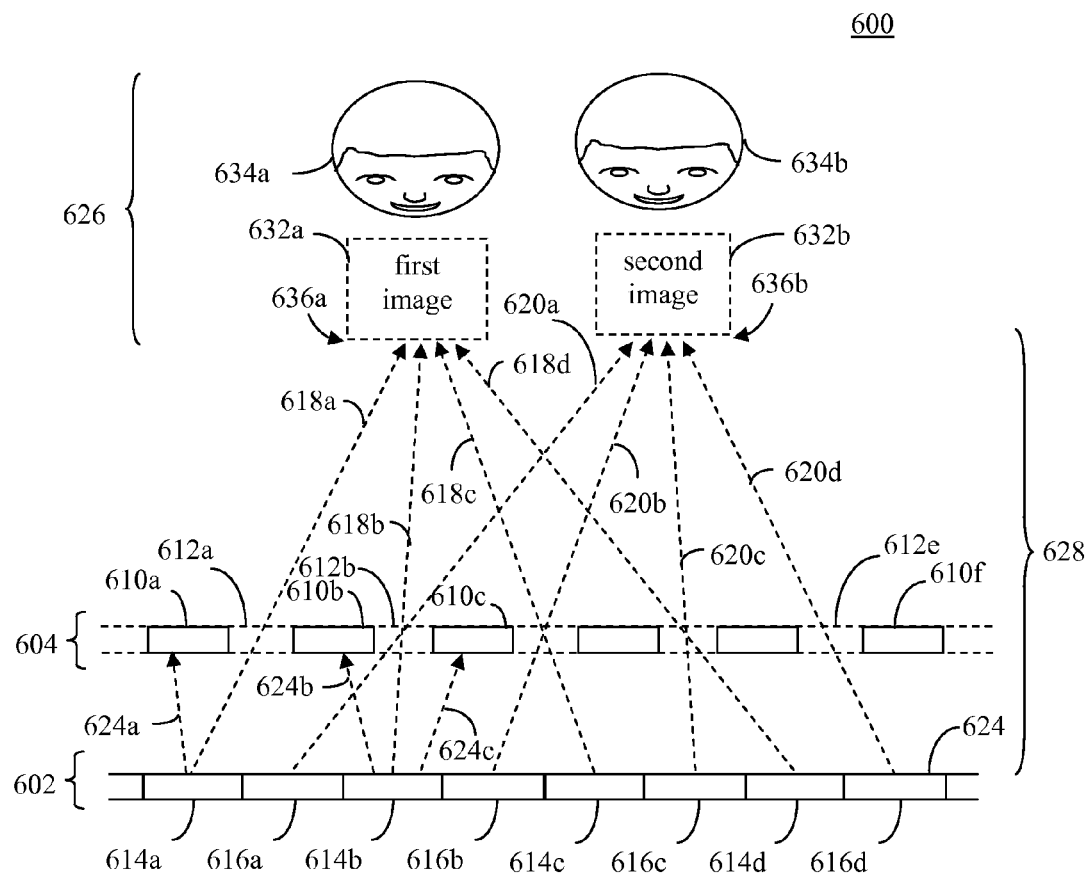
FIG. 6 shows a cross-sectional view of an exemplary display system configured to simultaneously deliver two different two-dimensional images to two different viewers, respectively, in accordance with an embodiment.

Viewing system 110 may be further configured to simultaneously generate multiple two-dimensional images or views for viewing by users in a viewing space. For example, FIG. 6 shows an exemplary display system 600 configured to simultaneously deliver two different two-dimensional images to two different viewers, respectively, in accordance with an embodiment. Display system 600 may comprise one implementation of viewing system 110 of FIG. 1B. As shown in FIG. 6, display system 600 includes a pixel array 602 and a barrier element array 604. Pixel array 602 includes a plurality of pixels 614a-614d and 616a-616d. Pixels 614 alternate with pixels 616, such that pixels 614a-614d and 616a-616d are arranged in series in the order of pixels 614a, 616a, 614b, 616b, 614c, 616c, 614d, and 616d. Further pixels may be included in pixel array 602 that are not visible in FIG. 6, including further pixels along the width dimension of pixel array 602 (e.g., in the left-right directions) as well as pixels along a length dimension of pixel array 602 (not visible in FIG. 6). Each of pixels 614a-614d and 616a-616d emits light, which emanates from a display surface 624 of pixel array 602 (e.g., generally upward in FIG. 6) towards barrier element array 604. Some example indications of light emanating from pixels 614a-614d and 616a-616d are shown in FIG. 6 (as dotted lines), including light 624a and light 618a emanating from pixel 614a, light 624b, light 618b, and light 624c emanating from pixel 614b, etc.

Light emanating from pixel array 602 is filtered by barrier element array 604 to form a plurality of images in a viewing space 626, including a first image 632a at a first location 636a and a second image 632b at a second location 636b. A portion of the light emanating from pixel array 602 is blocked by blocking barrier elements 610, while another portion of the light emanating from pixel array 602 passes through non-blocking barrier elements 612, according to the filtering by barrier element array 604. For instance, light 624a from pixel 614a is blocked by blocking barrier element 610a, and light 624b and light 624c from pixel 614b are blocked by blocking barrier elements 610b and 610c, respectively. In contrast, light 618a from pixel 614a is passed by non-blocking barrier element 612a and light 618b from pixel 614b is passed by non-blocking barrier element 612b.

System 600 shown in FIG. 6 is configured to form first and second images 632a and 632b at locations 636a and 636b, respectively, which are positioned at a distance 628 from pixel array 602. As described above, pixel array 602 includes a first set of pixels 614a-614d and a second set of pixels 616a-616d. Pixels 614a-614d correspond to first image 632a and pixels 616a-616d correspond to second image 632b. Due to the spacing of pixels 614a-614d and 616a-616d in pixel array 602, and the geometry of non-blocking barrier elements 612 in barrier element array 604, first and second images 632a and 632b are formed at locations 636a and 636b, respectively. As shown in FIG. 6, light 618a-618d from the first set of pixels 614a-614d is focused at location 636a to form first image 6326a at location 636a. Light 620a-620d from the second set of pixels 616a-616d is focused at location 636b to form second image 632b at location 636b.

As shown in FIG. 6, a first viewer 634a receives first image 632a at first location 636a and a second viewer 634b receives second image 632b at second location 636b, according to an example embodiment. First and second images 632a and 632b may each comprise a different two-dimensional image that may be viewed independently from each other. For instance, first image 632a and second image 632b may be generated by display system 600 from first media content and second media content, respectively, that are independent of each other. First image 632a may be received by both eyes of first viewer 634a to be perceived by first viewer 634a as a first two-dimensional image, and second image 632b may be received by both eyes of second viewer 634b to be perceived by second viewer 634b as a second two-dimensional image. Thus, first and second images 632a and 632b may be generated to have a spacing that enables them to be separately viewed by first and second users 634a and 634b. Furthermore, first and second images 632a and 632b may be delivered to different viewer locations as determined by a configuration of display system 600, including a width and spacing of non-blocking slits in barrier element array 604 and by a spacing between pixel array 602 and barrier element array 604.

In accordance with the foregoing, display system 600 has a single viewing plane or surface (e.g., a plane or surface of pixel array 602, barrier element array 604, and/or display screen of display system 600) that supports multiple viewers with media content in the form of images or views. In the embodiment of FIG. 6, the single viewing plane of display system 600 may provide a first two-dimensional view based on first two-dimensional media content to first viewer 634a, and may provide a second two-dimensional view based on second two-dimensional media content to second viewer 634b. Barrier element array 604 causes the first media content to be presented to first viewer 634a via a first area of the single viewing plane, but not to second viewer 634b, while simultaneously causing the second media content to be presented to second viewer 634b via a second area of the single viewing plane, but not to first viewer 634a. Furthermore, the first area and second area of the single viewing plane that provide the first and second media content overlap each other at least in part, as barrier element array 604 enables both two-dimensional views to be provided from first set of pixels 614a-614d and second set of pixels 616a-616d, which are interleaved with each other. In accordance with certain configurations of display system 600, the first and second areas may be the same area and the area may encompass the entirety of the display screen or surface of display system 600 or only a region of the display screen or surface of display system 600.

Still further, the configuration of display system 600 in FIG. 6 may be used to deliver separate three-dimensional content to first and second viewers 634a and 634b. As such, display system 600 is capable of delivering multiple three-dimensional views to viewers. For example, in an embodiment, first and second viewers 634a and 634b may each wear a pair of 3D-enabled glasses, and the first and second media content associated with first and second images 632a and 632b, respectively, may be three-dimensional media content. In one embodiment, the 3D-enabled glasses may be color filtering glasses. The color filter lenses of the glasses worn by first viewer 634a may pass two-dimensional images (included in first image 632a) of differing perspective to the left and right eyes of first viewer 634a to be perceived by first viewer 634a as a first three dimensional image. Likewise, the color filter lenses of the glasses worn by second viewer 634b may pass two-dimensional images (included in second image 632b) of differing perspective to the left and right eyes of second viewer 634b to be perceived by second viewer 634b as a second three dimensional image. In another embodiment, the 3D-enabled glasses may be shutter lensed glasses. The shutter lenses of the glasses worn by first viewer 634a may be synchronized to pass two-dimensional images (included in first image 632a) of differing perspective to the left and right eyes of first viewer 634a to be perceived by first viewer 634a as a first three dimensional image. Likewise, the shutter lenses of the glasses worn by second viewer 634b may be synchronized to pass two-dimensional images (included in second image 632b) of differing perspective to the left and right eyes of second viewer 634b to be perceived by second viewer 632b as a second three dimensional image.

As such, display system 600 has a single viewing plane or surface (e.g., a plane or surface of pixel array 602 or barrier element array 604) that supports multiple viewers with media content in the form of three-dimensional images or views. The single viewing plane of display system 600 may provide a first three-dimensional view based on first three-dimensional media content to first viewer 634a, and may provide a second three-dimensional view based on second three-dimensional media content to second viewer 634b. Barrier element array 604 causes the first three-dimensional media content to be presented to first viewer 634a via a first area of the single viewing plane, but not to second viewer 634b, while simultaneously causing the second three-dimensional media content to be presented to second viewer 634b via a second area of the single viewing plane, but not to first viewer 634a. Furthermore, the first area and second area of the single viewing plane that provide the first and second media content overlap each other at least in part, as barrier element array 604 enables both three-dimensional views to be provided from first set of pixels 614a-614d and second set of pixels 616a-616d, which are interleaved with each other. In accordance with certain configurations of display system 600, the first and second areas may be the same area and the area may encompass the entirety of the display screen or surface of display system 600 or only a region of the display screen or surface of display system 600.

As such, display system 600 can be configured to deliver a single two-dimensional or three-dimensional view to a viewer, to deliver a pair of two-dimensional views to a pair of viewers, or to deliver a pair of three-dimensional views to a pair of viewers. Display system 600 can be configured to switch between delivering views to one and two viewers by turning off or turning on, respectively, the display of media content by pixel array 602 associated with one of the viewers (e.g., by turning off or on pixels 616 associated with second image 632b). Display system 600 can be configured to switch between delivering two-dimensional and three-dimensional views by providing the corresponding media content type at pixel array 602.

Display systems in accordance with further embodiments may include multiple layers of parallax barriers. Such display systems may enable multiple three-dimensional images to be displayed in a viewing space. The multiple parallax barrier layers may enable spatial separation of the images. For instance, in accordance with one embodiment, a display device that includes multiple parallax barrier layers may be configured to display a first three-dimensional image in a first region of a viewing space (e.g., a left-side area), a second three-dimensional image in a second region of the viewing space (e.g., a central area), a third three-dimensional image in a third region of the viewing space (e.g., a right-side area), etc. In fact, a display device that includes multiple parallax barrier layers may be configured to display any number of spatially separated three-dimensional images as desired for a particular application (e.g., according to a number and spacing of viewers in the viewing space, etc.).

Figure 7:
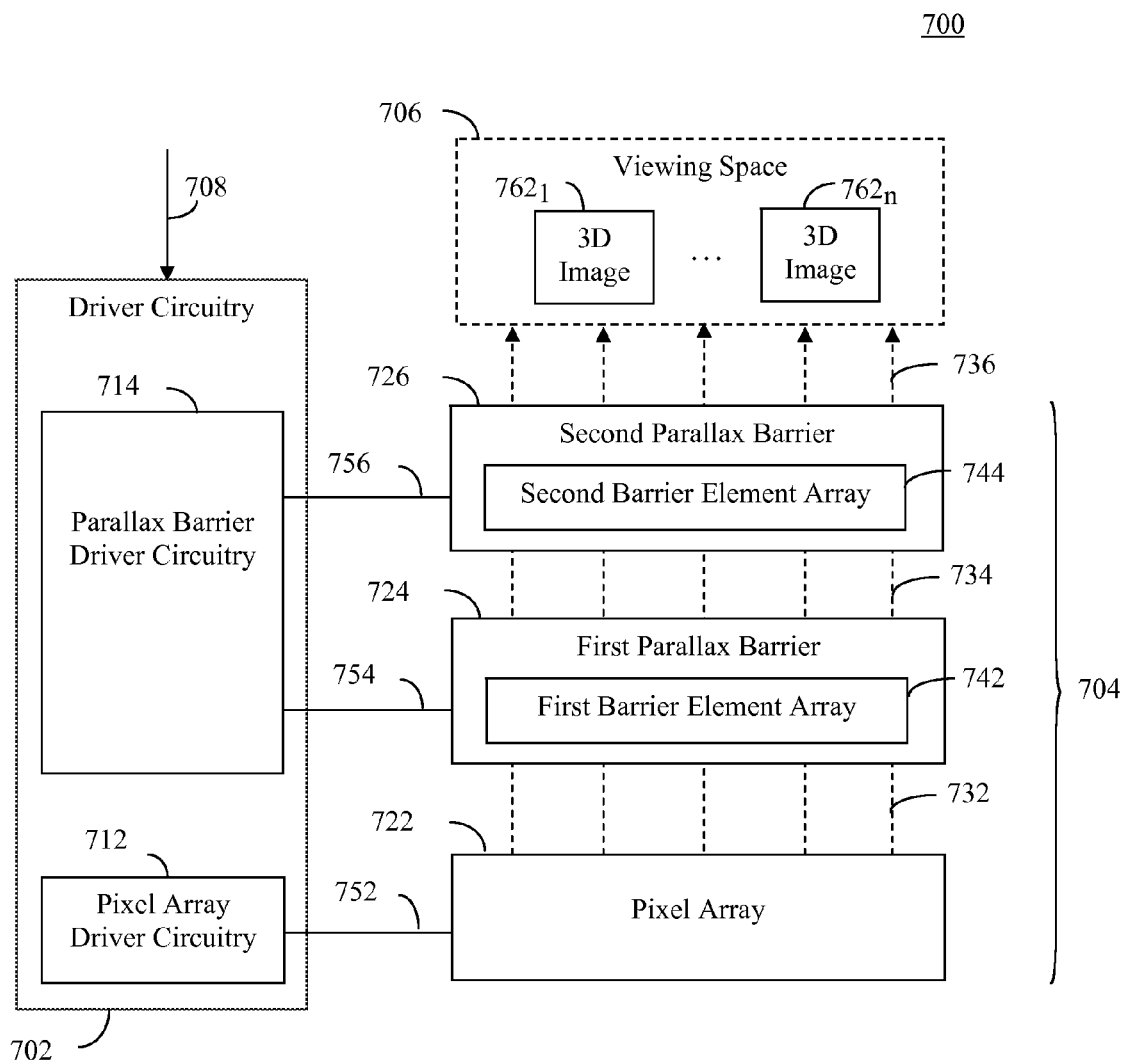
FIG. 7 is a block diagram of an exemplary display system that includes a screen assembly that utilizes multiple parallax barriers to support the simultaneous display of multiple simultaneous visual presentations in accordance with an embodiment.

FIG. 7 is a block diagram of an exemplary display system 700 that includes multiple parallax barrier layers in accordance with an embodiment. As shown in FIG. 7, display system 700 includes driver circuitry 702 and a screen assembly 704, wherein screen assembly 704 includes a pixel array 722, a first parallax barrier 724 and a second parallax barrier 726. As shown in FIG. 7, first parallax barrier 724 includes a first barrier element array 742 and second parallax barrier 726 includes a second barrier element array 744. Furthermore, as shown in FIG. 7, driver circuitry 702 includes pixel array driver circuitry 712 and parallax barrier driver circuitry 714.

Light 732 is received at first parallax barrier 724 from pixel array 722. Pixel array 722 may comprise a self-illuminating or light-generating pixel array such that the pixels of pixel array 722 each emit light included in light 732. Alternatively, each pixel in pixel array 722 may operate to selectively pass light emitted by a backlighting source (not shown in FIG. 7) to produce light 732. Pixel array driver circuitry 712 may generate drive signals 752 based on a control signal 708 received from control circuitry (not shown in FIG. 7) and pixel array 722 may emit light 732 in accordance with the received drive signals 752. In an embodiment, pixel array driver circuitry 712 may generate drive signals 752 to cause pixel array 722 to emit light 732 containing a plurality of images corresponding to different sets of pixels.

First parallax barrier 724 may be configured to filter light 732 received from pixel array 722. As shown in FIG. 7, first parallax barrier 724 includes first barrier element array 742 that filters light 732 to generate filtered light 734. First barrier element array 742 may optionally be configurable to adjust the filtering performed by first parallax barrier 724 in a similar manner to that described above in regard to adaptable parallax barrier 124 or in another manner. In an embodiment, parallax barrier driver circuitry 714 may generate drive signals 754 based on control signal 708 received by driver circuitry 702 to cause first barrier element array 742 to filter light 732 as desired.

Filtered light 734 is received by second parallax barrier 726 to generate filtered light 736 that includes a plurality of three-dimensional images $762_1$-$762_n$ formed in a viewing space 706. As shown in FIG. 7, second parallax barrier 726 includes second barrier element array 744 that filters filtered light 734 to generate filtered light 736. Second barrier element array 744 may optionally be configurable to adjust the filtering performed by second parallax barrier 726 in a similar manner to that described above in regard to adaptable parallax barrier 124 or in another manner. In an embodiment, light manipulator driver circuitry 714 may generate drive signals 756 based on control signal 708 to cause barrier element array 744 to filter filtered light 734 to generate filtered light 736 including three-dimensional images $762_1$-$762_n$ as desired.

As such, display system 700 has a single viewing plane or surface (e.g., a plane or surface of pixel array 722, first parallax barrier 724, second parallax barrier 726, or a display screen of display system 700) that supports multiple viewers with media content in the form of three-dimensional images or views. The single viewing plane of display system 700 may provide a first three-dimensional view based on first three-dimensional media content to a first viewer, a second three-dimensional view based on second three-dimensional media content to a second viewer, and optionally further three-dimensional views based on further three-dimensional media content to further viewers. First and second parallax barrier 724 and 726 cause each three-dimensional media content to be presented to a corresponding viewer via a corresponding area of the single viewing plane, with each viewer being enabled to view corresponding media content without viewing media content directed to other viewers. Furthermore, the areas of the single viewing plane that provide the various three-dimensional views of media content overlap each other at least in part. In the embodiment of FIG. 7, the areas may be the same area—an area of a display screen or surface of display system 700. In accordance with certain configurations of display system 700, the areas may be the same area and the area may encompass the entirety of the display screen or surface of display system 700 or only a region of the display screen or surface of display system 700.

Display system 700 may be configured in various ways to generate multiple three-dimensional images in embodiments. Furthermore, as described below, embodiments of display system 700 may be configured to generate two-dimensional views, as well as any combination of one or more two-dimensional views simultaneously with one or more three-dimensional views. Examples of such embodiments are provided in the following.

Figure 8:
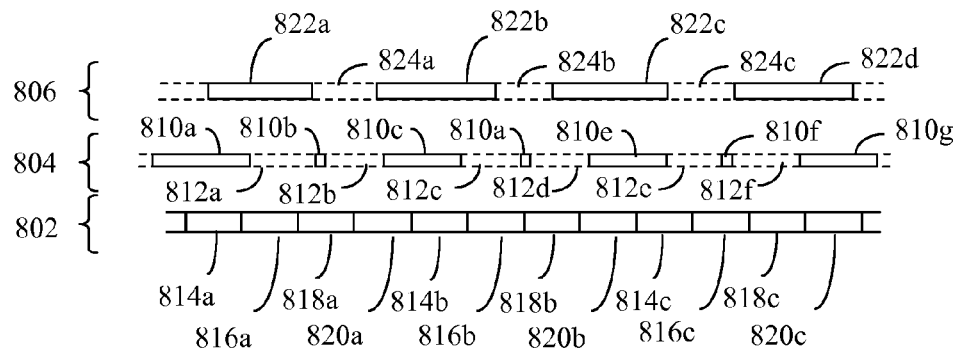
FIGS. 8 and 9 show cross-sectional views of an exemplary display system configured to simultaneously deliver two different three-dimensional images to two different viewers, respectively, in accordance with an embodiment.

FIG. 8 shows a cross-sectional view of an exemplary display system 800, which is an example implementation of system 700 shown in FIG. 7. As shown in FIG. 8, system 800 includes a pixel array 802, a first barrier element array 804, and a second barrier element array 806. System 800 may also include display controller 702 of FIG. 7, which is not shown in FIG. 8 for ease of illustration. System 800 is described as follows.

As shown in the example of FIG. 8, pixel array 802 includes a first set of pixels 814a-814c, a second set of pixels 816a-816c, a third set of pixels 818a-818c and a fourth set of pixels 820a-820c. Pixels of the four sets of pixels are alternated in pixel array 802 in the order of pixel 814a, pixel 816a, pixel 818a, pixel 820a, pixel 814b, pixel 816b, etc. Further pixels may be included in each set of pixels in pixel array 802 that are not visible in FIG. 8, including hundreds, thousands, or millions of pixels in each set of pixels.

Figure 9:
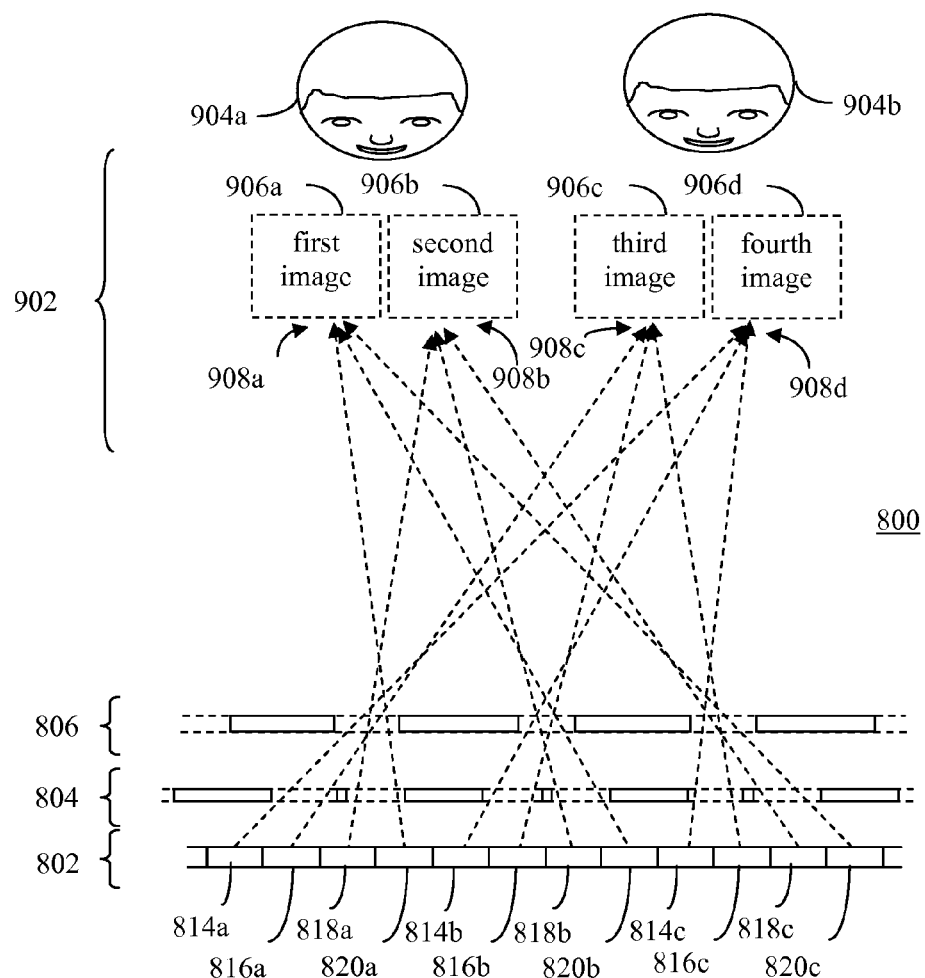

Each of pixels 814a-814c, 816a-816c, 818a-818c and 820a-820c is configured to emit light, which emanates from the surface of pixel array 802 towards first barrier element array 804. Each set of pixels is configured to generate a corresponding image. For example, FIG. 9 shows display system 800, where pixels of pixel array 802 emit light. Light from second set of pixels 816a-816c and first set of pixels 814a-814c is configured to generate third and fourth images 906c and 906d, respectively, which may be perceived together as a second three-dimensional image by a second viewer 904b. Light from fourth set of pixels 820a-820c and third set of pixels 818a-818c is configured to generate first and second images 906a and 906b, respectively, which may be perceived together as a first three-dimensional image by a first viewer 904a. The light emitted by the sets of pixels is filtered by first and second barrier element arrays 804 and 806 to generate the first and second three-dimensional images in respective desired regions of a viewing space 902 adjacent to display system 800.

For instance, in the example of FIG. 9, four images are formed in viewing space 902, including first-fourth images 906a-906d. Pixels 814a-814c correspond to fourth image 906d, pixels 816a-816c correspond to third image 906c, pixels 818a-818c correspond to second image 906b, and pixels 820a-820c correspond to first image 906a. As shown in FIG. 9, light from the first set of pixels 814a-814c forms fourth image 906d and light from the third set of pixels 818a-818c forms second image 906b, due to the filtering of the non-blocking slits in first and second barrier element arrays 804 and 806. In a similar fashion, light from the second set of pixels 816a-816c forms third image 906c and light from the fourth set of pixels 820a-820c forms first image 906a.

In the embodiment of FIG. 9, first and second images 906a and 906b may be configured to be perceived by viewer 904a as a first three-dimensional image, such that first image 906a is received at a right eye location 908a of viewer 904a and second image 906b is received at a left eye location 908b of viewer 904a (e.g., separated by an interocular distance). Furthermore, third and fourth images 906c and 906d may be configured to be perceived by viewer 904b as a second three-dimensional image, such that third image 906c is received at a right eye location 908c of viewer 904b and fourth image 906d is received at a second eye location 908d of viewer 904b.

First-fourth images 906a-906d may be formed in viewing space 902 at a distance from pixel array 802 and at a lateral location of viewing space 902 as determined by a configuration of display system 800, including a width and spacing of non-blocking slits in first barrier element array 804, by a width and positioning of non-blocking slits in second barrier element array 806, by a spacing between pixel array 802 and first barrier element array 804, and a spacing between first and second barrier element arrays 804 and 806.

Furthermore, although shown in FIG. 9 as simultaneously delivering first and second three-dimensional views to viewers 904a and 904b, display system 800 may deliver a two-dimensional view to one of viewers 904a and 904b, and may simultaneously deliver a three-dimensional view to the other of viewers 904a and 904b. For example, pixels 814a-814c and pixels 816a-816c may deliver the same images (e.g., may display the same media content), such that third and fourth images 906c and 906d are the same. As such, because second viewer 904b receives the same view at each of right and left eye locations 908c and 908d, second viewer 904b perceives third and fourth images 906c and 906d as a single two-dimensional view. In another embodiment, to provide a two-dimensional view to viewer 904b, pixels 814a-814c may be turned off, and a width of slits 812a, 812c, and 812e may be adjusted such that pixels 816a-816c deliver a same view to both right and left eye locations 908c and 908d of viewer 904b (through slits 824a-824c). While second viewer 904b is being delivered a two-dimensional view, first and second images 906a and 906b may be simultaneously delivered to first viewer 904a as differing perspective images to be perceived as a three-dimensional view or as the same image to be perceived as a second two-dimensional view.

Still further, if it is desired for display system 800 to deliver a single two-dimensional or three-dimensional view (e.g., one of viewers 904a and 904b is no longer participating), one or both of first barrier element array 804 and second barrier element array 806 may be "turned off" For instance, to deliver a two-dimensional view to a viewer 904, first barrier element array 804 and second barrier element array 806 may each transition all of their corresponding barrier elements to the non-blocking state (be "turned off"), and pixel array 802 may be configured to emit a single two-dimensional image. To deliver a three-dimensional view to a viewer 904, one of first barrier element array 804 and second barrier element array 806 may transition all of its barrier elements to the non-blocking state, while the other of first barrier element array 804 and second barrier element array 806 may be configured to deliver a three-dimensional view.

Additional details concerning display systems that utilize adaptable light manipulators, such as adaptable parallax barriers, to support the simultaneous presentation of different two-dimensional and/or three-dimensional views to different viewers are provided in U.S. patent application Ser. No. 12/845,461, filed on Jul. 28, 2010, and entitled "Display Supporting Multiple Simultaneous 3D Views," the entirety of which is incorporated by reference herein.

As noted above, a configuration of adaptable parallax barrier 124 of viewing system 110 or a configuration of either of first and second parallax barrier 724 and 726 of display system 700 can be dynamically modified to support a particular viewing configuration. To further support the viewing configuration, the pixel array of each system must also be controlled to support the same viewing configuration. This concept will now be further described with continued reference to viewing system 110 of FIG. 1B, although persons skilled in the relevant art(s) will appreciate that the concept is equally applicable to display system 700 of FIG. 7 and other display systems having adaptable light manipulators, such as adaptable parallax barriers.

When a configuration of adaptable parallax barrier 124 of viewing system 110 is modified to support a particular viewing configuration, pixel array 122 must also be controlled to support the same viewing configuration. In particular, the rendering of pixels of an image (also referred to herein as "image pixels") among the pixels of pixel array 122 (also referred to herein as "display pixels") must be handled in a manner that is consistent with a current configuration of adaptable parallax barrier 124. This may entail, for example, changing a number of display pixels that represents each image pixel (i.e., changing the resolution of a displayed image) and/or changing which display pixels or groups thereof correspond to the respective image pixels (i.e., changing the locations at which the image pixels are displayed), in response to modification of a configuration of adaptable parallax barrier 124. Such changes may be implemented by a controller (not shown in FIG. 1B) via delivery of appropriate control signals 108 to pixel array driver circuitry 112.

For example, in one embodiment, when a configuration of adaptable parallax barrier 124 supports a first viewing configuration responsive to control signals 108, pixel array driver circuitry 204 sends drive signals 152 in conformance with control signals 108 such that the rendering of images to pixel array 122 occurs in a manner that also supports the first viewing configuration. Furthermore, when the configuration of adaptable parallax barrier 124 is modified to support a second viewing configuration responsive to control signals 108, pixel array driver circuitry 204 sends drive signals 152 in conformance with the control signals 108 such that the rendering of images to pixel array 122 occurs in a manner that also supports the second viewing configuration.

Figure 10:
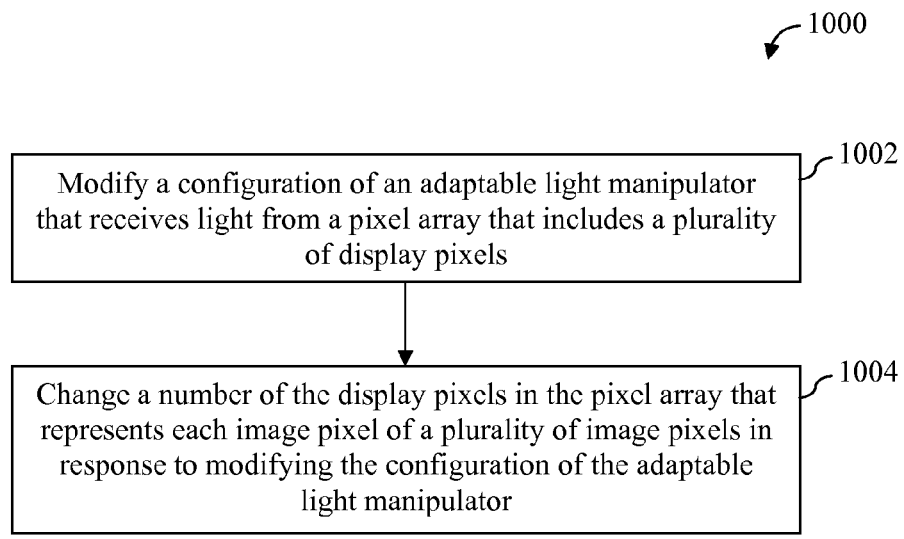
FIG. 10 depicts a flowchart of an exemplary method for controlling a pixel array to support a same viewing configuration as an adaptable light manipulator in accordance with an embodiment.

FIG. 10 depicts a flowchart 1000 of an exemplary method for controlling a pixel array to support the same viewing configuration as an adaptable light manipulator (such as adaptable parallax barrier 124) in accordance with an embodiment. As shown in FIG. 10, the method of flowchart 1000 begins at step 1002. During step 1002, a configuration of an adaptable light manipulator, such as adaptable parallax barrier 124, is modified. At step 1004, a number of display pixels in a pixel array, such as pixel array 122, that represents each image pixel of a plurality of image pixels is changed in response to modifying the configuration of the adaptable light manipulator.

Figure 12:
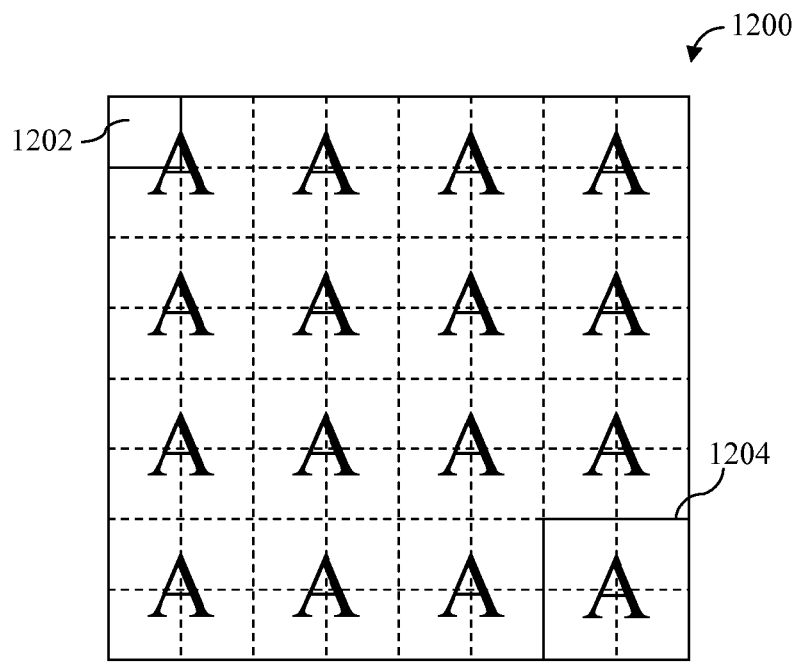
FIG. 12 illustrates a portion of an exemplary pixel array to which image pixels have been mapped to support a two-dimensional viewing configuration of an adaptable light manipulator in accordance with an embodiment.
Figure 13:
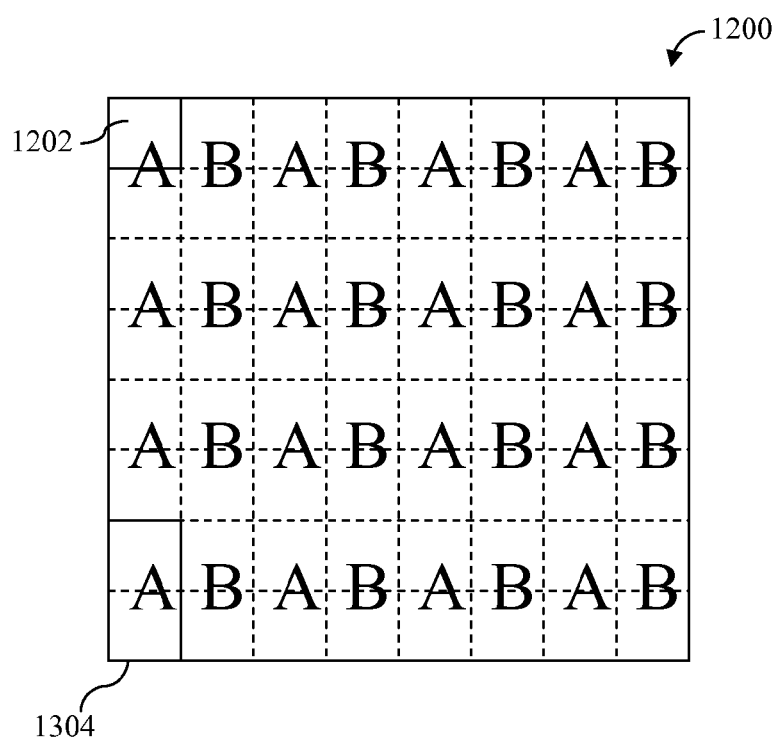
FIG. 13 illustrates how image pixels are mapped to the portion of the pixel array shown in FIG. 12 to support a first three-dimensional viewing configuration of an adaptable light manipulator in accordance with an embodiment.

FIGS. 12 and 13 provide a simple illustration of an exemplary application of the method of flowchart 10. As shown in FIG. 12, a portion of a pixel array 1200 includes a 16×16 array of display pixels. An example display pixel is shown as display pixel 1202. In one embodiment, each display pixel comprises a trio of red, green, and blue sub-pixels as discussed above. A first image comprising a 4×4 array of image pixels (each shown depicting the letter "A" to indicate that each is included in the same image) is mapped to the display pixels such that 4 display pixels are used to present each image pixel. An example of an image pixel is shown as image pixel 1204. In FIG. 12, the first image is intended to represent an image that is viewed when an adaptable light manipulator disposed proximate to the pixel array is configured to support a two-dimensional viewing configuration.

FIG. 13 is intended to represent the same portion of pixel array 1200 after the configuration of the adaptable light manipulator has been changed to support a three-dimensional viewing configuration. The three-dimensional viewing configuration requires the overlapping display of a first image and a second image across the same portion of pixel array 1200. This means that the first image must be represented with only half the display pixels. To achieve this, the pixel array is controlled such that 2 rather than 4 display pixels are used to present each image pixel of the first image (each still shown depicting the letter "A"). This corresponds to a decreased viewing resolution of the first image. The other half of the display pixels are now used to present each image pixel of a second image (each shown depicting the letter "B"). The image pixels associated with the different images are aligned with the adaptable light manipulator to achieve a desired three-dimensional viewing effect.

Figure 11:
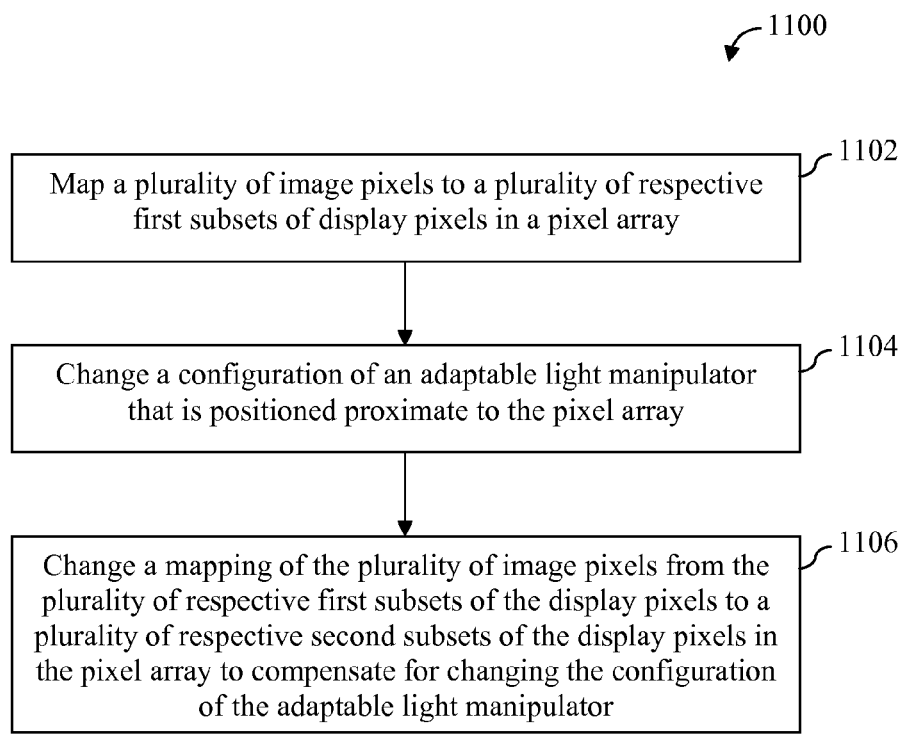
FIG. 11 depicts a flowchart of an alternate exemplary method for controlling a pixel array to support a same viewing configuration as an adaptable light manipulator in accordance with an embodiment.

FIG. 11 depicts a flowchart 1100 of another exemplary method for controlling a pixel array to support the same viewing configuration as an adaptable light manipulator (such as adaptable parallax barrier 124) in accordance with an embodiment. As shown in FIG. 11, the method of flowchart 1100 begins at step 1102. During step 1102, a plurality of image pixels is mapped to a plurality of respective first subsets of display pixels in a pixel array, such as pixel array 122. At step 1104, a configuration of an adaptable light manipulator that is positioned proximate to the pixel array is changed. For example, in an embodiment in which the adaptable light manipulator includes adaptable parallax barrier 124, a slit pattern, orientation, or the like, of adaptable parallax barrier 124 may be changed. At step 1106, a mapping of the plurality of image pixels is changed from the plurality of respective first subsets of the display pixels to a plurality of respective second subsets of the display pixels in the pixel array to compensate for changing the configuration of the adaptable light manipulator.

Figure 14:
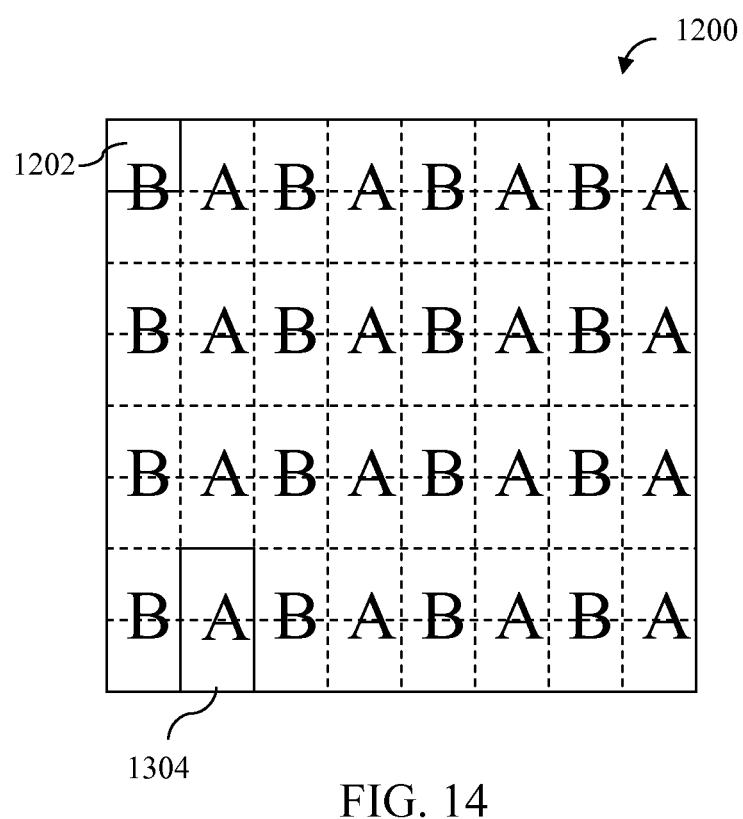
FIG. 14 illustrates how image pixels are mapped to the portion of the pixel array shown in FIGS. 12 and 13 to support a second three-dimensional viewing configuration of an adaptable light manipulator in accordance with an embodiment.

FIGS. 13 and 14 provide a simple illustration of an exemplary application of the method of flowchart 1100. As shown in FIG. 13, a portion of a pixel array 1200 is used to simultaneously display a first image comprising image pixels shown depicting the letter "A" and a second image comprising image pixels shown depicting the letter "B." As noted above, this display format is utilized to support a three-dimensional viewing configuration corresponding to a particular arrangement of an adaptable light manipulator disposed proximate to the pixel array. FIG. 14 is intended to represent the same portion of pixel array 1200 after the configuration of the adaptable light manipulator has been changed to support a modified three-dimensional viewing configuration (e.g., in response to a changed location of a viewer or some other factor). The modified three-dimensional viewing configuration requires the display location of the first image and the second image to be shifted, as shown in FIG. 14. Thus, for example, rather than rendering image pixel 1304 to the bottom-most two display pixels in the far-left column of array portion 1200, the same image pixel 1304 is now rendered to the bottom-most two display pixels in the second column from the left of array portion 1200.

Numerous other methods may be used to control the rendering of image pixels to display pixels in support of a desired two-dimensional and/or three-dimensional viewing configuration implemented by one or more adaptable parallax barriers or other adaptable light manipulator(s). Additional details concerning such control of a pixel array may be found in commonly-owned, co-pending U.S. patent application Ser. No. 12/774,225, filed on May 5, 2010 and entitled "Controlling a Pixel Array to Support an Adaptable Light Manipulator, the entirety of which is incorporated by reference herein."

Figure 15:
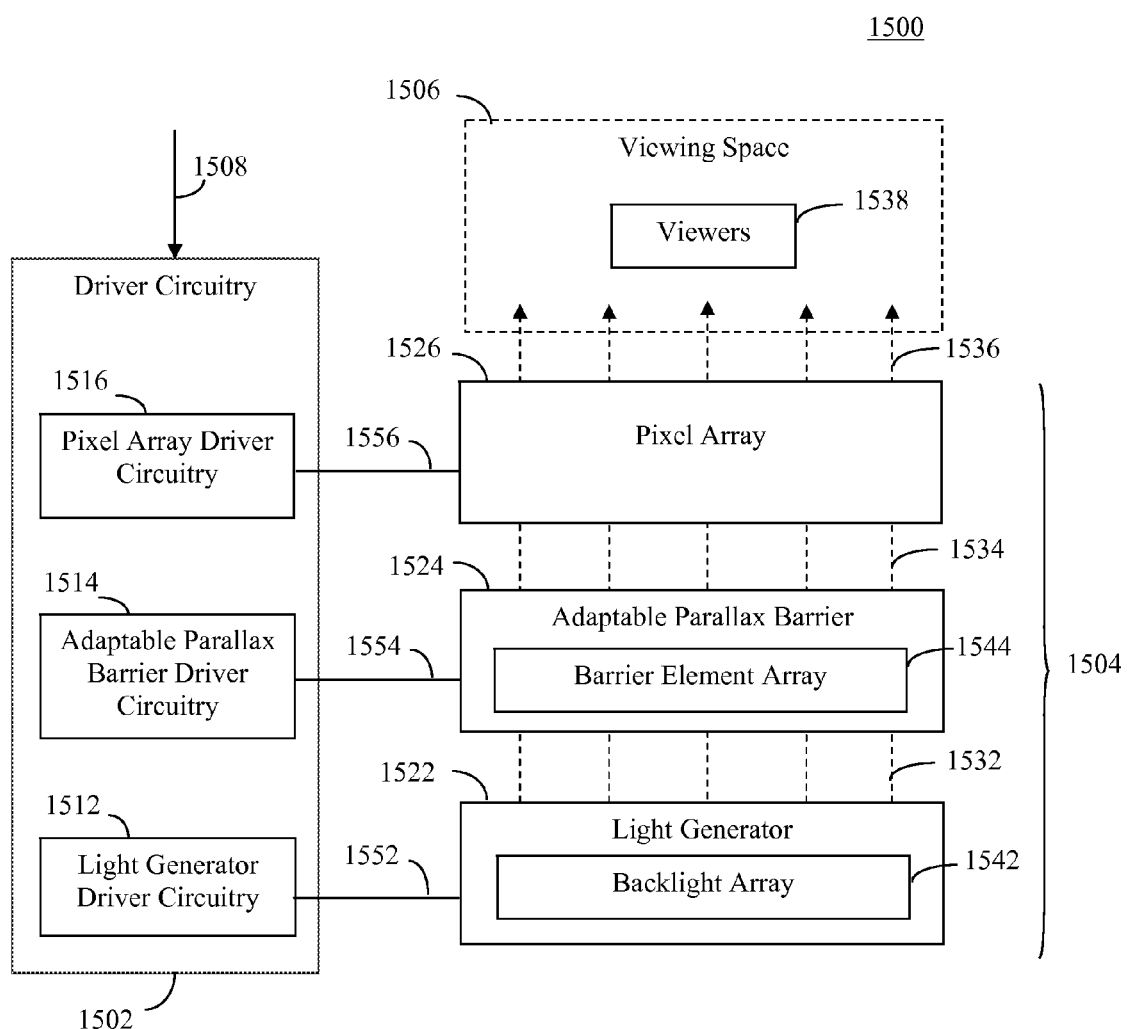
FIG. 15 is a block diagram of an exemplary display system that utilizes an adaptable parallax barrier and a light generator to support multiple viewing configurations in accordance with an embodiment.

FIG. 15 shows a block diagram of yet another exemplary display system 1500 that utilizes an adaptable parallax barrier to support multiple viewing configurations. As shown in FIG. 15, display system 1500 includes driver circuitry 1502 and a screen assembly 1504, wherein screen assembly 1504 include a light generator 1522, an adaptable parallax barrier 1524 and a pixel array 1526. As further shown in FIG. 15, driver circuitry 1502 includes light generator driver circuitry 1512, adaptable parallax barrier driver circuitry 1514 and pixel array driver circuitry 1516.

Light generator 1522 emits light 1532. Adaptable parallax barrier 1524 is positioned proximate to light generator 1522. Barrier element array 1544 is a layer of adaptable parallax barrier 1524 that includes a plurality of barrier elements or blocking regions arranged in an array. Each barrier element of the array is configured to be selectively opaque or transparent. Barrier element array 1544 filters light 1532 received from light generator 1522 to generate filtered light 1534. Filtered light 1534 is configured to enable a two-dimensional image, a three-dimensional image, or a pair of two-dimensional or three-dimensional images to be formed based on images subsequently imposed on filtered light 1534 by pixel array 1526.

Pixel array 1526 includes a two-dimensional array of pixels (e.g., arranged in a grid or other distribution) like pixel array 122 of FIG. 1B. Pixel array 1526 is not self-illuminating and operates as a light filter that imposes images (e.g., in the form of color, grayscale, etc.) on filtered light 1534 from adaptable parallax barrier 1524 to generate filtered light 1536 to include one or more images. Each pixel of pixel array 1526 may be a separately addressable filter (e.g., a pixel of a plasma display, an LCD display, an LED display, or of other type of display). Each pixel of pixel array 1526 may be individually controllable to vary the color imposed on the corresponding light passing through, and/or to vary the intensity of the passed light in filtered light 1536. In an embodiment, each pixel of pixel array 1526 may include a plurality of sub-pixels that correspond to separate color channels, such as a trio of red, green, and blue sub-pixels included in each pixel.

Driver circuitry 1502 receives control signals 1508 from control circuitry (not shown in FIG. 15). Control signals 1508 cause driver circuitry 1502 to place screen 1504 in a selected one of a plurality of different viewing configurations. In particular, based on control signals 1508, adaptable parallax barrier driver circuitry 1514 transmits drive signals 1554 that cause barrier element array 1544 to be placed in a state that supports the selected viewing configuration. Likewise, based on control signals 1508, pixel array driver circuitry 1516 transmits drive signals 1556 to cause pixels of one or more images (also referred to herein as "image pixels") to be rendered among the pixels of pixel array 1526 (also referred to herein as "display pixels") in a manner that is consistent with a current configuration of adaptable parallax barrier 1524. The selected viewing configuration may be a particular two-dimensional viewing configuration, a particular three-dimensional viewing configuration, or a viewing configuration that supports the simultaneous display of different types of two-dimensional and/or three-dimensional content.

As discussed in commonly-owned, co-pending U.S. patent application Ser. No. 12/982,020, filed on even date herewith and entitled "Backlighting Array Supporting Adaptable Parallax Barrier," the entirety of which is incorporated by reference herein, conventional LCD displays typically include a backlight and a display panel that includes an array of LCD pixels. The backlight is designed to produce a sheet of light of uniform luminosity for illuminating the LCD pixels. When simultaneously displaying two-dimensional, three-dimensional and multi-view three-dimensional regions using an adaptable parallax barrier such as that described in the aforementioned, incorporated U.S. patent application Ser. No. 12/845,440, the use of a conventional backlight will result in a disparity in perceived brightness between the different simultaneously-displayed regions. This is because the number of visible pixels per unit area associated with a two-dimensional region will generally exceed the number of visible pixels per unit area associated with a particular three-dimensional or multi-view three-dimensional region (in which the pixels must be partitioned among different eyes/views).

To address this issue, light generator 1522 includes a backlight array 1542 which is a two-dimensional array of light sources. Such light sources may be arranged, for example, in a rectangular grid. Each light source in backlight array 1542 is individually addressable and controllable to select an amount of light emitted thereby. A single light source may comprise one or more light-emitting elements depending upon the implementation. In one embodiment, each light source in backlight array 1542 comprises a single light-emitting diode (LED) although this example is not intended to be limiting.

The amount of light emitted by the individual light sources that make up backlight array 1542 can selectively controlled by drive signals 1552 generated by light generator driver circuitry 1512 so that the brightness associated with each of a plurality of display regions of screen 1504 can also be controlled. This enables display system 1500 to provide a desired brightness level for each display region automatically and/or in response to user input. For example, backlight array 1542 can be controlled such that a uniform level of brightness is achieved across different simultaneously-displayed display regions, even though the number of perceptible pixels per unit area varies from display region to display region. As another example, backlight array 1542 can be controlled such that the level of brightness associated with a particular display region is increased or reduced without impacting (or without substantially impacting) the brightness of other simultaneously-displayed display regions.

To help illustrate this, FIG. 16 provides an exploded view of an exemplary display system 1600 that implements a controllable backlight array as described immediately above. Display system 1600 comprises one implementation of display system 1500. As shown in FIG. 16, display system 1600 includes a light generator 1602 that includes a backlight array 1612, an adaptable parallax barrier 1604 that includes a barrier element array 1622 and a display panel 1606 that includes a pixel array 1632. These elements may be aligned with and positioned proximate to each other to create an integrated screen assembly.

In accordance with the example configuration shown in FIG. 16, a first portion 1634 of pixel array 1632 and a first portion 1624 of barrier element array 1622 have been manipulated to create a first display region that displays multi-view three-dimensional content, a second portion 1636 of pixel array 1632 and a second portion 1626 of barrier element array 1622 have been manipulated to create a second display region that displays a three-dimensional image, and a third portion of 1638 of pixel array 1632 and a third portion 1628 of barrier element array 1622 have been manipulated to create a third display region that displays a two-dimensional image. To independently control the brightness of each of the first, second and third display regions, the amount of light emitted by light sources included within a first portion 1614, a second portion 1616 and a third portion 1618 of backlight array 1612 can respectively be controlled. For example, the light sources within first portion 1614 may be controlled to provide greater luminosity than the light sources within second portion 1616 and third portion 1618 as the number of perceivable pixels per unit area will be smallest in the first display region with which first portion 1614 is aligned. In further accordance with this example, the light sources within second portion 1616 may be controlled to provide greater luminosity than the light sources within third portion 1618 since the number of perceivable pixels per unit area will be smaller in the second display region with which second portion 1616 is aligned than the third display region with which third portion 1618 is aligned. Of course, if uniform luminosity is not desired across the various display regions then other control schemes may be used.

Of course, the arrangement shown in FIG. 16 provides only a single teaching example. It should be noted that a display system in accordance with an embodiment can dynamically manipulate pixel array 1632 and barrier element array 1622 in a coordinated fashion to dynamically and simultaneously create any number of display regions of different sizes and in different locations, wherein each of the created display regions can display one of two-dimensional, three-dimensional or multi-view three-dimensional content. To accommodate this, backlight array 1612 can also be dynamically manipulated in a coordinated fashion with pixel array 1632 and barrier element array 1622 to ensure that each display region is perceived at a desired level of brightness.

In the arrangement shown in FIG. 16, there is a one-to-one correspondence between each light source in backlight array 1612 and every display pixel in pixel array 1632. However, this need not be the case to achieve regional brightness control. For example, in certain embodiments, the number of light sources provided in backlight array 1612 is less than the number of pixels provided in pixel array 1632. For instance, in one embodiment, a single light source may be provided in backlight array 1612 for every N pixels provided in pixel array 1632, wherein N is an integer greater than 1. In an embodiment in which the number of light sources in backlight array 1612 is less than the number of pixels in pixel array 1632, each light source may be arranged so that it provides backlighting for a particular group of pixels in pixel array 1632, although this is only an example. In alternate embodiments, the number of light sources provided in backlight array 1612 is greater than the number of pixels provided in pixel array 1632.

Also, in the examples described above, light sources in backlight array 1612 are described as being individually controllable. However, in alternate embodiments, light sources in backlight array 1612 may only be controllable in groups. This may facilitate a reduction in the complexity of the control infrastructure associated with backlight array 1612. In still further embodiments, light sources in backlight array 1612 may be controllable both individually and in groups.

It is also noted that although FIGS. 15 and 16 show display system configurations in which a barrier element array of an adaptable parallax barrier is disposed between a backlight array of individually addressable and controllable light sources and a pixel array, in alternate implementations the pixel array may be disposed between the backlight array and the barrier element array. Such an alternate implementation is shown in FIG. 17. In particular, FIG. 17 is a block diagram of an exemplary display system 1700 that includes a pixel array 1724 disposed between a light generator 1722 that includes a backlight array 1742 and an adaptable parallax barrier 1726 that includes a barrier element array 1744 to support the generation of two-dimensional and/or three-dimensional images perceivable in a viewing space 1706. In such alternate implementations, selective control of the luminosity of groups or individual ones of the light sources in backlight array 1742 may also be used to vary the backlighting luminosity associated with different display regions created by the interaction of backlight array 1742, pixel array 1724 and barrier element array 1744.

Other example display system implementations that utilize a backlight array of independently-controllable light sources are described in the aforementioned, incorporated U.S. patent application Ser. No. 12/982,020, filed on even date herewith and entitled "Backlighting Array Supporting Adaptable Parallax Barrier." That application also describes other approaches for controlling the brightness of different simultaneously-displayed display regions of a display system. Some of these approaches will be described below.

For example, to achieve independent region-by-region brightness control in a display system that includes a conventional backlight panel designed to produce a sheet of light of uniform luminosity, the amount of light passed by the individual pixels that make up a pixel array can be selectively controlled so that the brightness associated with each of a plurality of display regions can also be controlled. To help illustrate this, FIG. 18 provides an exploded view of an exemplary display system 1800 that implements a regional brightness control scheme based on pixel intensity as described immediately above. As shown in FIG. 18, display system 1800 includes a display panel 1802 and an adaptable parallax barrier 1804. Display system 1800 also includes a backlight panel, although this element is not shown in FIG. 18. These elements may be aligned with and positioned proximate to each other to create an integrated display screen.

As further shown in FIG. 18, display panel 1802 includes a pixel array 1812. Each of the pixels in a first portion 1814 of pixel array 1812 is individually controlled by pixel array driver circuitry to pass a selected amount of light produced by a backlight panel (not shown in FIG. 18), thereby producing display-generated light representative of a single two-dimensional image. Each of the pixels in a second portion 1816 of pixel array 1812 is individually controlled by the pixel array driver circuitry to pass a selected amount of light produced by the backlight panel, thereby producing display-generated light representative of two two-dimensional images that, when combined by the brain of a viewer positioned in an appropriate location relative to display system 1800, will be perceived as a single three-dimensional image.

Adaptable parallax barrier 1804 includes barrier element array 1822 that includes a first portion 1824 and a second portion 1826. Barrier element array 1822 is aligned with pixel array 1814 such that first portion 1824 of blocking region array 1822 overlays first portion 1814 of pixel array 1812 and second portion 1826 of blocking region array 1822 overlays second portion 1816 of pixel array 1812. Adaptable parallax barrier driver circuitry causes all the barrier elements within first portion 1824 of barrier element array 1822 to be transparent. Thus, the two-dimensional image generated by the pixels of first portion 1814 of pixel array 1812 will simply be passed through to a viewer in a viewing space in front of display system 1400. Furthermore, the adaptable parallax barrier driver circuitry manipulates the barrier elements within second portion 1826 of blocking region array 1822 to form a plurality of parallel transparent strips alternated with parallel opaque strips, thereby creating a parallax effect that enables the two two-dimensional images generated by the pixels of second portion 1816 of pixel array 1812 to be perceived as a three-dimensional image by a viewer in the viewing space in front of display system 1800.

Assume that a viewer is positioned such that he/she can perceive both the two-dimensional image passed by first portion 1824 of barrier element array 1822 and the three-dimensional image formed through parallax by second portion 1826 of barrier element 1822. As discussed above, the pixels per unit area perceived by this viewer with respect to the two-dimensional image will be greater than the pixels per unit area perceived by this viewer with respect to the three-dimensional image. Thus, the two-dimensional image will appear brighter to the viewer than the three dimensional image when backlighting of constant luminosity is provided behind pixel array 1812.

To address this issue, drive signals may be transmitted to display panel 1802 that selectively cause the pixels included in first portion 1814 of pixel array 1812 to pass less light from the backlight panel (i.e., become less intense), thereby reducing the brightness of the two-dimensional image produced from the pixels in first portion 1814 of pixel array 1812. Alternatively or additionally, drive signals may be transmitted to display panel 1802 that selectively cause the pixels included in second portion 1816 of pixel array 1812 to pass more light from the backlight panel (i.e., become more intense), thereby increasing the brightness of the three-dimensional image produced from the pixels in second portion 1816 of pixel array 1812. By controlling the intensity of the pixels in portions 1814 and 1816 of pixel array 1812 in this manner, the brightness of the two-dimensional image produced from the pixels in first portion 1814 of pixel array 1812 and the brightness of the three-dimensional image produced from the pixels in second portion 1816 of pixel array 1812 can be kept consistent. Additionally, by providing independent control over the intensity of the pixels in portions 1814 and 1816 of pixel array 1812, independent control over the brightness of the two-dimensional and three-dimensional images generated therefrom can also be achieved.

Of course, the arrangement shown in FIG. 18 provides only a single teaching example. It should be noted that a display system in accordance with an embodiment can dynamically manipulate pixel array 1812 and blocking element array 1822 in a coordinated fashion to dynamically and simultaneously create any number of display regions of different sizes and in different locations, wherein each of the created display regions can display one of two-dimensional, three-dimensional or multi-view three-dimensional content. To accommodate this, the intensity of the pixels in pixel array 1812 can also be dynamically manipulated in a coordinated fashion to ensure that each display region is perceived at a desired level of brightness.

In one embodiment, a regional brightness control scheme combines the use of a backlight array of independently-controllable light sources as previously described with regional pixel intensity control. The advantages of such a control scheme will now be described with reference to FIG. 19. FIG. 19 illustrates a front perspective view of an exemplary display panel 1900. Display panel 1900 includes a pixel array 1902 that includes a first portion 1904 and a second portion 1906, wherein each of first portion 1904 and second portion 1906 includes a different subset of the pixels in pixel array 1902. It is to be assumed that first portion 1904 of pixel array 1902 is illuminated by backlighting provided by an aligned first portion of a backlight array (not shown in FIG. 19), wherein the backlight array is similar to backlight array 1542 described above in reference to FIG. 15. Second portion 1906 of pixel array 1902 is illuminated by backlighting provided by an aligned second portion of the backlight array. In one example the amount of light emitted by each light source in the second portion of the backlight array to illuminate second portion 1906 of pixel array 1902 is controlled such that it is greater than the amount of light emitted by each light source in the first portion of the backlight array to illuminate first portion 1904 of pixel array 1902. This control scheme may be applied, for example, to cause a three-dimensional image formed by interaction between the pixels in second portion 1906 of pixel array 1902 and an adaptable parallax barrier to appear to have a uniform brightness level with respect to a two-dimensional image formed by interaction between the pixels in first portion 1904 of pixel array 1902 and the adaptable parallax barrier.

However, the difference in the amount of light emitted by each light source in the first and second portions of the backlight array to illuminate corresponding first and second portions 1904 and 1906 of pixel array 1902 may also give rise to undesired visual artifacts. In particular, the difference may cause pixels in boundary areas immediately outside of second portion 1906 of pixel array 1902 to appear brighter than desired in relation to other pixels in first portion 1904 of pixel array 1902. For example, as shown in FIG. 19, the pixels in boundary area 1912 immediately outside of second portion 1906 of pixel array 1902 may appear brighter than desired in relation to other pixels in first portion 1904 of pixel array 1902. This may be due to the fact that the increased luminosity provided by the light sources in the second portion of the backlight array has "spilled over" to impact the pixels in boundary area 1912, causing those pixels to be brighter than desired. Conversely, the difference may cause pixels in boundary areas immediately inside of second portion 1906 of pixel array 1502 to appear dimmer than desired in relation to other pixels in second portion 1906 of pixel array 1902. For example, as shown in FIG. 19, the pixels in boundary area 1914 immediately inside of second portion 1906 of pixel array 1902 may appear dimmer than desired in relation to other pixels in second portion 1906 of pixel array 1902. This may be due to the fact that the reduced luminosity of the light sources in the first portion of the backlight array has "spilled over" to impact the pixels in boundary area 1914, causing those pixels to be dimmer than desired.

To address this issue, an embodiment may selectively control the amount of light passed by the pixels located in boundary region 1912 and/or boundary region 1914 to compensate for the undesired visual effects. For example, driver circuitry associated with pixel array 1902 may selectively cause the pixels included in boundary area 1912 of pixel array 1902 to pass less light from the backlight panel (i.e., become less intense), thereby reducing the brightness of the pixels in boundary area 1912, thus compensating for an undesired increase in brightness due to "spill over" from light sources in the second portion of the backlight array. Alternatively or additionally, driver circuitry associated with pixel array 1902 may selectively cause the pixels included in boundary area 1914 of pixel array 1902 to pass more light from the backlight panel (i.e., become more intense), thereby increasing the brightness of the pixels in boundary area 1914, thus compensating for an undesired reduction in brightness due to "spill over" from light sources in the first portion of the backlight array. By controlling the intensity of the pixels in boundary areas 1912 and/or 1914 in this manner, the undesired visual effects described above that can arise from the use of a backlight array to provide regional brightness control can be mitigated or avoided entirely.

The illustration provided in FIG. 19 provides only one example of undesired visual effects that can arise from the use of a backlight array to provide regional brightness control. Persons skilled in the relevant art(s) will appreciate that many different display regions having many different brightness characteristics can be simultaneously generated by a display system in accordance with embodiments, thereby giving rise to different undesired visual effects relating to the brightness of boundary areas inside and outside of the different display regions. In each case, the intensity of pixels located in such boundaries areas can be selectively increased or reduced to mitigate or avoid such undesired visual effects.

In additional embodiments, a regional brightness control scheme is implemented in a display system that does not include a backlight panel at all, but instead utilizes a display panel comprising an array of organic light emitting diodes (OLEDs) or polymer light emitting diodes (PLEDs) which function as display pixels and also provide their own illumination. Viewing system 110 described above in reference to FIG. 1B may be representative of such a system, provided that pixel array 122 comprises an array of OLEDs or PLEDs. In accordance with such an implementation, the amount of light emitted by the individual OLED/PLED pixels that make up the OLED/PLED pixel array can be selectively controlled so that the brightness associated with each of a plurality of display regions of viewing system 110 can also be controlled. This enables viewing system 110 to provide a desired brightness level for each display region automatically and/or in response to user input. For example, the OLED/PLED pixel array can be controlled such that a uniform level of brightness is achieved across different simultaneously-displayed display regions, even though the number of perceptible pixels per unit area varies from display region to display region. As another example, the OLED/PLED pixel array can be controlled such that the level of brightness associated with a particular display region is increased or reduced without impacting (or without substantially impacting) the brightness of other simultaneously-displayed display regions.

Where OLED/PLED pixel regions such as those described above are adjacent to each other, it is possible that the brightness characteristics of one pixel region can impact the perceived brightness of an adjacent pixel region having different brightness characteristics, creating an undesired visual effect. For example, a first OLED/PLED pixel region having a relatively high level of brightness to support the viewing of multi-view three-dimensional content may be adjacent to a second OLED/PLED pixel region having a relatively low level of brightness to support the viewing of two-dimensional content. In this scenario, light from pixels in a perimeter area of the first OLED/PLED pixel region that are close to the boundary between the two pixel regions may "spill over" into a perimeter area of the second OLED/PLED pixel region. This may cause pixels in the perimeter area of the second OLED/PLED pixel region to appear brighter than desired in relation to other pixels in the second OLED/PLED pixel region. Conversely, pixels in the perimeter area of the first OLED/PLED pixel array may appear dimmer than desired in relation to other pixels in the first OLED/PLED pixel region because of the adjacency to the second OLED/PLED pixel region. To address this issue, it is possible to selectively increase or reduce the brightness of one or more OLED/PLED pixels in either perimeter area to reduce the "spill over" effect arising from the different brightness characteristics between the regions.

In still further embodiments, a regional brightness control scheme is implemented in a display system that includes an adaptable parallax barrier that also supports brightness regulation via an "overlay" approach. Such an approach involves the use of a brightness regulation overlay that is either independent of or integrated with an adaptable parallax barrier. The brightness regulation overlay is used to help achieve the aforementioned goals of maintaining standard brightness across various regional screen configurations and compensating for or minimizing backlighting dispersion.

The brightness regulation overlay comprises an element that allows regional dimming through various tones of "grey" pixels. In one example embodiment, an adaptable parallax barrier and the brightness regulation overlay are implemented as a non-color (i.e., black, white and grayscale) LCD sandwich, although other implementations may be used. The combined adaptable parallax barrier and brightness regulation overlay provide full transparent or opaque states for each pixel, as well as a grayscale alternative that can be used to "balance out" brightness variations caused by the parallax barrier itself.

Control over the individual barrier elements of the parallax barrier and the individual grayscale pixels of the brightness regulation overlay may be provided by using coordinated driver circuitry signaling. Such coordinate signaling may cause the pixels of the adaptable parallax barrier and the brightness regulation overlay (collectively referred to below as the manipulator pixels) to create opaque and transparent barrier elements associated with a particular parallax barrier configuration and a grayscale support there between to allow creation of overlays.

FIG. 20 illustrates two exemplary configurations of an adaptable light manipulator 2000 that includes an adaptable parallax barrier and a brightness regulation overlay implemented as a light manipulating LCD sandwich with manipulator grayscale pixels. In FIG. 20, the grayscale pixels map to the display pixels on a one-to-one basis, but that need not be the case.

A first exemplary configuration of adaptable light manipulator 2000 is shown above the section line denoted with reference numeral 2002. In accordance with the first exemplary configuration, a three-dimensional region 2004 is created with fully transparent or fully opaque manipulator pixels that provide parallax barrier functionality and a two-dimensional region 2006 is created having continuous medium gray manipulator pixels. The medium gray manipulator pixels operate to reduce the perceived brightness of two-dimensional region 2006 to better match that of three-dimensional region 2004. It is noted that in other example configurations, two-dimensional region 2006 could instead comprise a three-dimensional region having a number of views that is different than three-dimensional region 2004, thus also requiring brightness regulation.

In the first exemplary configuration, no boundary region compensation is performed. In the second exemplary configuration, which is shown below section line 2002, boundary region compensation is performed. For example, a boundary region 2010 within two-dimensional region 2006 may be "lightened" to a light gray to compensate for any diminution of light that might occur near the boundary with three-dimensional region 2004. In contrast, the grayscale level of an inner portion 2008 of two-dimensional region 2006 is maintained at the same medium gray level as in the portion of two-dimensional region 2006 above section line 2002. As a further example, a first boundary region 2012 and a second boundary region 2014 within three-dimensional region 2004 comprise darker and lighter gray transitional areas, respectively, to account for light dispersion from two-dimensional region 2006. In contrast, an inner portion 2016 of three-dimensional region 2004 includes only fully transparent or fully opaque manipulator pixels consistent with a parallax barrier configuration and no brightness regulation.

In one embodiment, the configuration of adaptable light manipulator 2000 is achieved by first creating a white through various grayscale areas that correspond to the regions and boundary areas to be formed. Once established, the manipulator pixels in these areas that comprise the opaque portions of the parallax barrier are overwritten to turn them black. Of course this two-stage approach is conceptual only and no "overwriting" need be performed.

In certain embodiments, adaptable light manipulator 2000 comprises the only component used in a display system for performing brightness regulation and/or boundary region compensation. In alternate embodiments, the display system further utilizes any one or more of the following aforementioned techniques for performing brightness regulation and/or boundary region compensation: a backlight array with independently-controllable light sources, and/or a pixel array and associated control logic for selectively increasing or decreasing the intensity of display pixels (e.g., either LCD pixels or OLED/PLED pixels). Note that in certain embodiments (such as the one described above in reference to FIG. 20), adaptable light manipulator 2000 is implemented as an integrated adaptable parallax barrier and brightness regulation overlay. However, in alternate embodiments, adaptable light manipulator 2000 is implemented using an adaptable parallax barrier panel and an independent brightness regulation overlay panel.

It is noted that any of the non-uniform light generation schemes described above may also be used in conjunction with a display system that includes multiple parallax barriers, such as display system 700 of FIG. 7, to support simultaneous presentation of regional two-dimensional, three-dimensional and multi-view three dimensional views. Furthermore, each region supported by such non-uniform light generation may comprise a region that simultaneously presents multiple different two-dimensional and/or three-dimensional views to multiple respective viewers.

B. Example Screen Assemblies Including Adaptable Lenticular Lenses

In display systems in accordance with further embodiments, rather than using an adaptable parallax barrier to perform light manipulation in support of multiple viewing configurations, an adaptable lenticular lens may be used. For example, with respect to example viewing system 110 of FIG. 1B, adaptable parallax barrier 124 may be replaced with an adaptable lenticular lens. Likewise, with respect to example display system 700 of FIG. 7, either of first parallax barrier 724 or second parallax barrier 726 may be replaced with a lenticular lens, such as an adaptable lenticular lens.

FIG. 21 shows a perspective view of an exemplary adaptable lenticular lens 2100 in accordance with an embodiment. As shown in FIG. 21, adaptable lenticular lens 2100 includes a sub-lens array 2102. Sub-lens array 2102 includes a plurality of sub-lenses 2104 arranged in a two-dimensional array (e.g., arranged side-by-side in a row). Each sub-lens 2104 is shown in FIG. 21 as generally cylindrical in shape and having a substantially semi-circular cross-section, but in other embodiments may have other shapes. In FIG. 21, sub-lens array 2102 is shown to include eight sub-lenses for illustrative purposes and is not intended to be limiting. For instance, sub-lens array 2102 may include any number (e.g., hundreds, thousands, etc.) of sub-lenses 2104. FIG. 22 shows a side view of adaptable lenticular lens 2100. In FIG. 22, light may be passed through adaptable lenticular lens 2100 in the direction of dotted arrow 2202 to be diverted. Adaptable lenticular lens 2100 is adaptable in that it can be modified to manipulate light in different ways in order to accommodate different viewing configurations. For example, in one embodiment, adaptable lenticular lens is made from an elastic material and can be stretched or shrunk in one or more directions in response to generated drive signals.

Further description regarding the use of an adaptable lenticular lens to deliver three-dimensional views is provided in commonly-owned, co-pending U.S. patent application Ser. No. 12/774,307, titled "Display with Elastic Light Manipulator," which is incorporated by reference herein in its entirety.

C. Example Display System with Adaptable Screen Assembly

FIG. 23 is a block diagram of an exemplary implementation of a display system 2300 that includes an adaptable screen assembly that supports the simultaneous display of multiple visual presentations in accordance with an embodiment. As shown in FIG. 23, display system 2300 generally comprises control circuitry 2302, driver circuitry 2304 and an adaptable screen assembly 2306.

As shown in FIG. 23, control circuitry 2302 includes a processing unit 2314, which may comprise one or more general-purpose or special-purpose processors or one or more processing cores. Processing unit 2314 is connected to a communication infrastructure 2312, such as a communication bus. Control circuitry 2302 may also include a primary or main memory (not shown in FIG. 23), such as random access memory (RAM), that is connected to communication infrastructure 2312. The main memory may have control logic stored thereon for execution by processing unit 2314 as well as data stored thereon that may be input to or output by processing unit 2314 during execution of such control logic.

Control circuitry 2302 may also include one or more secondary storage devices (not shown in FIG. 23) that are connected to communication infrastructure 2312, including but not limited to a hard disk drive, a removable storage drive (such as an optical disk drive, a floppy disk drive, a magnetic tape drive, or the like), or an interface for communicating with a removable storage unit such as an interface for communicating with a memory card, memory stick or the like. Each of these secondary storage devices provide an additional means for storing control logic for execution by processing unit 2314 as well as data that may be input to or output by processing unit 2314 during execution of such control logic.

Control circuitry 2302 further includes a user input interface 2318, a viewer tracking unit 2316, and a media interface 2320. User input interface 2318 is intended to generally represent any type of interface that may be used to receive user input, including but not limited to a remote control device, a traditional computer input device such as a keyboard or mouse, a touch screen, a gamepad or other type of gaming console input device, or one or more sensors including but not limited to video cameras, microphones and motion sensors.

Viewer tracking unit 3216 is intended to generally represent any type of functionality for determining or estimating a location of one or more viewers of display system 3200 and/or a head orientation of one or more viewers of display system 3200. Viewer tracking unit may perform such functions using different types of sensors (e.g., cameras, motion sensors, microphones or the like) or by using tracking systems such as those that wirelessly track an object (e.g., headset, remote control, or the like) currently being held or worn by a viewer.

Media interface 2320 is intended to represent any type of interface that is capable of receiving media content such as video content or image content. In certain implementations, media interface 2320 may comprise an interface for receiving media content from a remote source such as a broadcast media server, an on-demand media server, or the like. In such implementations, media interface 2320 may comprise, for example and without limitation, a wired or wireless internet or intranet connection, a satellite interface, a fiber interface, a coaxial cable interface, or a fiber-coaxial cable interface. Media interface 2320 may also comprise an interface for receiving media content from a local source such as a DVD or Blu-Ray disc player, a personal computer, a personal media player, smart phone, or the like. Media interface 2320 may be capable of retrieving video content from multiple sources.

Control circuitry 2302 further includes a communication interface 2322. Communication interface 2322 enables control circuitry 2302 to send control signals via a communication medium 2352 to another communication interface 2330 within driver circuitry 2304, thereby enabling control circuitry 2302 to control the operation of driver circuitry 2304. Communication medium 2352 may comprise any kind of wired or wireless communication medium suitable for transmitting such control signals.

As shown in FIG. 23, driver circuitry 2304 includes the aforementioned communication interface 2330 as well as pixel array driver circuitry 2332 and adaptable light manipulator(s) driver circuitry 2334. Driver circuitry also optionally includes light generator driver circuitry 2336. Each of these driver circuitry elements is configured to receive control signals from control circuitry 2302 (via the link between communication interface 2322 and communication interface 2330) and, responsive thereto, to send selected drive signals to a corresponding hardware element within adaptable screen assembly 2306, the drive signals causing the corresponding hardware element to operate in a particular manner. In particular, pixel array driver circuitry 2332 is configured to send selected drive signals to a pixel array 2342 within adaptable screen assembly 2306, adaptable light manipulator(s) driver circuitry 2334 is configured to send selected drive signals to one or more adaptable light manipulators 2344 within adaptable screen assembly 2306, and optional light generator driver circuitry 2336 is configured to send selected drive signals to an optional light generator 2346 within adaptable screen assembly 2306.

In one example mode of operation, processing unit 2314 operates pursuant to control logic to receive media content via media interface 2320 and to generate control signals necessary to cause driver circuitry 2304 to render such media content to screen 2306 in accordance with a selected viewing configuration. For example, processing unit 2314 may operate pursuant to control logic to receive first and second media content via media interface 2320 and present the first and second media content via first and second simultaneously-displayed views of adaptable screen assembly 2306 to corresponding first and second viewers. For instance, at least the first view may be observable by the first viewer but not the second viewer. The control logic that is executed by processing unit 2314 may be retrieved, for example, from a primary memory or a secondary storage device connected to processing unit 2314 via communication infrastructure 2312 as discussed above. The control logic may also be retrieved from some other local or remote source. Where the control logic is stored on a computer readable medium, that computer readable medium may be referred to herein as a computer program product.

Among other features, driver circuitry 2304 may be controlled to send coordinated drive signals necessary for simultaneously displaying two-dimensional images, three-dimensional images and multi-view three-dimensional content via adaptable screen assembly 2306. A manner by which pixel array 2642, adaptable light manipulator 2644 (e.g., an adaptable parallax barrier), and light generator 2646 may be manipulated in a coordinated fashion to perform this function is described in commonly-owned, co-pending U.S. patent application Ser. No. 12/982,031, filed on even date herewith and entitled "Coordinated Driving of Adaptable Light Manipulator, Backlighting and Pixel Array in Support of Adaptable 2D and 3D Displays," the entirety of which is incorporated by reference herein. Note that in accordance with certain implementations (e.g., implementations in which pixel array comprises an OLED/PLED pixel array), adaptable screen assembly 2306 need not include light generator 2346.

In one embodiment, at least part of the function of generating control signals necessary to cause pixel array 2342, adaptable light manipulator 2344 and light generator 2346 to render media content to screen 2306 in accordance with a selected viewing configuration is performed by drive signal processing circuitry 2338 which is integrated within driver circuitry 2304. Such circuitry may operate, for example, in conjunction with and/or under the control of processing unit 2314 to generate the necessary control signals.

In certain implementations, control circuitry 2302, driver circuitry 2304 and adaptable screen assembly 2306 are all included within a single housing. For example and without limitation, all these elements may exist within a television, a laptop computer, a tablet computer, or a telephone. In accordance with such an implementation, the link 2350 formed between communication interfaces 2322 and 2330 may be replaced by a direct connection between driver circuitry 2304 and communication infrastructure 2312. In an alternate implementation, control circuitry 2302 is disposed within a first housing, such as set top box or personal computer, and driver circuitry 2304 and adaptable screen assembly 2306 are disposed within a second housing, such as a television or computer monitor. The set top box may be any type of set top box including but not limited to fiber, Internet, cable, satellite, or terrestrial digital.

Figure 24:
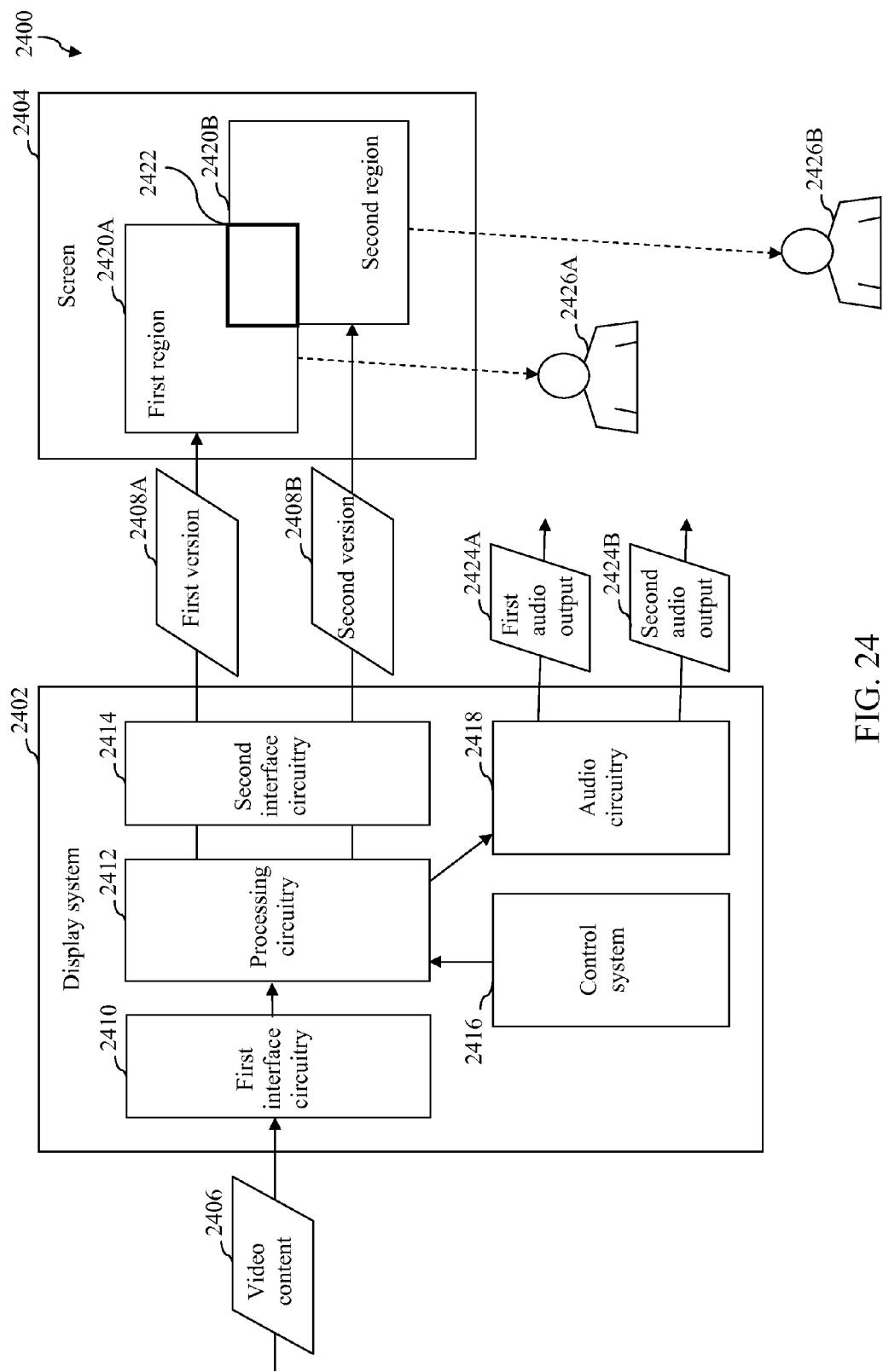

III. Exemplary Techniques for Supporting Independent Viewer Tailoring of Same Media Source Content via a Common 2D-3D Display Some exemplary techniques for supporting independent viewer tailoring of same media source content via a common 2D-3D display will now be described. For example, FIG. 24 depicts an exemplary system 2400 that provides such support in accordance with an embodiment. As shown in FIG. 24, system 2400 includes a display system 2402 and a screen 2404. Display system 2402 includes first interface circuitry 2410, processing circuitry 2412, second interface circuitry 2414, control system 2416, and audio circuitry 2418. First interface circuitry 2410 receives video content 2406. For instance, first interface circuitry 2410 may decode video content 2406 for further processing by processing circuitry 2412. Video content 2406 may comprise two-dimensional content, three-dimensional content, or a combination thereof.

Processing circuitry 2412 delivers via second interface circuitry 2414 both a first independently controllable version 2408A of the video content 2406 to a first region 2420A of screen 2404 and a second independently controllable version 2408B of the video content 2406 to a second region 2420B of screen 2404. For example, processing circuitry 2412 may produce the first independently controllable version 2408A and/or the second independently controllable version 2408B based at least in part on the video content 2406. In accordance with this example, one or both of the first and second independently controllable versions 2408A and 2408B may be time-shifted (e.g., rewound or fast forwarded), paused, or otherwise modified (e.g., include supplemental content) with respect to the video content 2406 as received by first interface circuitry 2410. For instance, the first independently controllable version 2408A may be the video content 2406 with a first time offset, and the second independently controllable version 2408B may be the video content 2406 with a second time offset that is different from the first time offset. It will be recognized that one of the first or second independently controllable versions 2408A or 2408B may not be modified with respect to (i.e., may be the same as) the video content 2406 as received by first interface circuitry 2410. Some examples of ways in which a first version of video content (e.g., first independently controllable version 2408A of video content 2406) may differ from a second version of the video content (e.g., second independently controllable version 2408B of video content 2406) are described in further detail below with reference to FIGS. 25 and 26.

Processing circuitry 2412 may include buffer circuitry (not shown) for buffering the first independently controllable version 2408A of the video content 2406 and/or the second independently controllable version 2408B of the video content 2406. For example, if the first independently controllable version 2408A is ahead of the second independently controllable version 2408B with respect to time (i.e., time-shifted ahead), the buffer circuitry may store a portion of the first independently controllable version 2408A until the first independently controllable version 2408A is no longer ahead of the second independently controllable version 2408B with respect to time (e.g., until the first and second independently controllable versions 2408A and 2408B are synchronized). In another example, if the second independently controllable version 2408B is ahead of the first independently controllable version 2408A with respect to time, the buffer circuitry may store a portion of the second independently controllable version 2408B until the second independently controllable version 2408B is no longer ahead of the first independently controllable version 2408A with respect to time (e.g., until the first and second independently controllable versions 2408A and 2408B are synchronized).

Processing circuitry 2412 may be capable of invoking different pathway(s) via which the first independently controllable version 2408A and/or the second independently controllable version 2408B are to be received in response to determining that the first and second independently controllable versions 2408A and 2408B are not in synchrony. For example, if the first independently controllable version 2408A is ahead of the second independently controllable version 2408B with respect to time, processing circuitry 2412 may invoke a different pathway via which the second independently controllable version 2408B is to be received. For instance, processing circuitry 2412 may invoke a new session, invoke a time-shared read of a disk, activate an additional head of a storage device, etc. for receiving another (e.g., time-shifted) instance of the second independently controllable version 2408B. In another example, if the second independently controllable version 2408B is ahead of the first independently controllable version 2408A with respect to time, processing circuitry 2412 may invoke a different pathway via which the first independently controllable version 2408A is to be received.

In an embodiment, processing circuitry 2412 buffers content that is common between the first and second independently controllable versions 2408A and 2408B. In accordance with this embodiment, processing circuitry 2412 invokes a different pathway via which to receive non-common content of a time-delayed version of the video content 2406. The non-common content is content of the time-delayed version that is not common between the first and second independently controllable versions 2408A and 2408B. The time-delayed version is the first independently controllable version if the second independently controllable version 2408B is ahead of the first independently controllable version 2408A with respect to time. The time-delayed version is the second independently controllable version 2408B if the first independently controllable version 2408A is ahead of the second independently controllable version 2408B with respect to time.

Processing circuitry 2412 may modify characteristic(s) of the first independently controllable version 2408A and/or the second independently controllable version 2408B in response to determining that the first and second independently controllable versions 2408A and 2408B are not in synchrony. For example, if the first independently controllable version 2408A is ahead of the second independently controllable version 2408B with respect to time, processing circuitry 2412 may reduce a resolution of the second independently controllable version 2408B, reduce a number of perspectives represented by the second independently controllable version 2408B, reduce a quality of service (QoS) that is associated with the second independently controllable version 2408B, reduce a size of the second region 2420B, and/or change a protocol that is used to deliver the second independently controllable version 2408B until the first independently controllable version 2408A is no longer ahead of the second independently controllable version 2408B with respect to time. In another example, if the second independently controllable version 2408B is ahead of the first independently controllable version 2408A with respect to time, processing circuitry 2412 may reduce a resolution of the first independently controllable version 2408A, reduce a number of perspectives represented by the first independently controllable version 2408A, reduce a quality of service (QoS) that is associated with the first independently controllable version 2408A, reduce a size of the first region 2420A, and/or change a protocol that is used to deliver the first independently controllable version 2408A until the second independently controllable version 2408B is no longer ahead of the first independently controllable version 2408A with respect to time.

In an embodiment, processing circuitry 2412 incorporates an indicator in the first independently controllable version 2408A and/or in the second independently controllable version 2408B to indicate whether the first and second independently controllable versions 2408A and 2408B are synchronized. In another embodiment, processing circuitry 2412 delivers the indicator via second interface circuitry 2414 in addition to the first and second independently controllable versions 2408A and 2408B. In accordance with this embodiment, processing circuitry 2412 may deliver the indicator to a region of screen 2404 for simultaneous display to both the first viewer 2426A and the second viewer 2426B.

Control system 2416 enables both a first viewer 2426A to control the first independently controllable version 2408A of the video content 2406 and a second viewer 2426B to control the second independently controllable version 2408B of the video content 2406. For example, control system 2416 may enable the first viewer 2426A and/or the second viewer 2426B to provide input for controlling characteristic(s) of the first independently controllable version 2408A and/or the second independently controllable version 2408B. A characteristic may be a visual characteristic, a playback characteristic, or any other suitable type of characteristic. Examples of a visual characteristic include but are not limited to brightness, contrast, resolution, colorization, and a size of a region to which the first independently controllable version 2408A or the second independently controllable version 2408B is delivered. A playback characteristic indicates a manner in which a version of video content (e.g., the first independently controllable version 2408A and/or the second independently controllable version 2408B) is played back. Further detail regarding an exemplary control system that enables viewer(s) to control playback characteristics of video content is provided below with reference to FIG. 25.

In an example, control system 2416 may enable both the first viewer 2426A and the second viewer 2426B to control the first independently controllable version 2408A. In another example, control system 2416 may enable the first viewer 2426A but not the second viewer 2426B to control the first independently controllable version 2408A. In yet another example, control system 2416 may enable both the first viewer 2426A and the second viewer 2426B to control the second independently controllable version 2408B. In still another example, control system 2416 may enable the second viewer 2426B but not the first viewer 2426A to control the second independently controllable version 2408B.

Control system 2416 may be implemented as one or two user input interfaces, which may be integrated with processing circuitry 2412 or independent from processing circuitry 2412. For instance, each of the one or two input interfaces may include a smart phone, a remote control, a traditional computer input device such as a keyboard or mouse, a touch pad, a gamepad or other type of gaming console input device, etc. An exemplary control system that is implemented as a user input interface for illustrative purposes is described below with reference to FIG. 25. Control system 2416 may be communicatively coupled to processing circuitry 2412 via any suitable wired or wireless mechanism or communication pathway, including but not limited to a Bluetooth® pathway, an Institute of Electrical and Electronics Engineers® (IEEE) 802.11 pathway, a Digital Enhanced Cordless Telecommunications (DECT) pathway, etc. Some exemplary remote control device implementations for independently modifying multiple presentations that are simultaneously displayed by a screen assembly are described in commonly-owned, co-pending U.S. patent application Ser. No. 12/982,078, filed on even date herewith and entitled "Multiple Remote Controllers That Each Simultaneously Controls a Different Visual Presentation of a 2D/3D Display," the entirety of which is incorporated by reference herein.

Audio circuitry 2418 delivers both a first audio output 2424A corresponding to the first independently controllable version 2408A of the video content 2406 and a second audio output 2424B corresponding to the second independently controllable version 2408B of the video content 2406. Audio circuitry 2418 may include one or more viewer-specific speakers (e.g., an earbud or a headphone speaker) and/or one or more non-viewer-specific speakers (e.g., a speaker mounted in a door panel of a car or on a wall of a room).

In one example, audio circuitry 2418 may deliver the first audio output 2424A to both the first viewer 2426A and the second viewer 2426B. In accordance with this example, audio circuitry 2418 may deliver the first audio output 2424A via non-viewer-specific speaker(s) and/or via first and second viewer-specific speaker(s) corresponding to the respective first and second viewers 2426A and 2426B. Alternatively, audio circuitry 2418 may deliver the first audio output 2424A via non-viewer-specific speaker(s) and via viewer-specific speaker(s) that correspond to either the first viewer 2426A or the second viewer 2426B.

In another example, audio circuitry 2418 may deliver the first audio output 2424A to the first viewer 2426A but not to the second viewer 2426B. In accordance with this example, audio circuitry 2418 may deliver the first audio output 2424A via viewer-specific speaker(s) that correspond to the first viewer 2426A.

In yet another example, audio circuitry 2418 may deliver the second audio output 2424B to both the first viewer 2426A and the second viewer 2426B. In accordance with this example, audio circuitry 2418 may deliver the second audio output 2424B via non-viewer-specific speaker(s) and/or via first and second viewer-specific speaker(s) corresponding to the respective first and second viewers 2426A and 2426B. Alternatively, audio circuitry 2418 may deliver the second audio output 2424B via non-viewer-specific speaker(s) and via viewer-specific speaker(s) that correspond to either the first viewer 2426A or the second viewer 2426B.

In still another example, audio circuitry 2418 may deliver the second audio output 2424B to the second viewer 2426B but not to the first viewer 2426A. In accordance with this example, audio circuitry 2418 may deliver the second audio output 2424B via viewer-specific speaker(s) that correspond to the second viewer 2426B.

Screen 2404 includes first region 2420A and second region 2420B. First and second regions 2420A and 2420B overlap at least in part to provide an overlapping region 2422. For example, first and second regions 2420A and 2420B may overlap entirely, though the scope of the embodiments is not limited in this respect. First and second regions 2420A and 2420B simultaneously display the respective first and second independently controllable versions 2408A and 2408B of the video content 2406. First region 2420A displays the first independently controllable version 2408A for first viewer 2426A but not second viewer 2426B. Second region 2420B displays the second independently controllable version 2408B for second viewer 2426B but not first viewer 2426A. Screen 2404 may be any suitable type of screen, including but not limited to an LCD screen, a plasma screen, a light emitting device (LED) screen (e.g., an OLED (organic LED) screen), etc.

It will be recognized that screen 2404 may include a pixel array (e.g., pixel array 122, 722, 1526, 1724, or 2342). Processing circuitry 2412 may include pixel array driver circuitry (e.g., pixel array driver circuitry 112, 712, 1516, or 2332) for controlling the pixel array. Processing circuitry 2412 may control the pixel array driver circuitry to send drive signals to the pixel array to place the pixel array in a state that supports simultaneous display of both the first independently controllable version 2408A for the first viewer 2426A but not the second viewer 2426B and the second independently controllable version 2408B for the second viewer 2426B but not the first viewer 2426A.

In some embodiments, screen 2404 includes one or more adaptable light manipulators (e.g., parallax barrier 124, 724, 726, 1524, and/or 1726, and/or adaptable light manipulator 2344). In accordance with these embodiments, processing circuitry 2412 includes adaptable light manipulator driver circuitry (e.g., adaptable parallax barrier driver circuitry 114, 714, or 1514, or adaptable light manipulator driver circuitry 2334) for controlling the adaptable light manipulator. In further accordance with these embodiments, processing circuitry 2412 controls the adaptable light manipulator driver circuitry to send drive signals to the adaptable light manipulator to place the adaptable light manipulator in a state that supports simultaneous display of both the first independently controllable version 2408A for the first viewer 2426A but not the second viewer 2426B and the second independently controllable version 2408B for the second viewer 2426B but not the first viewer 2426A.

In some embodiments, screen 2404 includes a light generator (e.g., light generator 1522, 1722, or 2346). In accordance with these embodiments, processing circuitry 2412 includes light generator driver circuitry (e.g., light generator driver circuitry 1512 or 2336) for controlling the light generator. In further accordance with these embodiments, processing circuitry 2412 controls the light generator driver circuitry to send drive signals to the light generator to cause the light generator to produce light in a manner (e.g., a non-uniform manner) that supports simultaneous display of both the first independently controllable version 2408A for the first viewer 2426A but not the second viewer 2426B and the second independently controllable version 2408B for the second viewer 2426B but not the first viewer 2426A. For example, the light generator may be used in conjunction with an adaptable light manipulator. The light generator may include a backlight array, and the adaptable light manipulator may include a barrier element array. In accordance with this example, processing circuitry 2412 may control the light generator driver circuitry to send the drive signals to cause different levels of luminosity to be produced by respective portions of the backlight array that are aligned with respective portions of the barrier element array, as described above with reference to FIG. 16.

FIG. 25 is an exemplary control system 2500 that enables a viewer to independently tailor media content in accordance with an embodiment. Control system 2500 is shown to be implemented as a remote control device for illustrative purposes and is not intended to be limiting. As shown in FIG. 25, control system 2500 includes a display 2502, a movement element 2504, a synch progress element 2506 a synch indicator 2508, a select element 2510, and playback control elements 2520.

For purposes of discussion, assume that a first independently controllable version of video content (e.g., first independently controllable version 2408A of video content 2406 in FIG. 24) is displayed for a first user (i.e., User 1). Further assume that a second independently controllable version of the video content (e.g., second independently controllable version 2408B of video content 2406) is displayed for a second user (i.e., User 2). Display 2502 includes a first time marker 2552 that indicates a time instance that corresponds to a frame of the first independently controllable portion that is currently (or most recently) displayed for User 1 relative to a duration of the first independently controllable portion (e.g., a proportion of the first independently controllable portion that has been displayed for User 1). Display 2502 also includes a second time marker 2554 that indicates a time instance that corresponds to a frame of the second independently controllable portion that is currently (or most recently) displayed for User 2 relative to a duration of the second independently controllable portion (e.g., a proportion of the second independently controllable portion that has been displayed for User 2). Display 2502 also includes synch counter 2556 that indicates an amount of time that is estimated to pass until the first and second independently controllable versions are in synchrony.

Directional control element 2504 includes an up arrow 2512, a down arrow 2514, a left arrow 2516, and a right arrow 2518. Arrows 2512, 2514, 2516, and 2518 are selectable by the viewer to move a pointer that is displayed on a screen (e.g., screen 2404) up, down, left, or right, respectively. For example, the pointer may appear on the screen in response to selection of a playback control element by the viewer. The viewer may use arrows 2512, 2514, 2516, and 2518 to browse through a list of available values for a control that is associated with the selected playback control element. For instance, a value may become highlighted as the pointer overlaps with that value. The value may become de-highlighted once the pointer no longer overlaps with the value. Once the user has identified (highlighted) a value for the control, the viewer may select the identified value by selecting the select 2510 element. A detailed discussion of the playback control elements 2520 is provided below.

Synch progress element 2506 toggles display 2502 on and off. For instance, if display 2502 is turned on, the viewer may select synch progress element 2506 to turn display 2502 off. If display 2502 is turned off, the viewer may select synch progress element 2506 to turn display 2502 on.

Synch indicator 2508 indicates whether the first independently controllable version and the second independently controllable version are in synchrony. Synch indicator 2508 is not selectable by the viewer. Rather, synch indicator 2508 is in a first state (e.g., illuminated) if the first and second independently controllable versions are in synchrony, and synch indicator 2508 is in a second state (e.g., not illuminated) that is different from the first state if the first and second independently controllable versions are not in synchrony. Synch indicator 2508 is shown to be a visual indicator (e.g., a light emitting diode (LED)) for illustrative purposes and is not intended to be limiting. It will be recognized that synch indicator 2508 may emit sound(s), produce tactile sensations (e.g., vibrations), etc. to differentiate between the first and second states.

Playback control elements 2520 are used to control playback of a specified version of the video content. For example, if control system 2500 is associated with the first independently controllable version of the video content but not the second independently controllable version of the video content, the specified version is the first independently controllable version. If control system 2500 is associated with the second independently controllable version but not the first independently controllable version, the specified version is the second independently controllable version. If control system 2500 is associated with both the first independently controllable version and the second independently controllable version, control system 2500 may include an element (not shown) for selecting the first independently controllable version or the second independently controllable version to be the specified version. Such an element may be used to toggle between using playback control elements 2520 to control playback of the first independently controllable version and using playback control elements 2520 to control of playback of the second independently controllable version.

Playback control elements 2520 include a rewind element 2522, a play element 2524, a fast forward element 2526, a skip back element 2528, a stop element 2530, a skip forward element 2532, a picture-in-picture (PIP) element 2534, a pause element 2536, a playback speed element 2538, a closed captioning (CC) element 2540, a number of cameras element 2542, a camera selector element 2544, a synchronize element 2546, a synch rate element 2548, and an audio selector element 2550. Rewind element 2522 is used to rewind the specified version of the video content. Play element 2524 is used to play the specified version. For instance, if the specified version is being rewound or fast forwarded, selection of the play element 2524 may cause rewinding or fast forwarding of the specified version to discontinue and the specified version to be played. Fast forward element 2526 is used to fast forward the specified version. Skip back element 2528 is used to rewind the specified version a predetermined number of frames. Stop element 2530 is used to discontinue playing of the specified content. Skip forward element 2532 is used to fast forward the specified version a predetermined number of frames.

PIP element 2534 is used to overlay second video content on the specified version of the first video content or to otherwise display the second video content in conjunction with the specified version. For instance, the second video content may include another version of the first video content. Once the second video content is overlaid on the specified version, the viewer may select the PIP element 2534 to cause the overlaid second video content to be removed from the specified version. An illustration of second video content overlaid on a specified version of first video content is shown in FIG. 26 and described in the corresponding text below.

Pause element 2536 is used to pause the specified version. Playback speed element 2538 is used to cause a rate at which the specified version is played to decrease or increase. For instance, once the viewer selects the playback speed element 2538, the viewer may use movement element 2504 to increase or decrease the rate at which the specified version is to playback.

The specified version may be associated with an audio output. Changing the rate of playback may cause the audio output to be changed in order to remain synchronized with the specified version of the video content. Accordingly, increasing or decreasing the rate of playback may cause a pitch of the audio output to increase or decrease, respectively. Thus, increasing or decreasing the rate of the playback may trigger audio correcting functionality (e.g., in processing circuitry 2412) that is associated with the playback speed element 2538 to counter such change in pitch of the audio output.

For example, increasing the rate of playback may cause the pitch of the audio output to be reduced to counter an increase in pitch that occurs due to the increase in the playback rate. In another example, decreasing the rate of playback may cause the pitch of the audio output to be increased to counter a decrease in pitch that occurs due to the decrease in the playback rate. In each example, the audio correcting functionality may cancel pitch changes that are associated with changing the playback rate of the specified version.

Closed caption (CC) element 2540 is used to overlay closed caption message(s) on the specified version of the video content or to otherwise display the closed caption message(s) in conjunction with the specified version. Once the CC element 2540 is selected, the viewer may select the CC element 2540 again to cause the closed caption message(s) to be removed from the specified version. An illustration of a closed caption message overlaid on a specified version of video content is shown in FIG. 26 and described in the corresponding text below.

"Number of cameras" element 2542 enables the viewer to select a number of perspective views that are to be represented by the specified version of the video content. For instance, once the viewer selects the "number of cameras" element 2542, the viewer may use arrows 2512, 2514, 2516, and 2518 to identify a number of perspective views. The viewer may select the select element 2510 to select the identified number of perspective views to be represented by the specified version. For example, if the specified version of the video content represents a single perspective view, the specified version is referred to as a 2D version of the video content. If the specified version of the video content represents two perspective views, the specified version is referred to as a 3D2 version of the video content. If the specified version of the video content represents four perspective views, the specified version is referred to as a 3D4 version of the video content, and so on.

Camera selector element 2544 enables the viewer to choose which perspective views of a designated number of perspective views are to be represented by the specified version of the video content. For instance, once the viewer selects the camera selector element 2544, the viewer may use arrows 2512, 2514, 2516, and 2518 to identify which perspective views are to be represented by the specified version. The viewer may select the select element 2510 to select the identified perspective views.

Synchronize element 2546 is used to cause the specified version of the video content and a non-specified version of the video content to become synchronized. For example, if the specified version is ahead of the non-specified version with respect to time, selection of the synchronize element 2546 may cause a rate of playback of the specified version to decrease and/or a rate of playback of the non-specified version to increase. In another example, if the specified version is behind the non-specified version with respect to time, selection of the synchronize element 2546 may cause the rate of playback of the specified version to increase and/or the rate of playback of the non-specified version to decrease. Selection of the synchronize element 2546 may cause the audio correcting functionality described above with reference to playback speed element 2538 to be invoked.

In yet another example, selection of the synchronize element 2546 may cause the specified version and the non-specified version to become synchronized substantially instantaneously. In accordance with this example, the specified version and the non-specified version may become synchronized without changing the rate of playback of the specified version and without changing the rate of playback of the non-specified version. In further accordance with this example, the specified version and the non-specified version may become synchronized without causing the aforementioned audio correcting functionality to be invoked.

Synch rate element 2548 enables the viewer to control the rate at which the specified version of the video content synchronizes with the non-specified version of the video content. For example, if the specified version is ahead of the non-specified version with respect to time, the viewer may use arrows 2512, 2514, 2516, and 2518 to decrease the rate of playback of the specified version to increase the rate of synchronization. In accordance with this example, the viewer may use arrows 2512, 2514, 2516, and 2518 to increase the rate of playback of the specified version to decrease the rate of synchronization. In another example, if the specified version is behind the non-specified version with respect to time, the viewer may use arrows 2512, 2514, 2516, and 2518 to increase the rate of playback of the specified version to increase the rate of synchronization. In accordance with this example, the viewer may use arrows 2512, 2514, 2516, and 2518 to decrease the rate of playback of the specified version to decrease the rate of synchronization.

Audio selector element 2550 enables the viewer to select audio content that is to be associated with the specified version of the video content. Once the audio selector element 2550 is selected, the viewer may use arrows 2512, 2514, 2516, and 2518 to browse through references to available audio. For example, the viewer may replace audio that is related to the specified version of the video content with other audio, which is not related to the specified version. In other example, the viewer may replace such other audio with the audio that is related to the specified version of the video content.

Selection of any of the playback control elements 2520, movement element 2504, and select element 2510 by the viewer causes a control signal to be delivered to processing circuitry 2412 for further processing. Each of the aforementioned elements may be a button, an icon on a display, or any other interface element that is suitable for receiving input from the viewer. For example, the aforementioned elements are shown to be visual elements that are controllable and/or selectable using tactile input from the user. It will be recognized that the elements may be audibly controlled and/or selected using audible commands from the user.

It will be recognized that control system 2500 may include elements in addition to or in lieu of playback control elements 2520. For instance, control system 2500 may include element(s) for controlling visual characteristic(s), such as brightness, contrast, resolution, colorization, etc. of the specified version of the video content, a size of a region to which the specified version is delivered, and so on.

Control system 2500 may include element(s) for adding any suitable type of supplemental content to the specified version of the video content. As mentioned above, the PIP element 2534 and the CC element 2540 may be used to add supplemental video content and closed caption message(s), respectively, to the specified version. Other elements may be used to add instant messages, alerts, program information, a clock, interactive graphical elements, or other type of supplemental content.

As described above, supplemental media content may be overlaid upon or otherwise displayed in conjunction with a version of video content. A set-top box that is capable of retrieving such supplemental media content and delivering it to a screen assembly is described in commonly-owned, co-pending U.S. patent application Ser. No. 12/982,062, filed on even date herewith and entitled "Set-Top Box Circuitry Supporting 2D and 3D Content Reductions to Accommodate Viewing Environment Constraints," the entirety of which is incorporated by reference herein.

FIG. 26 provides an illustration of the use of supplemental media content. In particular, FIG. 26 illustrates first and second independently controllable versions 2602 and 2604 of video content in accordance with an embodiment. First independently controllable version 2602 depicts a view of an ocean. Second independently controllable version 2604 includes supplemental content that is not included in the first independently controllable version 2602. In particular, second independently controllable version 2604 includes overlays 2606 and 2608 on top of the view of the ocean that is depicted in first independently controllable version 2604.

Overlay 2606 includes second video content that depicts a car positioned in front of a building. Accordingly, the second video content is unrelated to the first video content, which depicts the view of the ocean. However, it will be recognized that overlay 2606 or any other overlay may include video content that is related to the first video content. It will also be recognized that a viewer may select the picture-in-picture (PIP) element 2534 described above with reference to FIG. 25, for example, to cause overlay 2606 to be included on top of (i.e., overlaid on) the view of the ocean in second independently controllable version 2604.

Overlay 2608 includes a closed caption message. It will be recognized that the viewer may select the closed caption (CC) element 2540 described above with reference to FIG. 25, for example, to cause overlay 2608 to be overlaid on the view of the ocean in second independently controllable version 2604.

Figure 27:
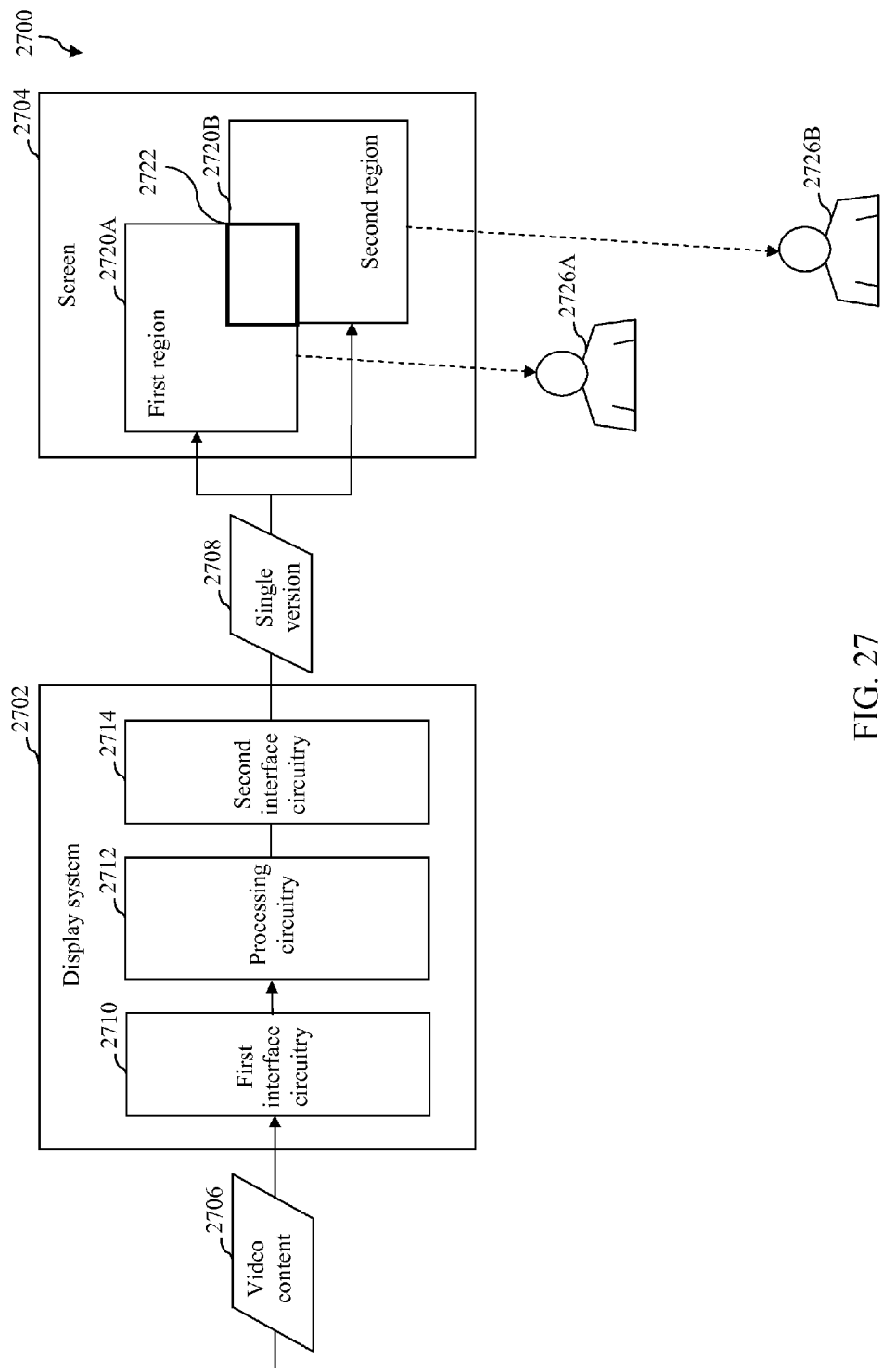

FIG. 27 depicts another exemplary system 2700 that supports independent viewer tailoring of same media source content via a common 2D-3D display in accordance with an embodiment. As shown in FIG. 27, system 2700 includes display system 2702 and screen 2704. Display system 2702 includes first interface circuitry 2710, processing circuitry 2712, and second interface circuitry 2714, which are capable of operating in like manner to first interface circuitry 2410, processing circuitry 2412, and second interface circuitry 2414, respectively, as described above with reference to FIG. 24.

For instance, first interface circuitry 2710 receives video content 2706. Processing circuitry 2712 is capable of delivering via second interface circuitry 2714 both a first independently controllable version of the video content 2706 to a first region 2720A of screen 2704 and a second independently controllable version of the video content 2706 to a second region 2720B of screen 2704. However, processing circuitry 2712 determines that the first independently controllable version and the second independently controllable version are substantially in synchrony. For example, the first independently controllable version and the second independently controllable version may be substantially the same and may be substantially time-aligned. The first and second independently controllable versions are deemed to be substantially the same when they include substantially the same content. The first and second independently controllable versions are deemed to be substantially time-aligned when there is substantially no time shift between them. Processing circuitry 2712 delivers via second interface circuitry 2714 a single version 2708 of the video content 2706 to the first and second regions 2720A and 2720B of screen 2704, based at least in part on the first independently controllable version and the second independently controllable version being substantially in synchrony.

Screen 2704 includes first region 2720A and second region 2720B. First and second regions 2720A and 2720B overlap at least in part to provide an overlapping region 2722. First and second regions 2720A and 2720B simultaneously display the single version 2708 of the video content 2706. First region 2720A displays the single version 2708 for first viewer 2726A but not second viewer 2726B. Second region 2720B displays the single version 2708 for second viewer 2726B but not first viewer 2726A.

Figure 28:
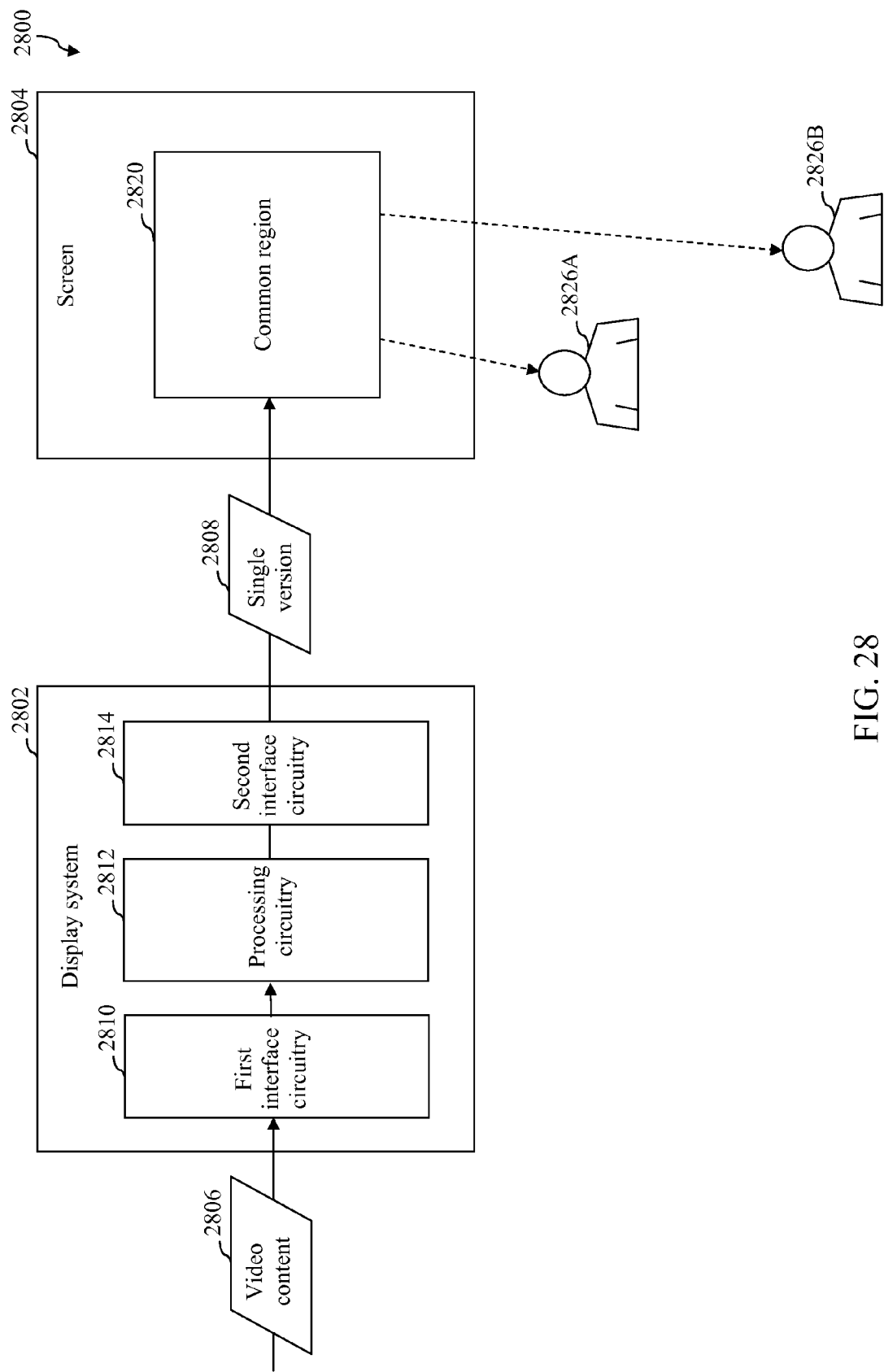

FIG. 28 depicts yet another exemplary system 2800 that supports independent viewer tailoring of same media source content via a common 2D-3D display in accordance with an embodiment. As shown in FIG. 28, system 2800 includes display system 2802 and screen 2804. Display system 2802 includes first interface circuitry 2810, processing circuitry 2812, and second interface circuitry 2814, which operate in like manner to first interface circuitry 2710, processing circuitry 2712, and second interface circuitry 2714, respectively, as described above with reference to FIG. 27.

However, when processing circuitry 2812 determines that the first independently controllable version of the video content 2806 and the second independently controllable version of video content 2806 are substantially in synchrony, processing circuitry 2812 delivers via second interface circuitry 2814 a single version 2808 of the video content 2806 to a common region 2820 of screen 2804, rather than to regions that correspond to the respective viewers 2826A and 2826B. Processing circuitry 2812 delivers the single version 2808 based at least in part on the first independently controllable version and the second independently controllable version being substantially in synchrony.

Screen 2804 includes common region 2820. Common region 2820 displays the single version 2808 for both the first viewer 2826A and the second viewer 2726B.

FIG. 29 depicts a flowchart 2900 of an exemplary method for supporting independent viewer tailoring of same media source content via a common 2D-3D display in accordance with an embodiment. Flowchart 2900 may be performed by any of systems 2400, 2700, or 2800 shown in respective FIG. 24, 27, or 28, for example. However the method of flowchart 2900 is not limited to those embodiments. Further structural and operational embodiments will be apparent to persons skilled in the relevant art(s) based on the discussion regarding flowchart 2900.

As shown in FIG. 29, flowchart 2900 begins with step 2902. In step 2902, video content is received. In an exemplary implementation, first interface circuitry 2410, 2710, or 2810 receives video content 2406, 2706, or 2806.

At step 2904, a first independently controllable version of the video content is delivered to a first region of a screen, and a second independently controllable version of the video content is delivered to a second region of the screen. The first region and the second region overlap at least in part. The delivery supports simultaneous display by the screen of both the first independently controllable version of the video content for a first viewer but not a second viewer and the second independently controllable version of the video content for the second viewer but not the first viewer. In an exemplary implementation, processing circuitry 2412, 2712, or 2812 delivers via second interface circuitry 2414, 2714, or 2814 both a first independently controllable version 2408A of video content 2406 to a first region 2420A and a second independently controllable version 2408B of the video content 2406 to a second region 2420B. The delivery supports simultaneous display by screen 2404 of both the first independently controllable version 2408A of the video content 2406 for a first viewer 2426A but not a second viewer 2426B and the second independently controllable version 2408B of the video content 2406 for the second viewer 2426B but not the first viewer 2426A. In accordance with this exemplary implementation, first region 2420A and second region 2420B overlap at least in part.

At step 2906, both a first audio output corresponding to the first independently controllable version of the video content and a second audio output corresponding to the second independently controllable version of the video content are delivered. In an exemplary implementation, audio circuitry 2418 delivers both a first audio output 2424A corresponding to the first independently controllable version 2408A of the video content 2406 and a second audio output 2424B corresponding to the second independently controllable version 2408B of the video content 2406.

At step 2908, a determination is made whether the first independently controllable version of the video content and the second independently controllable version of the video content are substantially in synchrony. In an exemplary implementation, processing circuitry 2412, 2712, or 2812 determines whether the first independently controllable version 2408A and the second independently controllable version 2408B of the video content 2406 are substantially in synchrony. If the first independently controllable version of the video content and the second independently controllable version of the video content are substantially in synchrony, flow continues to step 2910. Otherwise, flowchart 2900 ends.

At step 2910, a single version of the video content is delivered. In an exemplary implementation, processing circuitry 2412, 2712, or 2812 delivers a single version 2708 or 2808 of the video content 2706 or 2806.

In some embodiments, one or more steps 2902, 2904, 2906, 2908, and/or 2910 of flowchart 2900 may not be performed. Moreover, steps in addition to or in lieu of steps 2902, 2904, 2906, 2908, and/or 2910 may be performed.

Figure 30:
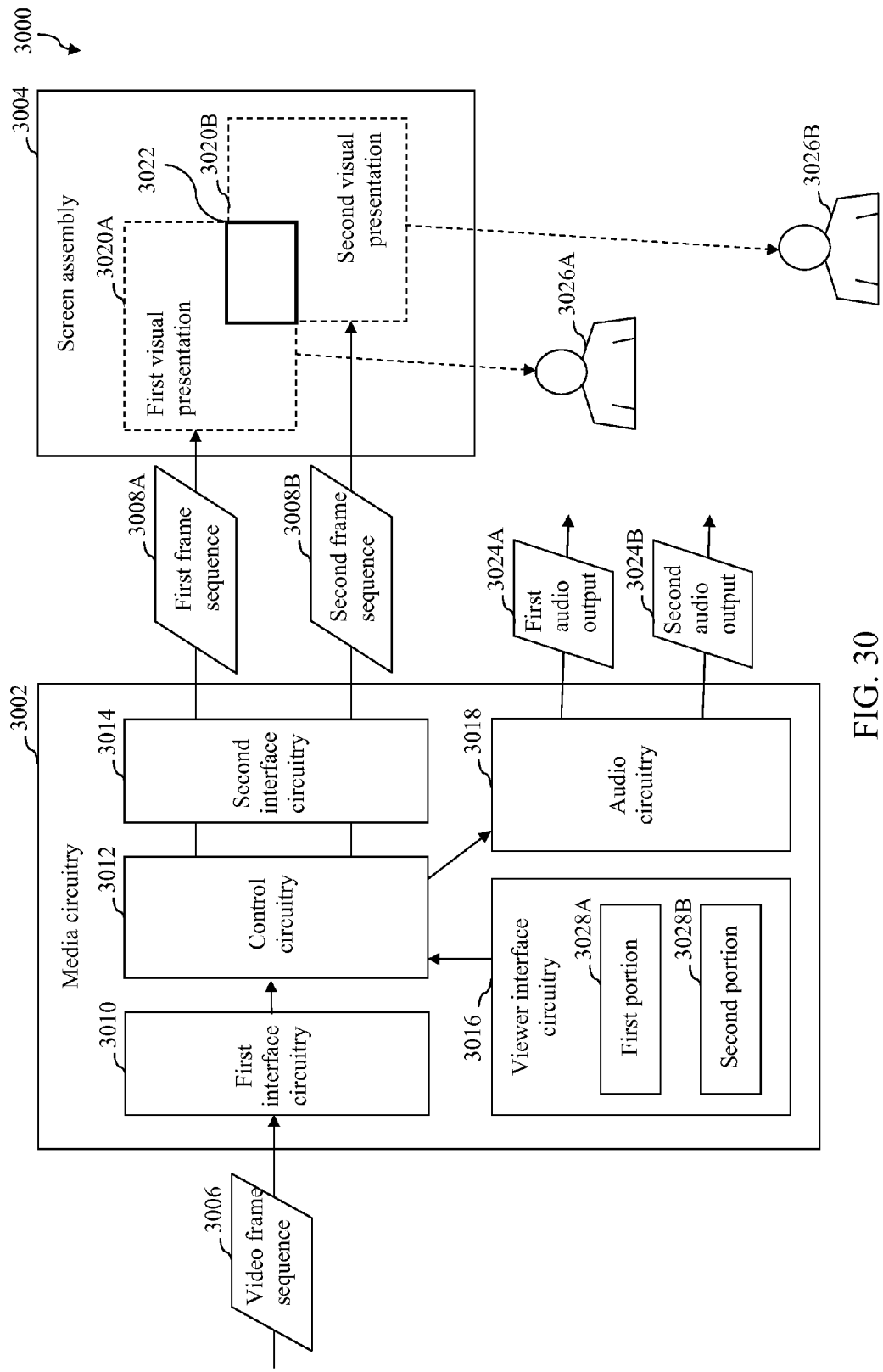

FIG. 30 depicts still another exemplary system 3000 that supports independent viewer tailoring of same media source content via a common 2D-3D display in accordance with an embodiment. As shown in FIG. 30, system 3000 includes a media circuitry 3002 and a screen 3004. Media circuitry 3002 includes first interface circuitry 3010, control circuitry 3012, second interface circuitry 3014, viewer interface circuitry 3016, and audio circuitry 3018. First interface circuitry 3010 receives video frame sequence 3006. For instance, first interface circuitry 3010 may decode video frame sequence 3006 before providing the video frame sequence 3006 to control circuitry 3012.

Control circuitry 3012 delivers both a first frame sequence 3008A and a second frame sequence 3008B via second interface circuitry 3014 to screen assembly 3004 for simultaneous display in at least a partially overlapping area 3022 of screen assembly 3004. The first frame sequence 3008A is delivered to produce a first visual presentation 3020A for a first viewer 3026A but not for a second viewer 3026B. The second frame sequence 3008B is delivered to produce a second visual presentation 3020B for the second viewer 3026B but not for the first viewer 3026A. Control circuitry 3012 may include buffer circuitry (not shown) for buffering the first frame sequence 3008A and/or the second frame sequence 3008B, though the scope of the embodiments is not limited in this respect.

Each of the first frame sequence 3008A and the second frame sequence 3008B is based at least in part on the video frame sequence 3006. For example, control circuitry 3012 may produce the first frame sequence 3008A and/or the second frame sequence 3008B based at least in part on the video frame sequence 3006. In accordance with this example, one or both of the first and second frame sequences 3008A and 3008B may be time-shifted (e.g., rewound or fast forwarded), paused, or otherwise modified (e.g., include supplemental content) with respect to the video frame sequence 3006 as received by first interface circuitry 3010. For instance, the first frame sequence 3008A may be the video frame sequence 3006 with a first time offset, and the second frame sequence 3008B may be the video frame sequence 3006 with a second time offset that is different from the first time offset. It will be recognized that one of the first or second frame sequences 3008A or 3008B may not be modified with respect to (i.e., may be the same as) the video frame sequence 3006 as received by first interface circuitry 3010. It will also be recognized that the first frame sequence 3008A may include supplemental content that is not included in the second frame sequence 3008B, or vice versa.

Viewer interface circuitry 3016 enables the first viewer 3026A to control at least one characteristic of the first visual presentation 3020A. Viewer interface circuitry 3016 may also enable the second viewer 3026B to control at least one characteristic of the second visual presentation 3020B. For instance, viewer interface circuitry 3016 is shown in FIG. 30 to include a first portion 3028A and a second portion 3028B. First portion 3028A supports the first viewer 3026A in changing at least one characteristic of the first visual presentation 3020A. For example, first portion 3028A may enable the first viewer 3026A to provide input for controlling characteristic(s) of the first visual presentation 3020A. A characteristic of a visual presentation may include but is not limited to a playback characteristic, such as those described above with reference to playback control elements 2520 of FIG. 25; a visual characteristic, such as brightness, contrast, resolution, colorization, or size of a region in which the visual presentation is produced; or any other suitable type of characteristic. The second portion 3028B supports the second viewer 3026B in changing at least one characteristic of the second visual presentation 3020B. For example, second portion 3028B may enable the second viewer 3026B to provide input for controlling characteristic(s) of the second visual presentation 3020B.

Audio circuitry 3018 delivers both a first audio output 3024A corresponding to the first frame sequence 3008A and a second audio output 3024B corresponding to the second frame sequence 3008B.

FIGS. 31 and 32 depict flowcharts of other exemplary methods for supporting independent viewer tailoring of same media source content via a common 2D-3D display in accordance with embodiments. Flowchart 3100 may be performed by system 3000 shown in FIG. 30, for example. Flowchart 3200 may be performed by any of systems 2400, 2700, or 2800 shown in respective FIG. 24, 27, or 28, for example. However the methods of flowcharts 3100 and 3200 are not limited to those embodiments. Further structural and operational embodiments will be apparent to persons skilled in the relevant art(s) based on the discussion regarding flowcharts 3100 and 3200.

As shown in FIG. 31, flowchart 3100 begins with step 3102. In step 3102, a video frame sequence is received. In an exemplary implementation, first interface circuitry 3010 receives video frame sequence 3006.

At step 3104, both a first frame sequence and a second frame sequence are delivered to a screen assembly for simultaneous display in at least a partially overlapping area of the screen assembly. The first frame sequence is delivered to produce a first visual presentation for a first viewer but not for a second viewer. The second frame sequence is delivered to produce a second visual presentation for the second viewer but not for the first viewer. Each of the first frame sequence and the second frame sequence is based at least in part on the video frame sequence. In an exemplary implementation, control circuitry 3012 delivers both a first frame sequence 3008A and a second frame sequence 3008B via second interface circuitry 3014 to a screen assembly 3004 for simultaneous display in at least a partially overlapping area 3022 of screen assembly 3004. The first frame sequence 3008A is delivered to produce a first visual presentation 3020A for a first viewer 3026A but not for a second viewer 3026B. The second frame sequence 3008B is delivered to produce a second visual presentation 3020B for the second viewer 3026B but not for the first viewer 3026A. In accordance with this implementation, each of the first frame sequence 3008A and the second frame sequence 3008B is based at least in part on the video frame sequence 3006.

At step 3106, both a first audio output corresponding to the first frame sequence and a second audio output corresponding to the second frame sequence are delivered. In an exemplary implementation, audio circuitry 3018 delivers both a first audio output 3024A corresponding to the first frame sequence 3008A and a second audio output 3024B corresponding to the second frame sequence 3008B.

In some embodiments, one or more steps 3102, 3104, and/or 3106 of flowchart 3100 may not be performed. Moreover, steps in addition to or in lieu of steps 3102, 3104, and/or 3106 may be performed.

As shown in FIG. 32, flowchart 3200 begins with step 3202. In step 3202, a first independently controllable version of video content is generated by processing the video content. In an exemplary implementation, processing circuitry 2412, 2712, or 2812 generates a first independently controllable version 2408A of video content 2406, 2706, or 2806 by processing the video content 2406, 2706, or 2806.

At step 3204, a second independently controllable version of the video content is generated by processing the video content. In an exemplary implementation, processing circuitry 2412, 2712, or 2812 generates a second independently controllable version 2408B of the video content 2406, 2706, or 2806 by processing the video content 2406, 2706, or 2806.

At step 3206, at least in part a simultaneous display of (i) the first independently controllable version of the video content in a first region of a screen for a first viewer but not for a second viewer, and (ii) the second independently controllable version of the video content in a second region of the screen for the second viewer but not for the first viewer, is caused. The first region and the second region at least partially overlap. In an exemplary implementation, processing circuitry 2412, 2712, or 2812 causes at least in part a simultaneous display of (i) the first independently controllable version 2408A of the video content 2406, 2706, or 2806 in a first region 2420A of a screen 2404, 2704, or 2804 for a first viewer 2426A but not for a second viewer 2426B, and (ii) the second independently controllable version 2408B of the video content 2406, 2706, or 2806 in a second region 2420B of the screen 2404, 2704, or 2804 for the second viewer 2426B but not for the first viewer 2426A. First region 2420A and second region 2420B at least partially overlap.

At step 3208, both a first audio output that corresponds to the first independently controllable version of the video content and a second audio output that corresponds to the second independently controllable version of the video content are made available. In an exemplary implementation, audio circuitry 2418 makes available both a first audio output 2424A that corresponds to the first independently controllable version 2408A of the video content 2406, 2706, or 2806 and a second audio output 2424B that corresponds to the second independently controllable version 2408B of the video content 2406, 2706, or 2806.

At step 3210, a response is made to a control signal that corresponds to an input from the first viewer. The control signal relates to a change in a characteristic of the first independently controllable version. In an example, the characteristic may be a visual characteristic, such as brightness, contrast, resolution, colorization, etc. of the first independently controllable version or a size of the first region of the screen in which the first independently controllable version is displayed. In another example, the characteristic may be a playback characteristic, such as a time-shift, a playback rate, a number of perspectives, selected perspectives of a designated number of perspectives, supplemental content, or audio that is associated with the first independently controllable version. The visual characteristics and playback characteristics mentioned above are provided for illustrative purposes and are not intended to be limiting. It will be recognized that the characteristic of the first independently controllable version may be any suitable visual characteristic, playback characteristic, or other type of characteristic. In an exemplary implementation, processing circuitry 2412, 2712, or 2812 responds to a control signal that corresponds to an input from the first viewer 2426A.

At step 3212, at least in part the change to the characteristic of the first independently controllable version is caused. For example, an addition of supplemental content to the first independently controllable version may be caused. In another example, a change in a time-shift, a playback rate, or audio that is associated with the first independently controllable version may be caused. In yet another example, a change of perspectives and/or number thereof that are represented by the first independently controllable version may be caused. In still another example, a change in brightness, contrast, resolution, colorization, etc. of the first independently controllable version may be caused. In an exemplary implementation, processing circuitry 2412, 2712, or 2812 causes at least in part the change to the characteristic of the first independently controllable version 2408A.

At step 3214, at least in part termination of the simultaneous display is caused. In an exemplary implementation, processing circuitry 2412, 2712, or 2812 causes at least in part the termination of the simultaneous display.

At step 3216, at least in part a display of a single version of the video content is caused. In an exemplary implementation, processing circuitry 2412, 2712, or 2812 causes at least in part a display of a single version 2708 or 2808 of the video content 2406, 2706, or 2806.

In some embodiments, one or more steps 3202, 3204, 3206, 3208, 3210, 3212, 3214, and/or 3216 of flowchart 3200 may not be performed. Moreover, steps in addition to or in lieu of steps 3202, 3204, 3206, 3208, 3210, 3212, 3214, and/or 3216 may be performed.

IV. Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A display system that supports a screen and video content for a first viewer and a second viewer, the display system comprising:
   first interface circuitry that receives the video content;
   second interface circuitry that supports a communication pathway to the screen; and
   processing circuitry that delivers via the second interface circuitry both a first version of a designated frame sequence of the video content that is independently controllable during playback to a first region of the screen and a second version of the designated frame sequence of the video content that is independently controllable during playback to a second region of the screen, the first region and the second region overlapping at least in part, and the delivery supporting simultaneous display by the screen of both the first version of the designated frame sequence for the first viewer but not the second viewer and the second version of the designated frame sequence for the second viewer but not the first viewer, the first version of the designated frame sequence and the second version of the designated frame sequence being based on same media source content, and the first version of the designated frame sequence being independently controllable during playback without affecting the second version of the designated frame sequence, and the second version of the designated frame sequence being independently controllable during playback without affecting the first version of the designated frame sequence.

2. The display system of claim 1, further comprising:
a control system through which both the first viewer can control the first version of the designated frame sequence, and the second viewer can control the second version of the designated frame sequence.

3. The display system of claim 2, wherein the control by the control system comprising a playback control.

4. The display system of claim 1, further comprising:
audio circuitry that delivers both a first audio output corresponding to the first version of the designated frame sequence and a second audio output corresponding to the second version of the designated frame sequence.

5. The display system of claim 1, wherein the processing circuitry is configured to deliver, via the second interface circuitry, a single version of the video content based at least in part on the first version of the designated frame sequence and the second version of the designated frame sequence being substantially in synchrony.

6. The display system of claim 1, wherein the first version of the designated frame sequence includes supplemental content that is not included in the second version of the designated frame sequence.

7. Media circuitry that supports visual presentation of a video frame sequence on a screen assembly, the visual presentation being viewed by a first viewer and a second viewer, the media circuitry comprising:
first interface circuitry that receives the video frame sequence;
second interface circuitry that communicatively couples with the screen assembly;
control circuitry communicatively coupled to both the first interface circuitry and the second interface circuitry; and
the control circuitry delivers both a first frame sequence and a second frame sequence from same media source content via the second interface circuitry to the screen assembly for simultaneous display in at least a partially overlapping area of the screen assembly, the first frame sequence being delivered to produce a first visual presentation that is independently controllable during playback for the first viewer but not for the second viewer, the second frame sequence being delivered to produce a second visual presentation that is independently controllable during playback for the second viewer but not for the first viewer, each of the first frame sequence and the second frame sequence being based at least in part on the video frame sequence, and the first visual presentation being independently controllable during playback by the first viewer without affecting the second visual presentation and the second visual presentation being independently controllable during playback by the second viewer without affecting the first visual presentation.

8. The media circuitry of claim 7, further comprising:
viewer interface circuitry through which the first viewer can control at least one characteristic of the first visual presentation.

9. The media circuitry of claim 7, further comprising:
viewer interface circuitry, the viewer interface circuitry having a first portion and a second portion, the first portion supports the first viewer in changing at least one characteristic of the first visual presentation, and the second portion supports the second viewer in changing at least one characteristic of the second visual presentation.

10. The media circuitry of claim 7, further comprising:
audio circuitry that delivers both a first audio output corresponding to the first frame sequence and a second audio output corresponding to the second frame sequence.

11. The media circuitry of claim 7, wherein the control circuitry produces the second frame sequence based at least in part on the video frame sequence.

12. The media circuitry of claim 7, wherein the control circuitry uses the video frame sequence as the first frame sequence.

13. The media circuitry of claim 7, wherein the first frame sequence being the video frame sequence with a first time offset, the second frame sequence being the video frame sequence with a second time offset, and the first time offset and the second time offset being different.

14. The media circuitry of claim 7, wherein the first frame sequence includes supplemental content that is not included in the second frame sequence.

15. A method that supports a visual presentation for a first viewer and a second viewer via a screen, the visual presentation being based at least in part on video content, the method comprising:
causing at least in part a simultaneous display of (i) a first version of a designated frame sequence of the video content that is independently controllable during playback in a first region of the screen for the first viewer but not for the second viewer, and (ii) a second version of the designated frame sequence of the video content that is independently controllable during playback in a second region of the screen for the second viewer but not for the first viewer, the first region and the second region at least partially overlapping, the first version of the designated frame sequence and the second version of the designated frame sequence being based on same media source content, and the first version of the designated frame sequence being independently controllable during playback without affecting the second version of the designated frame sequence, and the second version of the designated frame sequence being independently controllable during playback without affecting the first version of the designated frame sequence; and
causing at least in part a change to a characteristic of the first version.

16. The method of claim 15, further comprising:
responding to a control signal that corresponds to an input from the first viewer, the control signal relating to the change in the characteristic.

17. The method of claim 15, further comprising:
making available both a first audio output that corresponds to the first version of the designated frame sequence and a second audio output that corresponds to the second version of the designated frame sequence.

18. The method of claim 15, further comprising:
causing at least in part termination of the simultaneous display; and
causing at least in part a display of a single version of the video content.

19. The method of claim 15, wherein causing at least in part the change to the characteristic comprises:
causing an addition of supplemental content to the first version.

20. The method of claim 15, further comprising:
generating the second version of the designated frame sequence by processing the video content.

21. The method of claim 15, wherein the first version of the designated frame sequence is received by the first viewer via eyewear.

22. The display system of claim 15, wherein the first version of the designated frame sequence is received via a light manipulator.

* * * * *

UNITED STATES PATENT AND TRADEMARK OFFICE
CERTIFICATE OF CORRECTION

PATENT NO. : 9,049,440 B2  
APPLICATION NO. : 12/982362  
DATED : June 2, 2015  
INVENTOR(S) : Nambirajan Seshadri et al.

Page 1 of 1

It is certified that error appears in the above-identified patent and that said Letters Patent is hereby corrected as shown below:

Claims

In column 49, line 16, in claim 22, delete "The display system" and insert -- The method --, therefor.

Signed and Sealed this
Tenth Day of November, 2015

Michelle K. Lee
*Director of the United States Patent and Trademark Office*